United States Patent [19]
Sawase et al.

[11] Patent Number: 5,370,588
[45] Date of Patent: Dec. 6, 1994

[54] DRIVE POWER DISTRIBUTION CONTROL SYSTEM FOR VEHICLE

[75] Inventors: Kaoru Sawase, Okazaki; Keiji Isoda, Nagoya, both of Japan

[73] Assignee: Mitsubishi Jidosha Kogyo Kabushiki Kaisha, Tokyo, Japan

[21] Appl. No.: 982,614

[22] Filed: Nov. 27, 1992

[30] Foreign Application Priority Data

Nov. 29, 1991 [JP] Japan .................. 3-341925
Jun. 15, 1992 [JP] Japan .................. 4-155422

[51] Int. Cl.$^5$ ............................... F16H 1/44
[52] U.S. Cl. .................. 475/84; 475/199; 475/205
[58] Field of Search ......... 475/84, 86, 199, 205, 475/206, 223, 225

[56] References Cited

U.S. PATENT DOCUMENTS

| | | | |
|---|---|---|---|
| 675,620 | 6/1901 | Buffum | 475/205 |
| 1,377,380 | 5/1921 | Woodward . | |
| 1,382,289 | 6/1921 | Janicki | 475/205 X |
| 3,107,763 | 10/1963 | Hill | 475/84 X |
| 3,690,426 | 9/1972 | Weisgerber | 475/84 X |
| 4,973,296 | 11/1990 | Shibahata | 475/231 |

FOREIGN PATENT DOCUMENTS

| | | |
|---|---|---|
| 0274168 | 7/1988 | European Pat. Off. . |
| 3419149 | 11/1985 | Germany . |
| 213443A | 8/1989 | United Kingdom . |
| 92/00474 | 1/1992 | WIPO .................. 475/199 |

*Primary Examiner*—Dirk Wright

[57] ABSTRACT

Described is a drive power distribution control system for a vehicle, which is suitable for use in distributing drive power to a left and right drive wheels or to front or rear drive wheels or in distributing drive power by transfer of drive power between a left and right non-drive wheels. The system is provided, between a first output shaft and a second output shaft, with a differential casing to which drive power is inputted, a differential mechanism for transmitting the drive power to the shafts, and a drive power transmission control mechanism capable of controlling the distribution of the drive power to the respective shafts. The mechanism is interposed between the shafts and the casing and is constructed of a speed change mechanism capable of changing and outputting rotational speeds of the shafts and a drive power transmission mechanism capable of transmitting drive force between the casing and a second sun gear of the speed change mechanism.

61 Claims, 27 Drawing Sheets

DRIVE POWER DISTRIBUTION CONTROL SYSTEM FOR VEHICLE

BACKGROUND OF THE INVENTION

1) Field of the Invention

This invention relates to a drive power distribution control system for a vehicle, which is suitable for use in distributing drive power in an automotive vehicle, for example, in distributing drive power to a left and right drive wheels in a 4WD or 2WD automotive vehicle, in distributing drive power to front and rear drive wheels in a 4WD automotive vehicle, or in distributing drive power by transferring drive power between a left and right non-drive wheels (as opposed to drive wheels) in a 2WD automotive vehicle.

2) Description of the Related Art

In recent years, active developments are underway on 4WD automotive vehicles (hereinafter called "4WD vehicles"). Developments of automotive vehicles of the full-time four wheel drive system, which permit positive control of distribution of torque (drive power) between front and rear wheels, are carried out in various ways.

For such full-time 4WD vehicles, front/rear drive power distribution systems have been developed, which make it possible to control the distribution of drive torque (hereinafter called merely "distribution of torque" or "distribution of drive power") between front and rear drive wheels. The front/rear drive power distribution systems include, for example, a viscous coupling unit (VCU) and a hydraulic coupling unit (HCU).

In each of the aforementioned conventional front-/rear drive power distribution systems, however, the distribution of torque between the front and rear wheels is generally controlled by transmitting drive force from the side of the wheels rotating at a higher speed to the side of the wheels rotating at a lower speed to reduce a differential motion between the front and rear wheels when the differential motion occurs. This torque distribution control is however conducted corresponding to each differential motion in accordance with preset characteristics of the system, for example, corresponding to other control elements, so that it is not designed to positively control the distribution of torque.

For entire automotive vehicles not limited to 4WD vehicles but including 2WD vehicles, developments have been made on left/right drive power distribution control systems which control the distribution of torque to be transmitted to a left and right wheels, respectively.

If such left/right drive power distribution control systems are taken in broad sense, conventional normal differentials and LSDs (limited slip differentials) including electronically-controlled LSDs may be contemplated. It is however to be noted that such conventional differentials do not positively distribute torque and cannot freely distribute torque to a left and right wheels at a desired ratio.

In parallel with torque distribution control systems between front and rear wheels, development of a system capable of controlling the distribution of torque between a left and right wheels is also desired. In this case, the control is directed not only to the distribution of torque between left and right drive wheels in a 4WD vehicle but also to the distribution of torque between a left and right drive wheels in a 2WD vehicle.

If the distribution of torque is taken in such broad sense that it covers not only the distribution of torque outputted from an engine but also the transmission of torque which takes place through transfer of drive power between a left and right axle portions, it may be contemplated to control the distribution of torque between a left and right non-drive wheels (as opposed to drive wheels) in a 2WD vehicle.

Neither the left non-drive wheel nor the right non-drive wheel receives drive power from the engine. If it is however possible to realize transfer of drive power from one of these non-drive wheels to the other, brake force can be developed on the side of the former non-drive wheel and drive power can be produced on the side of the latter non-drive wheel. Accordingly, it becomes possible to control the distribution of torque (including negative drive power, namely, brake force) between the left and right non-drive wheels.

Further, desired as such a drive power distribution control system for a vehicle is one that can perform the distribution of torque without inducing any large torque loss or energy loss.

SUMMARY OF THE INVENTION

The present invention has been completed in view of the problems described above. A first object of the present invention is therefore to make it possible to positively control the distribution of torque between front and rear wheels or the distribution of torque between a left and right wheels in an automotive vehicle without inducing any large torque loss or energy loss.

Further, a second object of the present invention is to permit transfer of torque between a left and right non-drive wheels without inducing a torque loss or energy loss so that drive torque (including brake torque) can be produced at the non-drive wheels while permitting positive control of the drive torque.

To achieve the above-described objects, the present invention has provided, in first to eighth aspects thereof, the following drive power distribution control systems:

In the first aspect of the present invention, there is provided a drive power distribution control system for a vehicle, said system being provided, between a first output shaft and a second output shaft in the vehicle, with:

input means to which drive power is inputted from an engine;

a differential mechanism for transmitting the drive power, which has been inputted from said input means, to the first output shaft and the second output shaft while permitting a differential motion between the first output shaft and the second output shaft; and a drive power transmission control mechanism capable of controlling the state of the transmission of the drive power to control the distribution of the drive power to the first output shaft and the second output shaft. The drive power force transmission control mechanism comprises:

a speed change mechanism constructed of a first gear fixed on the first output shaft or the second output shaft, a second gear rotatably provided in meshing engagement with the first gear, a third gear provided for integral rotation with the second gear and having teeth different in number from the second gear, and a fourth gear provided as output means in meshing engagement with the third gear and for rotation coaxially with the first gear relative to the first output shaft and the second output shaft; and a drive power transmission mechanism capable of transmitting drive power between said input means and said output means of the speed change mechanism.

The drive power transmission mechanism comprises, for example, a wet multiplate clutch.

The third gear may gave teeth greater in number than the second gear or the second gear may have teeth greater in number than the third gear.

The first output shaft and the second output shaft may be constructed as an axle for transmitting drive power to a left and right drive wheels.

Preferably, the speed change mechanism is set at such a speed change ratio that, even when the ratio in rotational speed of the first output shaft to the second output shaft becomes the greatest while the vehicle is cornering, the high/low relationship between a rotational speed on the side of said input means and that on the side of said output means of the speed change mechanism in the drive power transmission mechanism remains unchanged.

The first output shaft and the second output shaft may be constructed as a front-axle drive for transmitting drive power to the side of front wheels and as a rear-axle drive for transmitting drive power to the side of rear wheels, respectively.

The differential mechanism may be constructed of a bevel-gear differential.

The first gear and the fourth gear may each be constructed as a sun gear, and the second gear and the third gear may each be constructed as a planetary gear.

In the second aspect of the present invention, there is also provided a drive power distribution control system for a vehicle, said system being provided, between a first output shaft and a second output shaft in the vehicle, with:

input means to which drive power is inputted from an engine;

a differential mechanism for transmitting the drive power, which has been inputted from said input means, to the first output shaft and the second output shaft while permitting a differential motion between the first output shaft and the second output shaft; and a drive power transmission control mechanism capable of controlling the state of the transmission of the drive power to control the distribution of the drive power to the first output shaft and the second output shaft. The drive power force transmission control mechanism comprises:

a speed change mechanism constructed of a first gear rotatably supported on the first output shaft or the second output shaft, a second gear rotatably provided in meshing engagement with the first gear, a third gear provided for integral rotation with the second gear and having teeth different in number from the second gear, and a fourth gear provided in meshing engagement with the third gear and for rotation integrally with said input means and coaxially with the first gear; and a drive power transmission mechanism capable of transmitting drive power between output means of the speed change mechanism and the fist output shaft or the second output shaft.

The drive power transmission mechanism comprises, for example, a wet multiplate clutch.

The third gear may have teeth greater in number than the second gear or the second gear may have teeth greater in number than the third gear.

The first output shaft and the second output shaft may be constructed as an axle for transmitting drive power to a left and right drive wheels.

Preferably, the speed change mechanism is set at such a speed change ratio that, even when the ratio in rotational speed of the first output shaft to the second output shaft becomes the greatest while the vehicle is cornering, the high/low relationship between a rotational speed on the side of said output means and that on the side of the first output shaft or the second output shaft in the drive power transmission mechanism remains unchanged.

The first output shaft and the second output shaft may be constructed as a front-axle drive for transmitting drive power to the side of front wheels and as a rear-axle drive for transmitting drive power to the side of rear wheels, respectively.

The differential mechanism may be constructed of a bevel-gear differential.

The first gear and the fourth gear may each be constructed as a sun gear, and the second gear and the third gear may each be constructed as a planetary gear.

In the third aspect of the present invention, there is also provided a drive power distribution control system for a vehicle, said system being provided, between a first output shaft and a second output shaft in the vehicle, with:

input means to which drive power is inputted from an engine;

a differential mechanism for transmitting the drive power, which has been inputted from said input means, to the first output shaft and the second output shaft while permitting a differential motion between the first output shaft and the second output shaft; and a drive power transmission control mechanism capable of controlling the state of the transmission of the drive power to control the distribution of the drive power to the first output shaft and the second output shaft. The drive power force transmission control mechanism comprises:

a speed change mechanism constructed of a sun gear fixed on the first output shaft or the second output shaft, a ring gear fixed on a stationary member, and a planetary gear provided in meshing engagement with the sun gear and the ring gear and rotatably supported on a carrier; and a drive power transmission mechanism capable of transmitting drive power between said input means and output means of the speed change mechanism.

The drive power transmission mechanism comprises, for example, a wet multiplate clutch.

The first output shaft and the second output shaft may be constructed as an axle for transmitting drive power to a left and right drive wheels.

Preferably, the speed change mechanism is set at such a speed change ratio that, even when the ratio in rotational speed of the first output shaft to the second output shaft becomes the greatest while the vehicle is cornering, the high/low relationship between a rotational speed on the side of said input means and that on the side of said output means of the speed change mechanism in the drive power transmission mechanism remains unchanged.

The first output shaft and the second output shaft may be constructed as a front-axle drive for transmitting drive power to the side of front wheels and as a rear-axle drive for transmitting drive power to the side of rear wheels, respectively.

The differential mechanism may be constructed of a bevel-gear differential.

In the fourth aspect of the present invention, there is also provided a drive power distribution control system for a vehicle, said system being provided, between a first output shaft and a second output shaft in the vehicle, with:

input means to which drive power is inputted from an engine;

a differential mechanism for transmitting the drive power, which has been inputted from said input means, to the first output shaft and the second output shaft while permitting a differential motion between the first output shaft and the second output shaft; and a drive power transmission control mechanism capable of controlling the state of the transmission of the drive power to control the distribution of the drive power to the first output shaft and the second output shaft. The drive power force transmission control mechanism comprises:

a speed change mechanism constructed of a sun gear rotatably supported on the first output shaft or the second output shaft, a ring gear fixed on a stationary member, and a carrier supported for rotation integrally with said input means, and a planetary gear provided in meshing engagement with the sun gear and the ring gear and rotatably supported on the carrier; and a drive power transmission mechanism capable of transmitting drive power between output means of the speed change mechanism and the first output shaft or the second output shaft.

The drive power transmission mechanism comprises, for example, a wet multiplate clutch.

The first output shaft and the second output shaft may be constructed as an axle for transmitting drive power to a left and right drive wheels.

Preferably, the speed change mechanism is set at such a speed change ratio that, even when the ratio in rotational speed of the first output shaft to the second output shaft becomes the greatest while the vehicle is cornering, the high/low relationship between a rotational speed on the side of output means and that on the side of the first output shaft or the second output shaft in the drive power transmission mechanism remains unchanged.

The first output shaft and the second output shaft may be constructed as a front-axle drive for transmitting drive power to the side of front wheels and as a rear-axle drive for transmitting drive power to the side of rear wheels, respectively.

The differential mechanism may be constructed of a bevel-gear differential.

In the fifth aspect of the present invention, there is also provided a drive power distribution control system for a vehicle, said system being provided, between a first output shaft and a second output shaft in the vehicle, with a drive power transmission control mechanism capable of transferring drive power between the output shafts to control drive power of the output shafts. The drive power transmission control mechanism comprises:

a speed change mechanism connected to one of the first output shaft and the second output shaft so that a rotational speed on the side of said one output shaft can be changed; and a drive power transmission mechanism interposed between output means of the speed change mechanism and the other one of the first output shaft and the second output shaft so that drive power can be transmitted between both the output shafts upon engagement.

The speed change mechanism comprises, for example:

a first gear fixed on the first output shaft or the second output shaft;

a second gear arranged for rotation in meshing engagement with the first gear;

a third gear arranged for integral rotation with the second gear and having teeth different in number from the second gear; and a fourth gear arranged for meshing engagement with the third gear and for rotation coaxially with the first gear relative to the first output shaft and the second output shaft.

The drive power transmission mechanism comprises, for example, a wet multiplate clutch.

The first output shaft and the second output shaft may be constructed as an axle for transmitting drive power to a left and right drive wheels.

The first output shaft and the second output shaft may be constructed as rotary shafts for transferring drive power between non-drive wheels.

Preferably, the speed change mechanism is set at such a speed change ratio that, even when the ratio in rotational speed of the first output shaft to the second output shaft becomes the greatest while the vehicle is cornering, the high/low relationship between a rotational speed on the side of output means of the speed change mechanism and that on the side of the other one of the first output shaft and the second output shaft in the drive power transmission mechanism remains unchanged.

The first gear and the fourth gear may each be constructed as a sun gear, and the second gear and the third gear may each be constructed as a planetary gear.

In the sixth aspect of the present invention, there is also provided a drive power distribution control system for a vehicle, said system being provided, between a first output shaft and a second output shaft in the vehicle, with a drive power transmission control mechanism capable of transferring drive power between the output shafts to control drive power of the output shafts. The drive power transmission control mechanism comprises:

a first speed change mechanism connected to the side of the first output shaft so that a rotational speed of the first output shaft can be changed;

a first drive power transmission mechanism interposed between output means of the first speed change mechanism and the side of the second output shaft so that drive power can be transmitted between both the output shafts upon engagement;

a second speed change mechanism connected to the side of the second output shaft so that a rotational speed of the second output shaft can be changed; and a second drive power transmission mechanism interposed between output means of the second speed change mechanism and the side of the first output shaft so that drive power can be transmitted between both the output shafts upon engagement;

The first speed change mechanism and the second speed change mechanism comprise, for example:

a first gear fixed on the first output shaft or the second output shaft;

a second gear arranged for rotation in meshing engagement with the first gear;

a third gear arranged for integral rotation with the second gear and having teeth different in number from the second gear; and a fourth gear arranged for meshing engagement with the third gear and for rotation coaxially with the first gear relative to the first output shaft and the second output shaft.

The drive power transmission mechanism comprises, for example, a wet multiplate clutch.

The first output shaft and the second output shaft may be constructed as an axle for transmitting drive power to a left and right drive wheels.

The first output shaft and the second output shaft may be constructed as rotary shafts for transferring drive power between non-drive wheels.

Preferably, the speed change mechanism is set at such a speed change ratio that, even when the ratio in rotational speed of the first output shaft to the second output shaft becomes the greatest while the vehicle is cornering, the high/low relationship between a rotational speed on the side of output means in the speed change mechanism and that on the side of the other one of the first output shaft and the second output shaft in the drive power transmission mechanism remains unchanged.

The first gear and the fourth gear may each be constructed as a sun gear, and the second gear and the third gear may each be constructed as a planetary gear.

In the seventh aspect of the present invention, there is also provided a drive power distribution control system for a vehicle, said system being provided, between a first output shaft and a second output shaft in the vehicle, with a drive power transmission control mechanism capable of transferring drive power between the output shafts to control drive power of the output shafts. The drive power transmission control mechanism comprises:

a speed change mechanism connected to the side of one of the first output shaft and the second output shaft so that a rotational speed of said one output shaft can be accelerated or decelerated and then outputted;

a change-over mechanism attached to the speed change mechanism so that the speed change mechanism can be changed over to an acceleration or deceleration side; and a drive power transmission mechanism interposed between output means of the speed change mechanism and the side of the other one of the first output shaft and the second output shaft so that drive power can be transmitted between both the output shafts upon engagement.

The speed change mechanism comprises, for example:

a first gear arranged for association with the first output shaft or the second output shaft via the change-over mechanism;

a second gear arranged for rotation in meshing engagement with the first gear;

a third gear arranged for integral rotation with the second gear and having teeth different in number from the second gear;

a fourth gear arranged for meshing engagement with the third gear and for rotation coaxially with the first gear relative to the first output shaft and the second output shaft;

a fifth gear arranged for association with the first output shaft or the second output shaft via the change-over mechanism; and a sixth gear arranged for rotation integrally with the second gear and the third gear and in meshing engagement with the fifth gear and having teeth different in number from the second gear and the third gear.

The speed change mechanism comprises, for example:

a first gear fixed on the first output shaft or the second output shaft;

a second gear arranged for rotation in meshing engagement with the first gear;

a third gear arranged for integral and coaxial rotation with the second gear via the change-over mechanism and having teeth different in number from the second gear;

a fourth gear arranged for meshing engagement with the third gear and for rotation coaxially with the first gear relative to the first output shaft and the second output shaft;

a fifth gear fixed together with the first gear on the first output shaft or the second output shaft; and a sixth gear arranged for rotation integrally with the third gear via the change-over mechanism and in meshing engagement with the fifth gear and having teeth different in number from the second gear and the third gear.

The drive power transmission mechanism comprises, for example, a wet multiplate clutch.

The first output shaft and the second output shaft may be constructed as an axle for transmitting drive power to a left and right drive wheels.

The first output shaft and the second output shaft may each be constructed as an output shaft for transmitting drive power to a drive wheel which is rotated while being applied with an engine output.

The first output shaft and the second output shaft may each be constructed as an output shaft for transferring drive power between non-drive wheels which are not applied with any engine output.

The speed change mechanism may be set at such a speed change ratio that, even when the ratio in rotational speed of the first output shaft to the second output shaft becomes the greatest while the vehicle is cornering, the high/low relationship between a rotational speed on the side of output means in the speed change mechanism and that on the side of the other one of the first output shaft and the second output shaft in the drive power transmission mechanism remains unchanged.

The first output shaft and the second output shaft may be constructed as a front-axle drive for transmitting drive power to the side of front wheels and as a rear-axle drive for transmitting drive power to the side of rear wheels, respectively.

In the eight aspect of the present invention, there is also provided a drive power distribution control system for a vehicle, said system being provided, between a first output shaft and a second output shaft in the vehicle, with a drive power transmission control mechanism capable of transferring drive power between the output shafts to control drive power of the output shafts. The drive power transmission control mechanism comprises:

a speed change mechanism connected to the side of one of the first output shaft and the second output shaft so that a rotational speed of said one output shaft can be accelerated or decelerated and then outputted; and a drive power transmission mechanism interposed between output means of the speed change mechanism and the other one of the first output shaft and the second output shaft so that drive power can be transmitted between both the output shafts upon engagement.

The speed change mechanism comprises, for example:

a first gear fixed on the first output shaft or the second output shaft;

a second gear arranged for rotation in meshing engagement with the first gear;

a third gear arranged for rotation integrally with the second gear and having teeth different in number from the second gear;

a fourth gear arranged for meshing engagement with the third gear and for rotation coaxially with the first gear relative to the first output shaft and the second output shaft;

a fifth gear arranged for rotation integrally with the second gear and the third gear and having teeth different in number from the second gear and the third gear; and a sixth gear arranged in meshing engagement with the fifth gear and for rotation relative to the first output shaft and the second output shaft coaxially with the first gear.

The drive power transmission mechanism comprises, for example, a wet multiplate clutch.

The first output shaft and the second output shaft may be constructed as an axle for transmitting drive power to a left and right drive wheels.

The first output shaft and the second output shaft may each be constructed as an output shaft for transmitting drive power to a drive wheel which is rotated while being applied with an engine output.

The first output shaft and the second output shaft may each be constructed as an output shaft for transferring drive power between non-drive wheels which are not applied with any engine output.

Preferably, the speed change mechanism is set at such a speed change ratio that, even when the ratio in rotational speed of the first output shaft to the second output shaft becomes the greatest while the vehicle is cornering, the high/low relationship between a rotational speed on the side of output means of the speed change mechanism in the drive power transmission mechanism and that on the side of the other one of the first output shaft and the second output shaft in the drive power transmission mechanism remains unchanged.

The first output shaft and the second output shaft may be constructed as a front-axle drive for transmitting drive power to the side of front wheels and as a rear-axle drive for transmitting drive power to the side of rear wheels, respectively.

Figure 20:
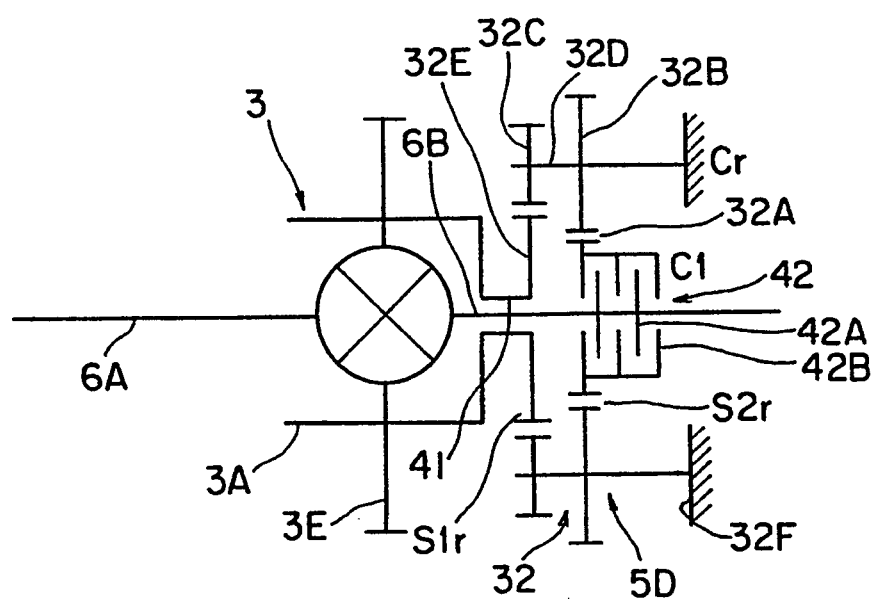
Figure 21:
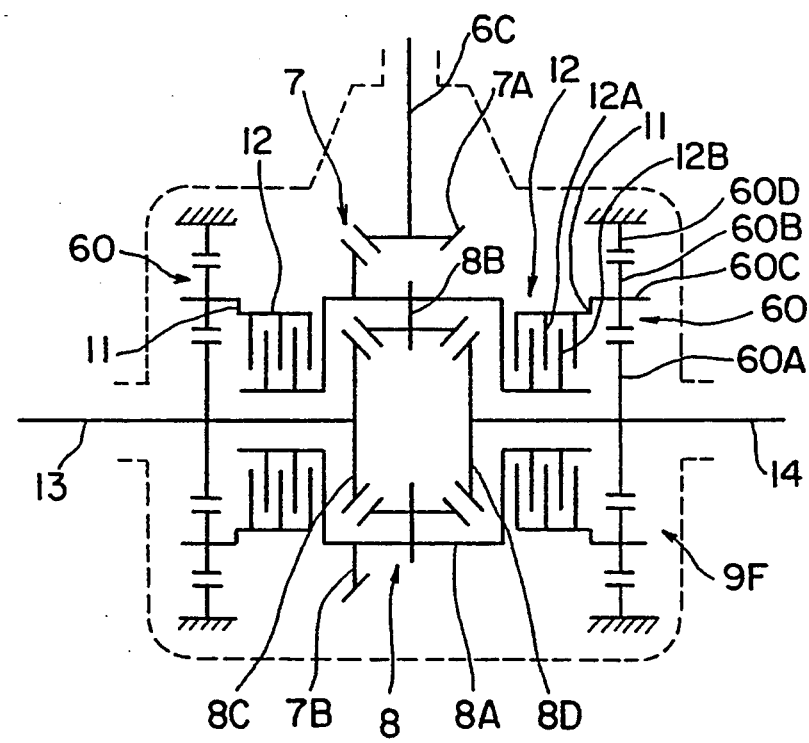
Figure 22:
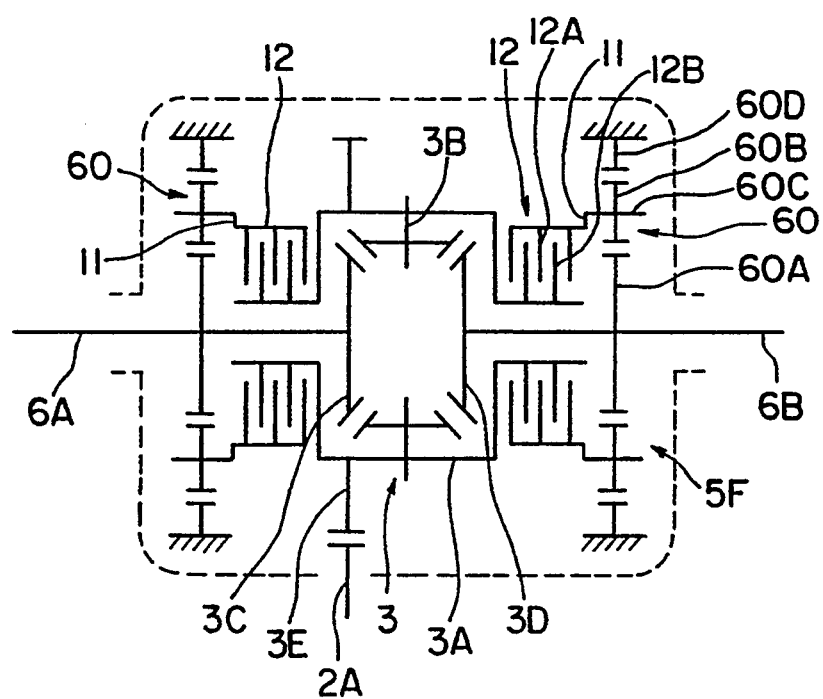
Figure 23:
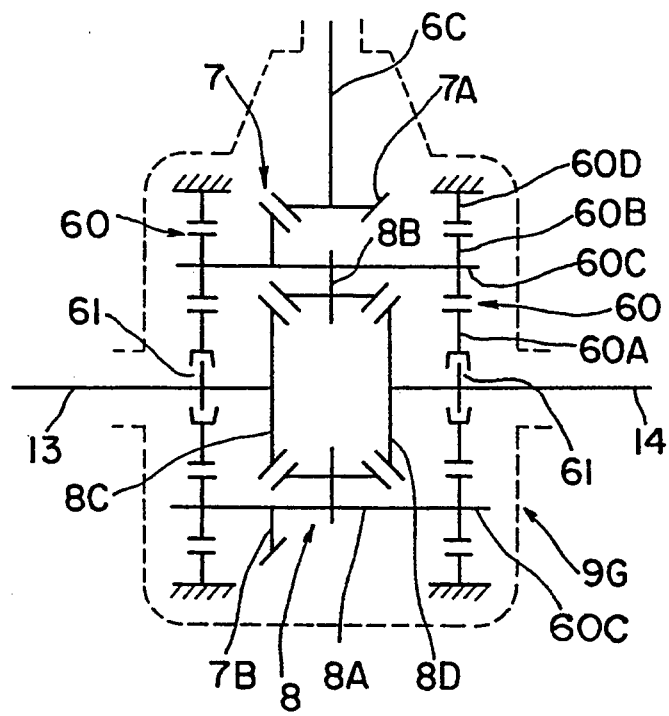
Figure 24:
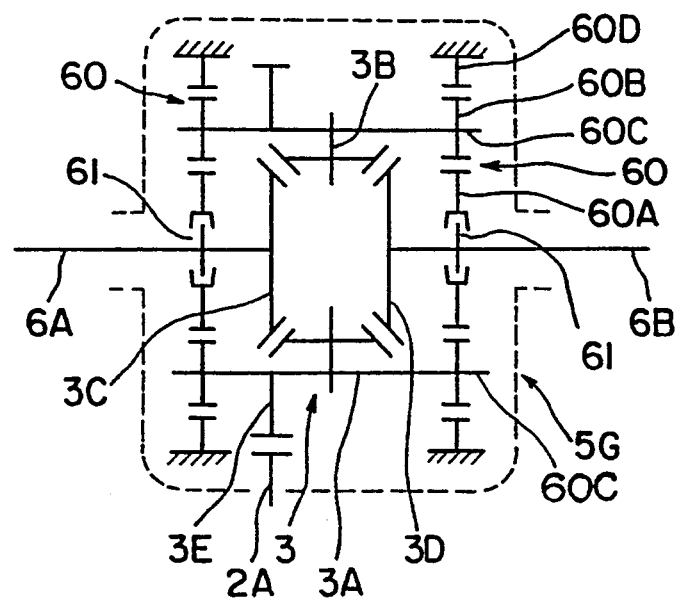
Figure 25:
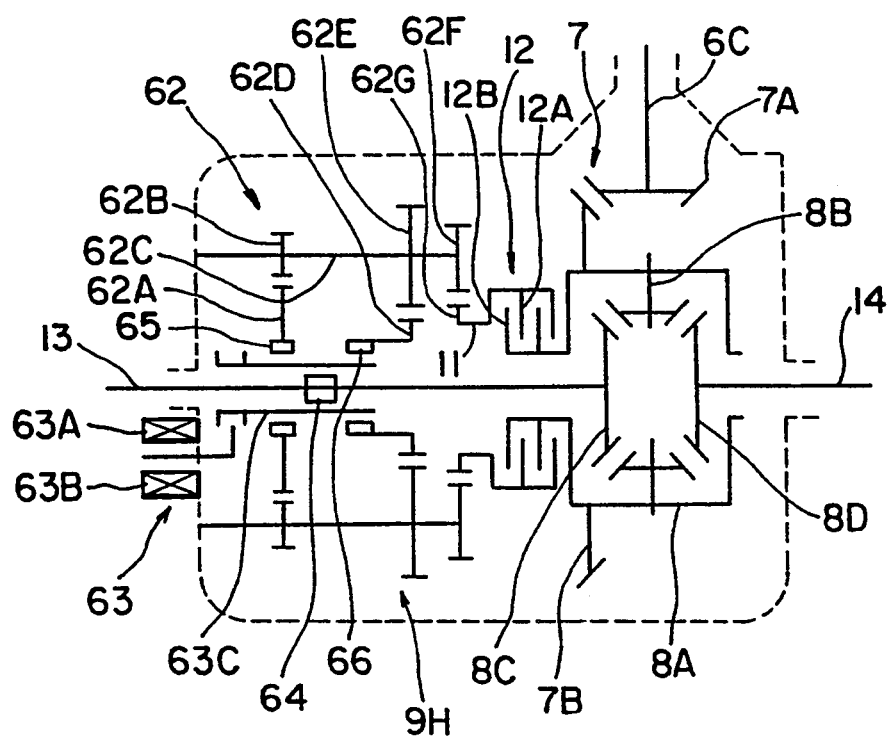
Figure 26:
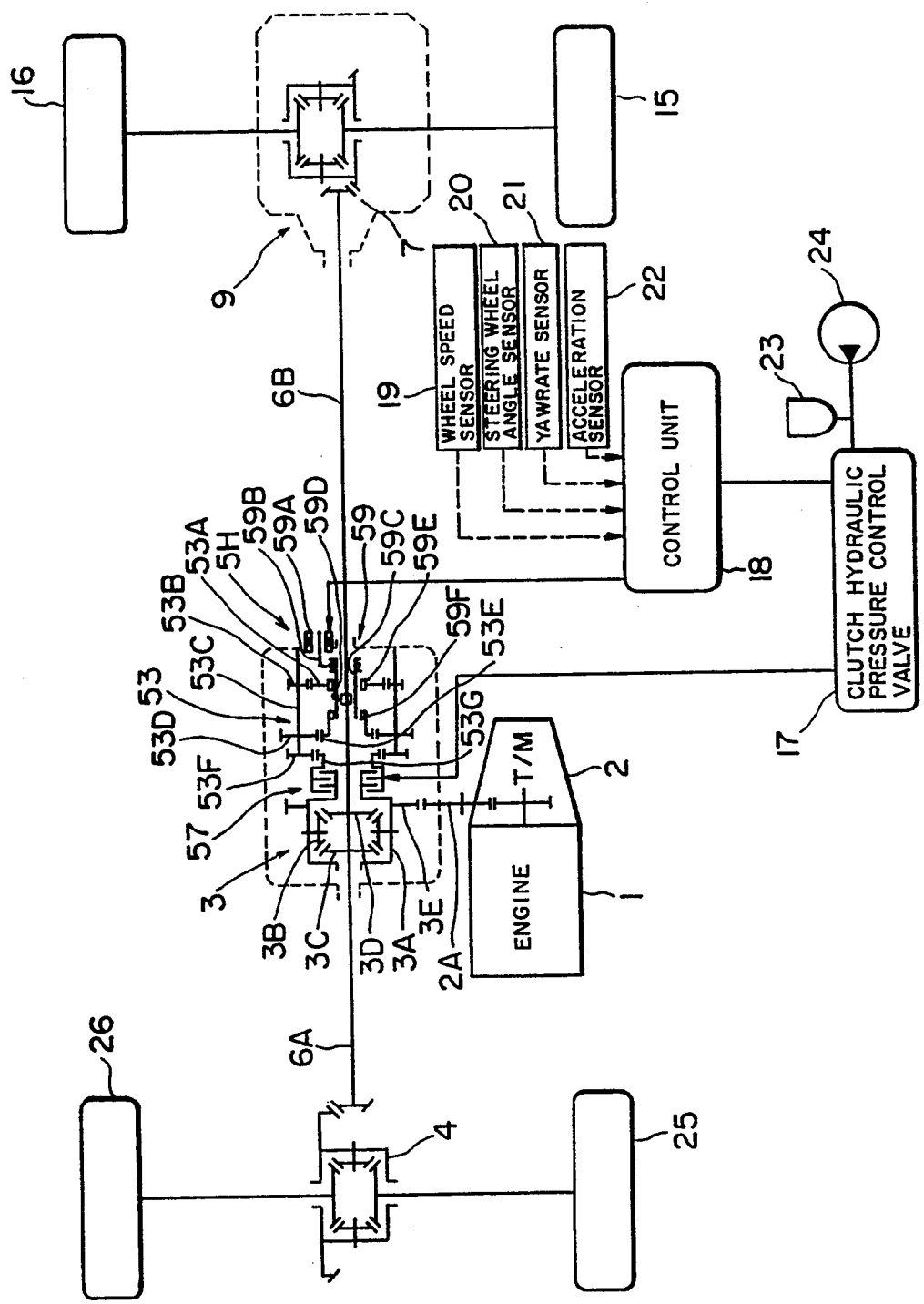
Figure 27:
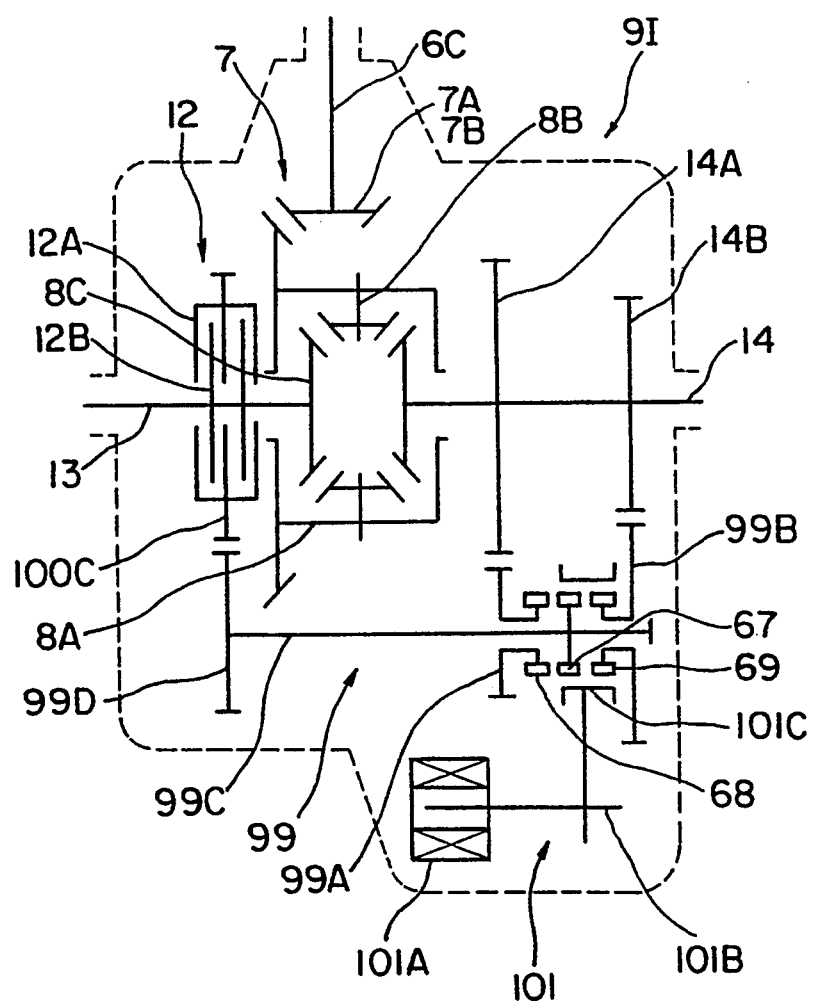
Figure 28:
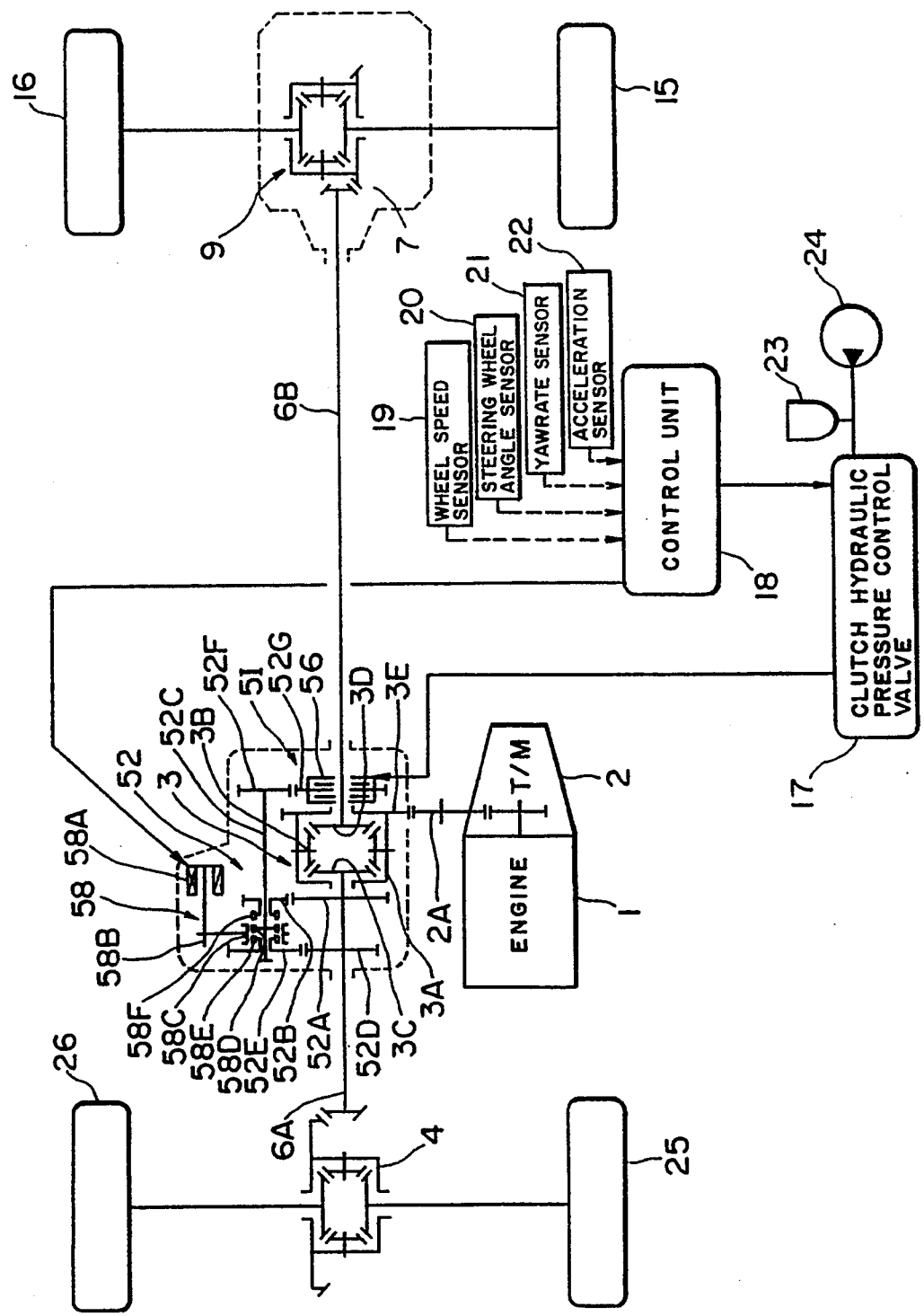
Figure 29:
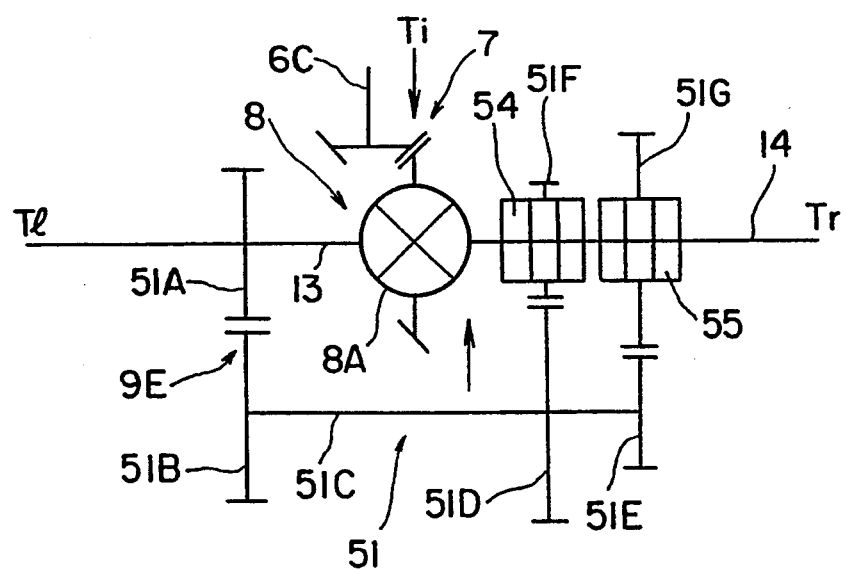
Figure 30:
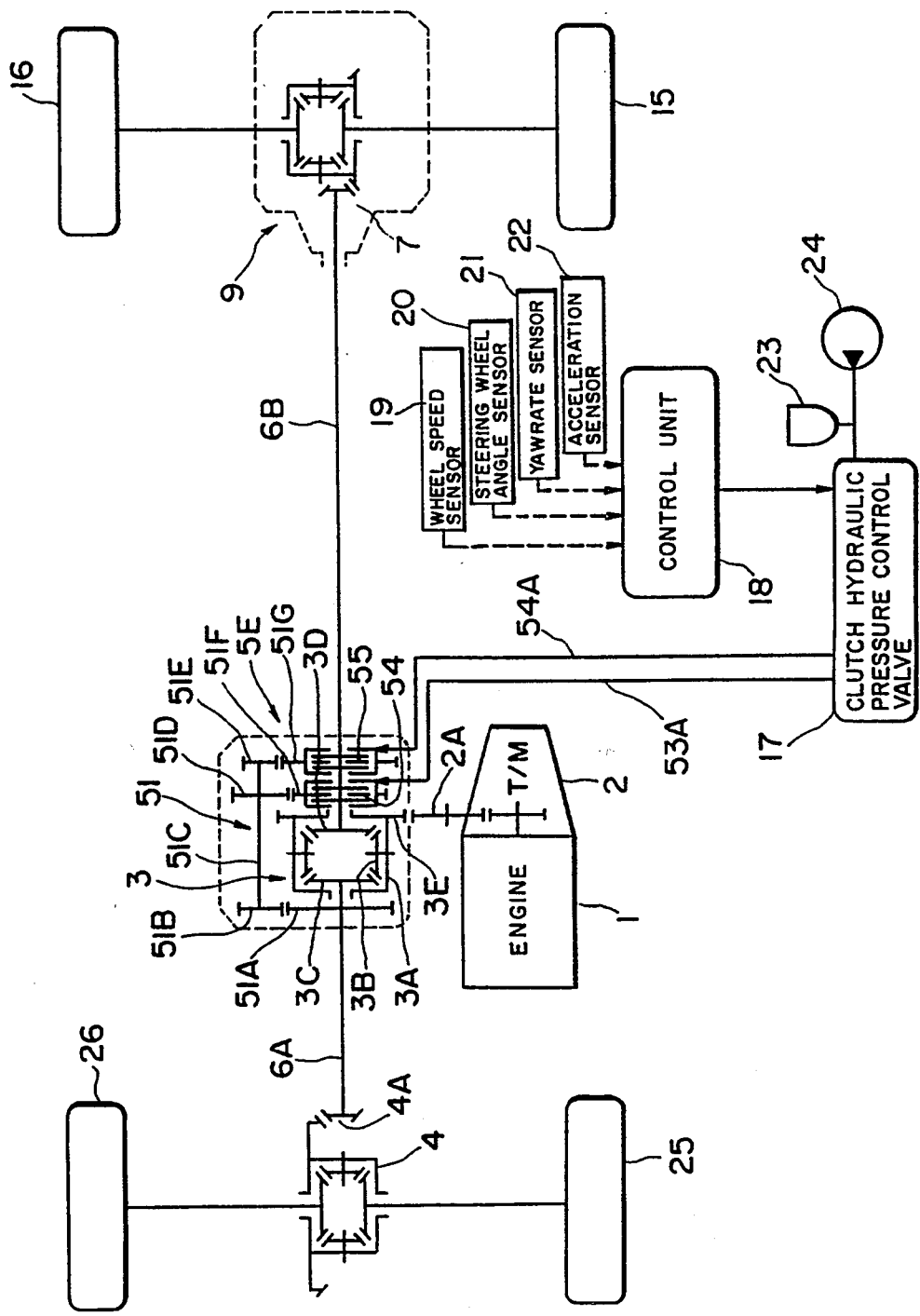
Figure 31:
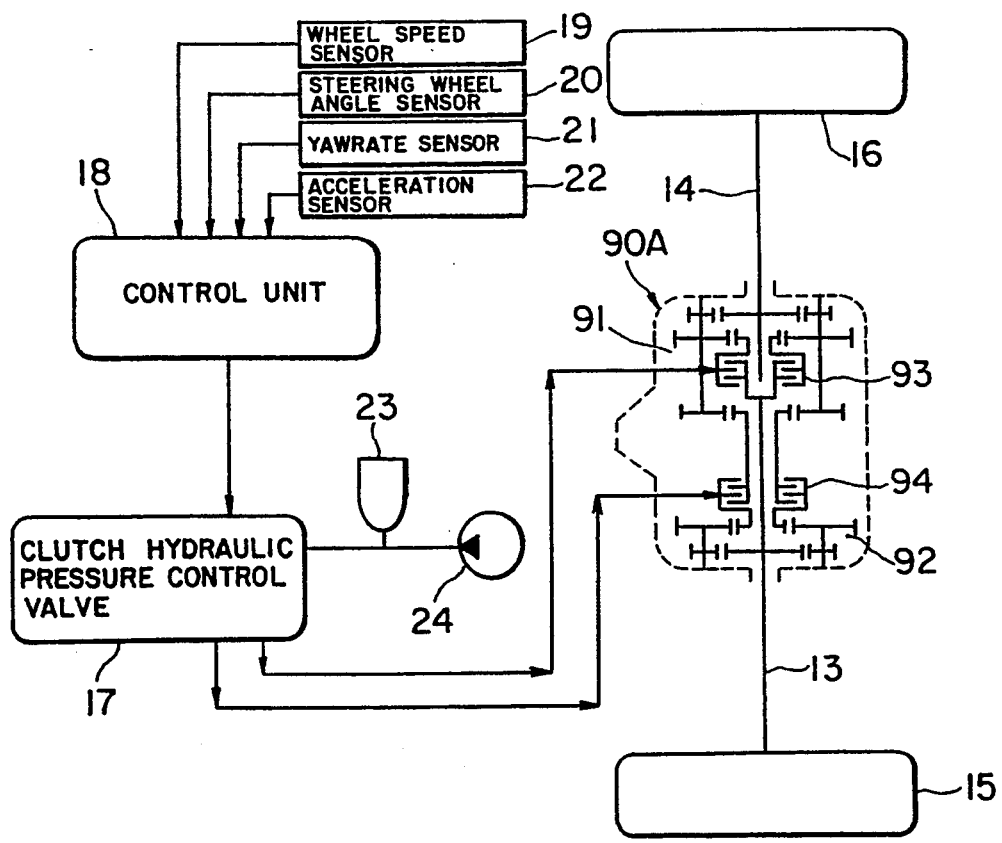
Figure 32:
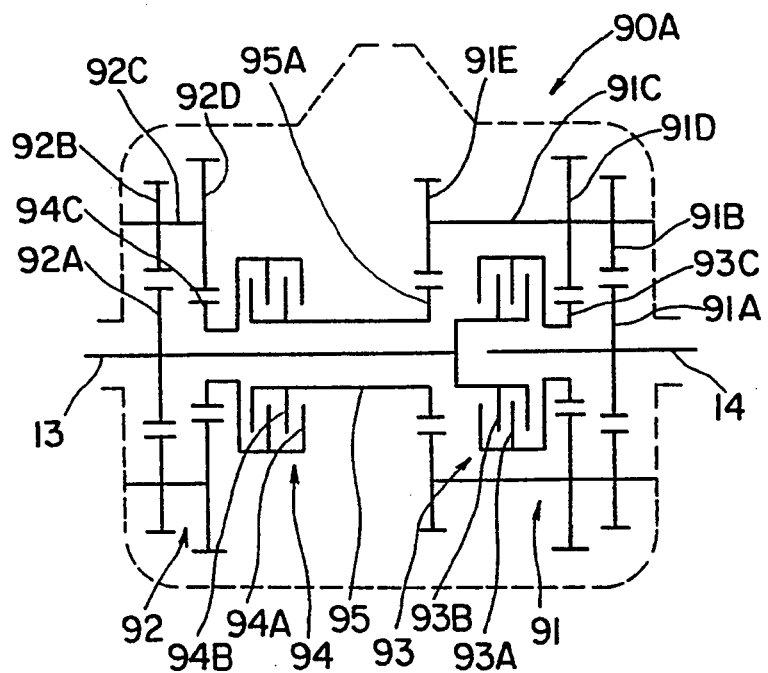
Figure 33:
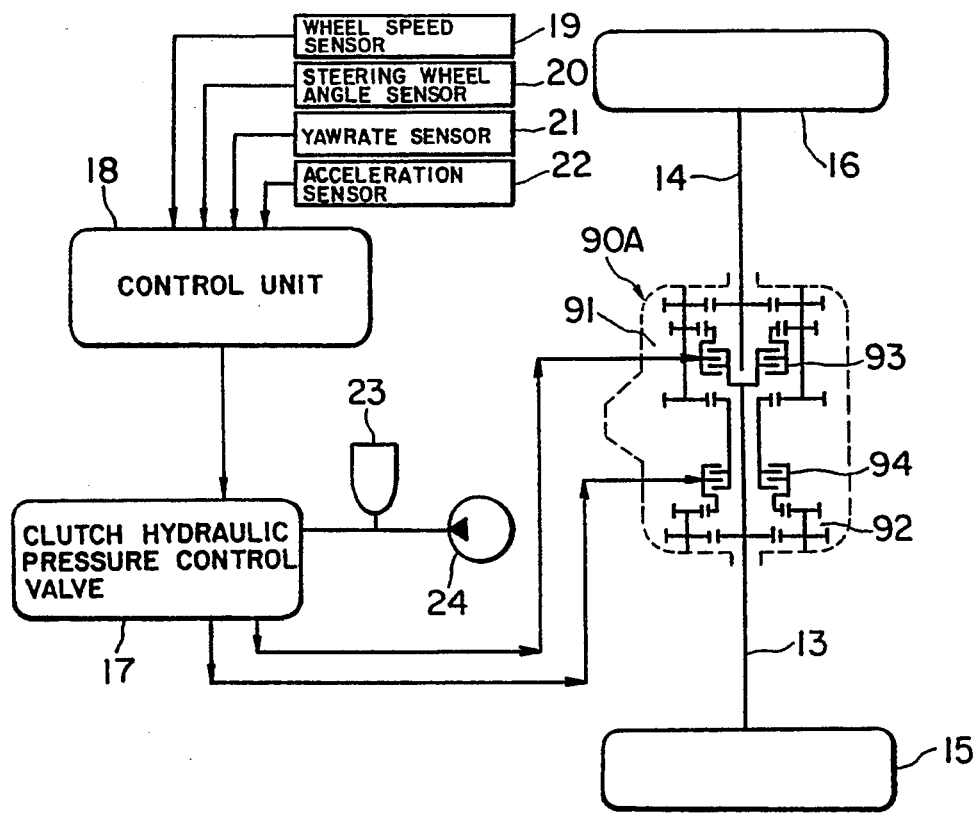
Figure 34:
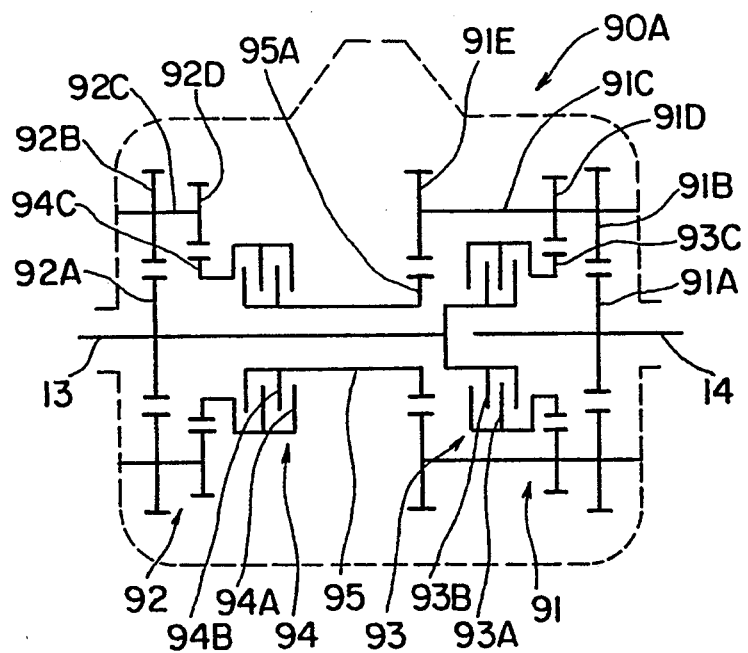
Figure 35:
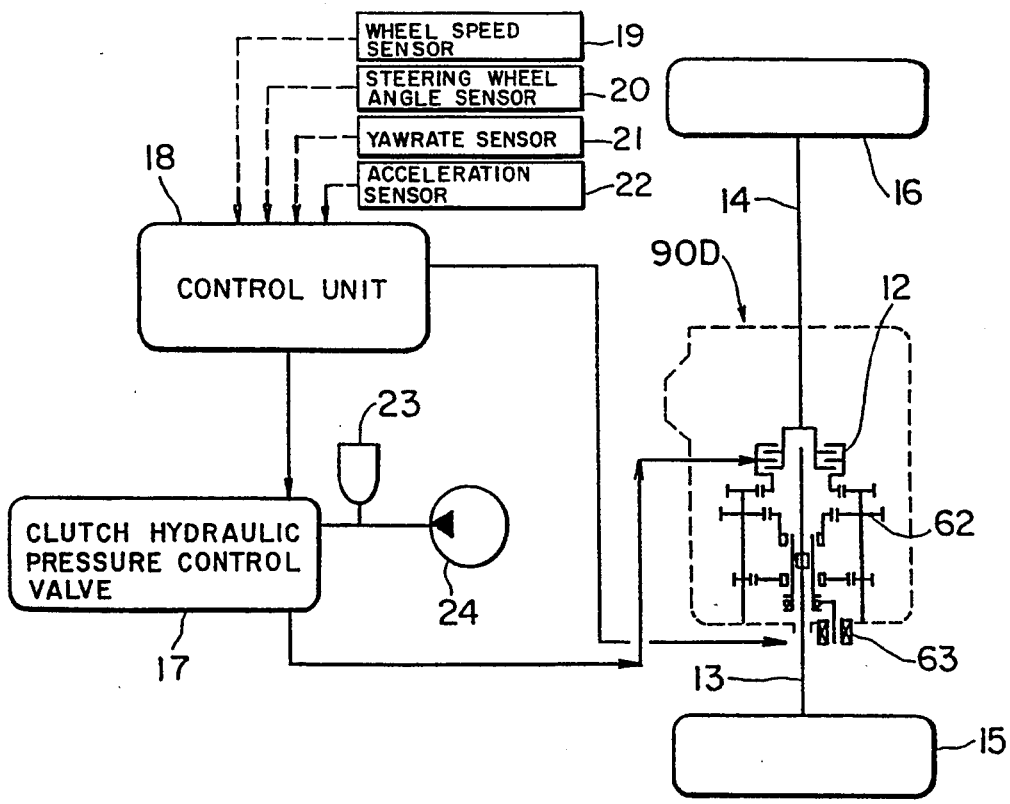
Figure 36:
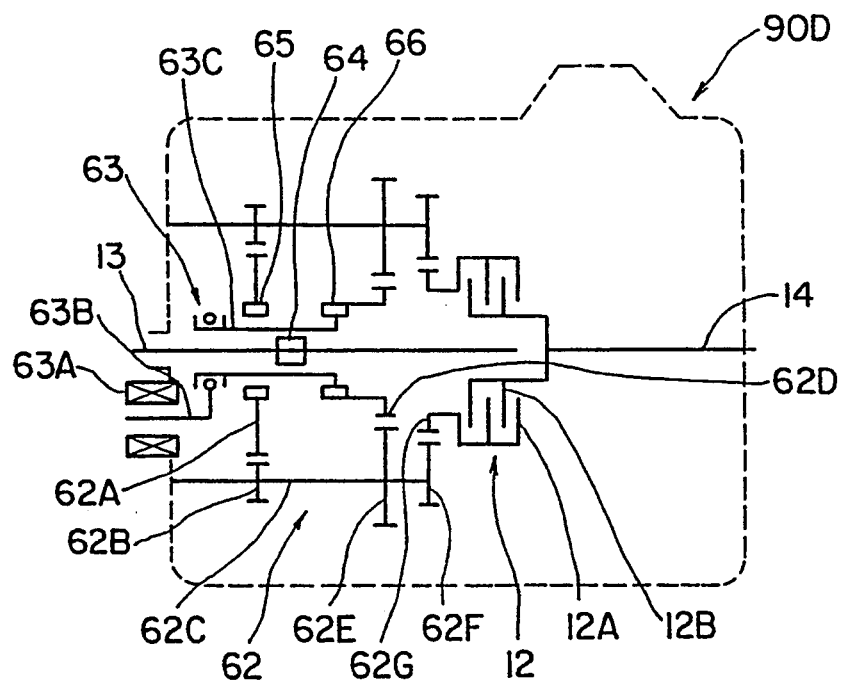
Figure 37:
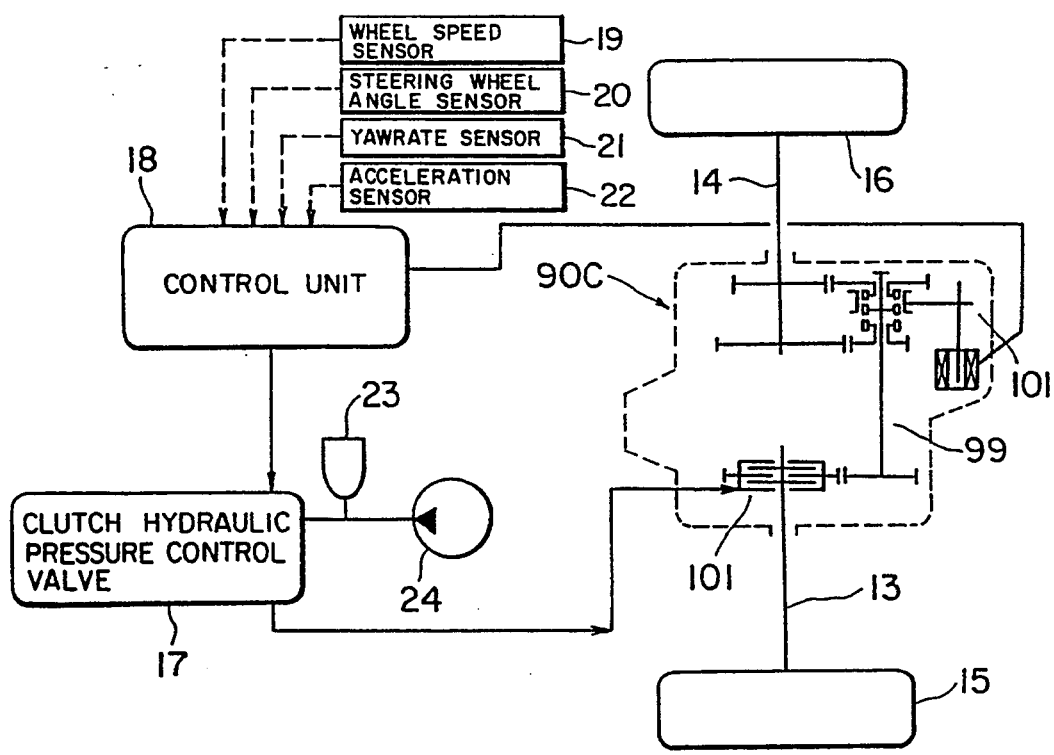
Figure 38:
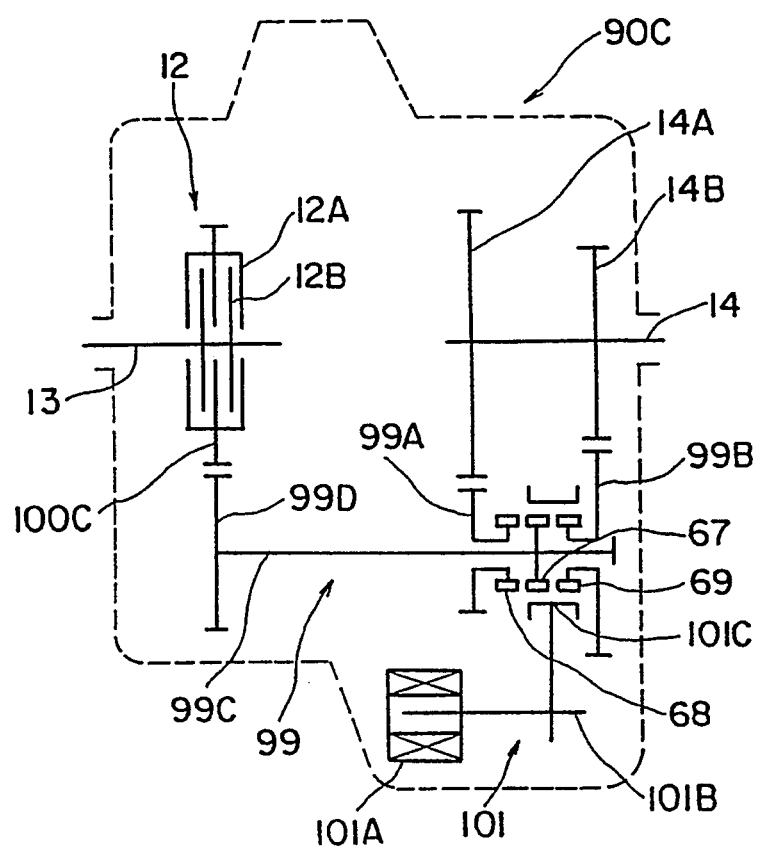
Figure 39:
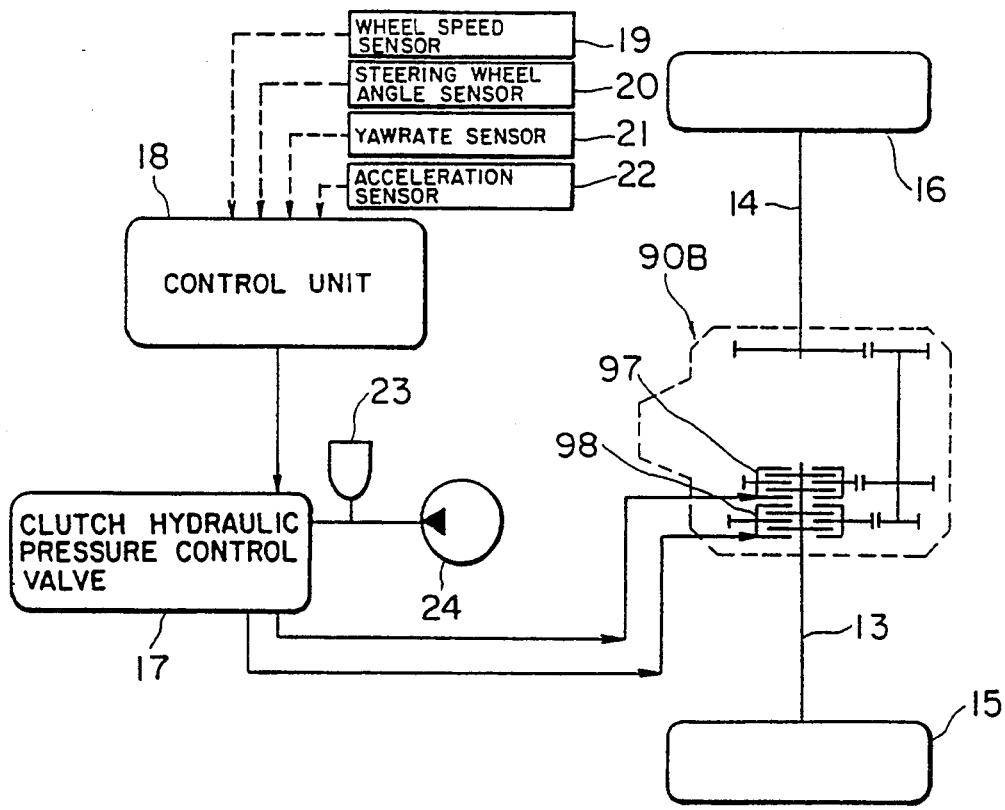
Figure 40:
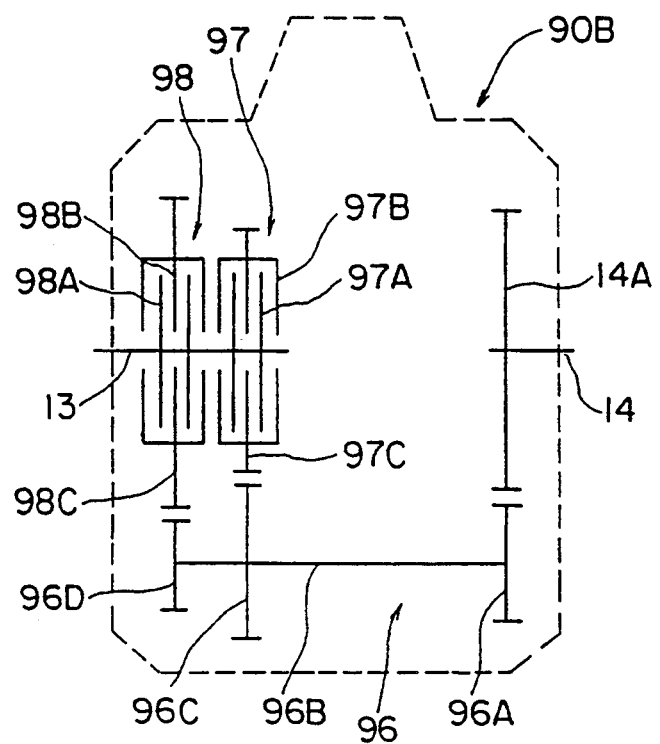

FIG, 13 is a schematic fragmentary power train diagram of the drive power distribution control system for a vehicle as a fifth embodiment of the present invention;

FIG, 14 is a velocity diagram of transmission of torque by the drive power distribution control system as the fifth embodiment of the present invention;

FIG, 15 is a velocity diagram of one example of transmission of torque by the drive power distribution control system as the fifth embodiment of the present invention;

FIG, 16 is a schematic fragmentary power train diagram of a drive power distribution control system for a vehicle as a sixth embodiment of the present invention;

FIG, 17 is a schematic fragmentary power train diagram of a drive power distribution control system for a vehicle as a seventh embodiment of the present invention;

FIG, 18 is a velocity diagram of transmission of torque by the drive power distribution control system as the seventh embodiment of the present invention;

FIG, 19 is a velocity diagram of one example of transmission of torque by the drive power distribution control system as the seventh embodiment of the present invention;

FIG. 20 is a schematic fragmentary power train diagram of a drive power distribution control system for a vehicle as an eighth embodiment of the present invention;

FIG. 21 is a schematic fragmentary power train diagram of a drive power distribution control system for a vehicle as a ninth embodiment of the present invention;

FIG. 22 is a schematic fragmentary power train diagram of a drive power distribution control system for a vehicle as a tenth embodiment of the present invention;

FIG. 23 is a schematic fragmentary power train diagram of a drive power distribution control system for a vehicle as an eleventh embodiment of the present invention;

FIG. 24 is a schematic fragmentary power train diagram of a drive power distribution control system for a vehicle as a twelfth embodiment of the present invention;

FIG. 25 is a schematic fragmentary power train diagram of a drive power distribution control system for a vehicle as a thirteenth embodiment of the present invention;

FIG. 26 is a simplified schematic block diagram of a drive system of an automotive vehicle equipped with a drive power distribution control system as a fourteenth embodiment of the present invention;

FIG. 27 is a schematic fragmentary power train diagram of a drive power distribution control system for a vehicle as a fifteenth embodiment of the present invention;

FIG. 28 is a simplified schematic block diagram 10 of a drive system of an automotive vehicle equipped with a drive power distribution control system according to a sixteenth embodiment of the present invention;

FIG. 29 is a schematic fragmentary power train diagram of a drive power distribution control system for a vehicle as a seventeenth embodiment of the present invention;

FIG. 30 is a simplified schematic block diagram of a drive system of an automotive vehicle equipped with a drive power distribution control system according to an eighteenth embodiment of the present invention;

FIG. 31 is a simplified schematic overall block diagram of a drive power distribution control system for a vehicle as a nineteenth embodiment of the present invention;

FIG. 32 is a schematic fragmentary power train diagram of the drive power distribution control system as the nineteenth embodiment of the present invention;

FIG. 33 is a simplified schematic overall block diagram of a drive power distribution control system for a vehicle as a twentieth embodiment of the present invention;

FIG. 34 is a schematic fragmentary power train diagram of the drive power distribution control system as the twentieth embodiment of the present invention;

FIG. 35 is a simplified schematic overall block diagram of a drive power distribution control system for a vehicle as a twenty-first embodiment of the present invention;

FIG. 36 is a schematic fragmentary power train diagram of the drive power distribution control system as the twenty-first embodiment of the present invention;

FIG. 37 is a simplified schematic overall block diagram of a drive power distribution control system for a vehicle as a twenty-second embodiment of the present invention;

FIG. 38 is a schematic fragmentary power train diagram of the drive power distribution control system as the twenty-second embodiment of the present invention;

FIG. 39 is a simplified schematic overall block diagram of a drive power distribution control system for a vehicle as a twenty-third embodiment of the present invention; and FIG. 40 is a schematic fragmentary power train diagram of the drive power distribution control system as the twenty-third embodiment of the present invention.

DETAILED DESCRIPTION OF THE PREFERRED EMBODIMENTS

The embodiments of the present invention will hereinafter be described with reference to the accompanying drawings.

Figure 2:
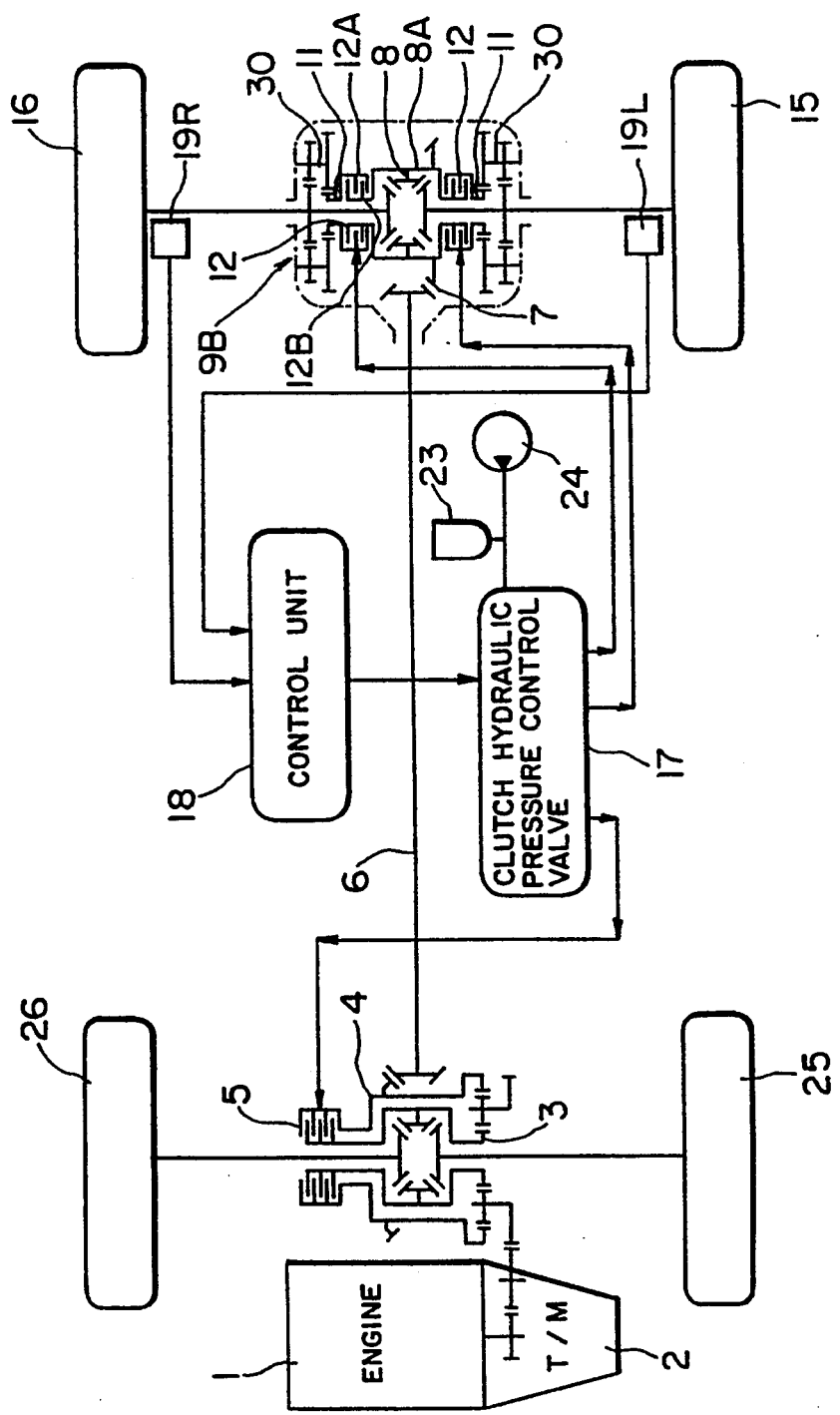
FIG. 2 is a simplified schematic block diagram of a drive system of an automotive vehicle equipped with the drive power distribution control system according to the first embodiment of the present invention.

Among the various embodiments to be described below, the first to fourth embodiments relate to the drive power distribution control system according to the first aspect of the present invention, the fifth to eighth embodiments to the drive power distribution control system according to the second the present invention, the ninth and tenth embodiments to the drive power distribution control system according to the third the present invention, the eleventh and twelfth embodiments to the drive power distribution control system according to the fourth the present invention, the thirteenth to sixteenth, twenty-fist and twenty second embodiments to the drive power distribution control system according to the seventh embodiment of the present invention, the seventeenth, eighteenth and twenty-third embodiments to the drive power distribution control system according to the eighth the present invention, and the nineteenth and twentieth embodiments to the drive power distribution control system according to the fifth and sixth embodiments of the present invention, The drive power distribution control system according to the first embodiment will be described first. In the first embodiment, a drive system of an automotive vehicle, said drive system being equipped with the drive power distribution control system, is constructed in such a manner that, as shown in FIG. 2, drive power from an engine 1 is received at a central differential 3, which is constructed of planetary gears, via a transmission 2 and is then transmitted to the front wheel side and the rear wheel side from the central differential 3.

In particular, the central differential 3 is provided with a differential limiting mechanism 5 which can suitably limit a differential motion between the front and rear wheels. The differential limiting mechanism 5 is constructed of a hydraulic multiplate clutch in this embodiment and can control the distribution of drive power to the front and rear wheels while limiting the differential motion between the front and rear wheels in accordance with a hydraulic pressure supplied. It is a device which controls the distribution of drive power between the front and rear wheels.

One of drive power fractions distributed from the central differential 3 as described above is transmitted to a left and right front wheels 25,26 through a front differential 4. On the other hand, the other fraction of the drive power, also distributed from the central differential 3, is transmitted to a rear differential 8 via a drive shaft 6 and further to left and right rear wheels 15,16 via the differential 8. Numeral 7 indicates a bevel-gear mechanism which is formed of a drive pinion and a ring gear.

Arranged at the rear differential 8 is a drive power transmission control mechanism 9B (numeral 9 will hereinafter be used whenever the drive power transmission control mechanism is referred to in broad sense) which is constructed of a speed change mechanism 30 and a multiplate clutch mechanism 12 as a torque transmission mechanism of the variable transmission capacity control type (or a torque transmission mechanism). The rear differential (differential mechanism) 8 and the drive power transmission control mechanism 9B, in combination, make up a drive power distribution control system for the vehicle. Although a bevel-gear differential is used as the differential mechanism 8 in the illustrated embodiment, no particular limitation is imposed on the differential mechanism 8 insofar as drive power inputted from an engine can be transmitted to two drive shafts while permitting a differential motion therebetween. It is of course possible to apply another differential mechanism known in the art, for example, a differential mechanism constructed of a gear mechanism, for example, a compound planetary gear or a roller mechanism. The multiplate clutch mechanism 12 is of the hydraulic type so that the distribution of drive power to the left and right rear wheels can be controlled by adjusting its hydraulic pressure.

A hydraulic system for the multiplate clutch mechanism 12 in the drive power transmission control system 9B is controlled by a control unit 18 like a hydraulic system for the multiplate clutch mechanism 5 in the above-described front/rear drive power distribution control system.

Described specifically, the hydraulic system for the multiplate clutch mechanism 12 and that for the multiplate clutch mechanism 5 is constructed of unillustrated hydraulic oil compartments provided in association with the respective clutch mechanisms, a motor-driven pump 24 and an accumulator 23, both forming a hydraulic pressure source, and a clutch hydraulic pressure control valve 17 for feeding the hydraulic pressure to the hydraulic oil compartments as much as needed. The opening of the clutch hydraulic pressure control valve 17 is controlled by the control unit 18.

The control unit 18 controls the opening of the clutch hydraulic pressure control valve 17 on the basis of information from a wheel speed sensor 19, a steering wheel angle sensor 20, a yawrate sensor 21, an acceleration sensor (or acceleration computing means) 22, and the like.

Figure 1:
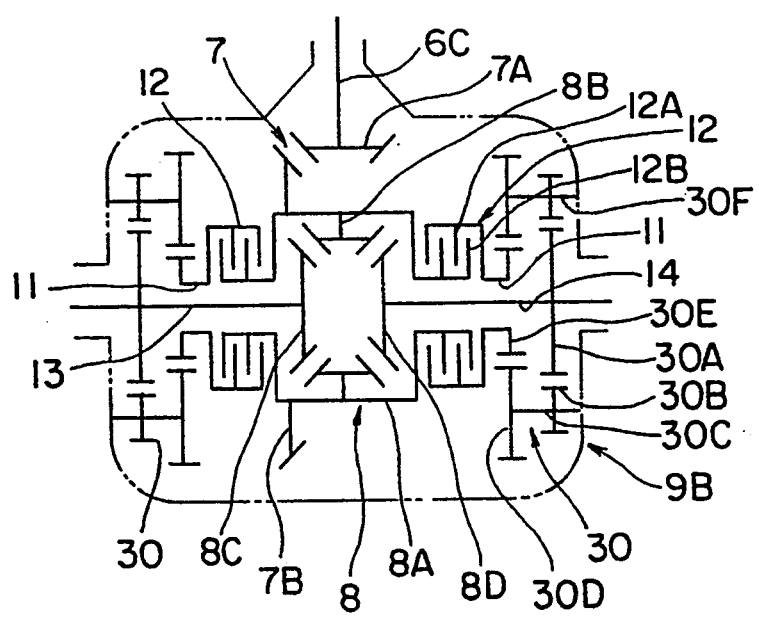
FIG. 1 is a schematic fragmentary power train diagram of a drive power distribution control system for a vehicle as a first embodiment of the present invention.

Describing now an essential part of the drive power distribution control system for the vehicle, there are provided, as depicted in FIG. 1, an input shaft 6C provided at a rear end of the drive shaft 6 and inputted with rotational drive power (hereinafter called "drive power" or "torque"), a first output shaft (hereinafter called "the left-wheel-side output shaft" because it is an output shaft adapted to drive the rear left wheel 15) 13, and a second output shaft (hereinafter called "the right-wheel-side output shaft" since it is an output shaft adapted to drive the rear right wheel 16) 14, said first and second output shafts 13,14 serving to output drive power inputted from the input shaft 6C. The drive power distribution control system is interposed among the left-wheel-side output shaft 13, the right-wheel-side output shaft 14 and the input shaft 6C.

Owing to the construction to be described next, the drive power transmission control mechanism 9B of the vehicle drive power distribution control system can distribute drive power, which is to be transmitted to the left-wheel-side output shaft 13 and the right-wheel-side output shaft 14, at a desired ratio while permitting a differential motion between the left-wheel-side output shaft 13 and the right-wheel-side output shaft 14.

Between the input shaft 6C and each of the left-wheel-side and right-wheel-side output shafts 13,14, the speed change mechanism 30 and the multiplate clutch mechanism 12 are interposed so that a rotational speed of the left-wheel-side output shaft 13 or the right-wheel-side output shaft 14 is changed (accelerated in the illustrated embodiment) by the speed change mechanism 30 and is transmitted to a hollow shaft 11 as an output means of the speed change mechanism 30.

The multiplate clutch mechanism 12 is interposed between the hollow shaft 11 and a differential casing 8A on the side of the input shaft 6C. By coupling the multiplate clutch mechanism 12, drive power is fed from the member rotating at a higher speed out of the differential casing 8A and the hollow shaft 11 to the member rotating at a lower speed, because as general characteristics of clutch plates arranged in opposition to each other, the transmission of torque takes place from the clutch plates rotating at a higher speed to the clutch plates rotating at a lower speed. In the illustrated embodiment, the differential casing 8A is on a higher-speed side and the hollow shaft 11 is on a lower-speed side and drive power is hence fed from the differential casing 8A to the hollow shaft 11, unless the differential motion between the left and right output shafts 13 and 14 is so much that the output shaft 13 or 14 becomes faster relative to the differential casing 8A beyond a predetermined ratio (i.e., the ratio corresponding to a reduction ratio of the speed change mechanism 30).

When the multiplate clutch mechanism 12, for example, between the right-wheel-side output shaft 14 and the input shaft 6C is coupled, the drive power distributed to the right-wheel-side output shaft 14 is either increased or decreased (decreased primarily in the illustrated embodiment) in the course of its transmission from the side of the input shaft 6C so that the drive power to be distributed to the left-wheel-side output shaft 13 is decreased or increased (increased primarily in the illustrated embodiment) correspondingly.

The speed change mechanism 30 in this embodiment is constructed of a so-called double planetary gear mechanism in which two planetary gear mechanisms are connected in series. No particular limitation is imposed on the speed change mechanism 30 itself as long as it outputs an inputted rotational speed after accelerating or decelerating same at a constant speed change ratio. Mechanisms making use of a belt, a chain or the like can also be contemplated by way of example. The speed change mechanism 30 is therefore not limited to a gear mechanism.

Taking by way of example the speed change mechanism 30 of the gear mechanism type disposed on the right-wheel-side output shaft 14, a description will be made next.

A first sun gear 30A is fixed on the right-wheel-side output shaft 14. This first sun gear 30A is, at an outer periphery thereof, in meshing engagement with a first planetary gear (planetary pinion) 30B. The first planetary gear 30B is integrally connected with a second planetary gear 30D and, via a pinion shaft 30C provided on a carrier, is pivotally supported together with the second planetary gear 30D on a carrier 30F which is fixedly secured on a casing (stationary part) and does not rotate. As a consequence, the first planetary gear 30B and the second planetary gear 30D undergo the same rotation about the pinion shaft 30C as a central axis.

Further, the second planetary gear 30D is in meshing engagement with a second sun gear 30E pivotally supported on the right-wheel-side output shaft 14. The second sun gear 30E is connected to clutch plates 12A of the multiplate clutch mechanism 12 via the hollow shaft 11. The other clutch plates, namely, the clutch plates 12B of the multiplate clutch mechanism 12 is connected to the differential casing 8A which is driven by the input shaft 6C.

In the structure of the illustrated embodiment, the first sun gear 30A is formed with a greater diameter than the second sun gear 30E and, correspondingly, the first planetary gear 30B is formed with a smaller diameter than the second planetary gear 30D. As a result, the rotational speed of the second sun gear 30E becomes higher than that of the first sun gear 30A so that the speed change mechanism 30 serves as an accelerating mechanism. When the rotational speed of the clutch plates 12A is higher than that of the clutch plates 12B and the multiplate clutch mechanism 12, for example, on the side of the right wheel is coupled, torque in a amount corresponding to the state of the coupling is fed from the side of the right-wheel-side output shaft 14 to the side of the input shaft 6C.

On the other hand, the speed change mechanism 30 and the multiplate clutch mechanism 12, both provided on the side of the left-wheel-side output shaft 13, are constructed likewise. When it is desired to distribute more drive torque from the input shaft 6C to the right-wheel-side output shaft 14, the multiplate clutch mechanism 12 on the side of the left-wheel-side output shaft 13 is suitably coupled in accordance with the amount of distribution (distribution ratio). When it is desired to distribute more drive power to the left-wheel-side output shaft 13, on the other hand, the multiplate clutch mechanism 12 on the side of the right-wheel-side output shaft 14 is suitably coupled in accordance with the distribution ratio.

Since the multiplate clutch mechanism 12 is of the hydraulically driven type, the state of coupling of the multiplate clutch mechanism 12 can be controlled by adjusting the level of the hydraulic pressure so that the amount of drive power to be fed to the left-wheel-side output shaft 13 or the right-wheel-side output shaft 14 from the input shaft 6C (namely, the left/right distribution ratio of the drive power) can be controlled at an appropriate accuracy.

The left and right multiplate clutch mechanisms 12 are arranged such that they are prevented from being fully coupled at the same time. They are designed in such a manner that, when one of the left and right multiplate clutch mechanisms 12 is fully coupled, the other multiplate clutch mechanism 12 undergoes slipping.

In the present drive power distribution control system, the speed change ratio (acceleration ratio) of the above-described speed change mechanism 30 is set, especially, to satisfy the following condition.

The speed change ratio is set in such a way that, even when the ratio in rotational speed of the left wheel to the right wheel becomes the greatest while the vehicle is cornering, the high/low relationship between a rotational speed on the side of the clutch plates 12A (i.e., on the side of the hollow shaft 11 which is the output means of the speed change mechanism 30) and that on the side of the clutch plates 12B (i.e., on the side of the differential casing 8A which is on the side of the input shaft 6C) in the multiplate clutch mechanism 12 remains unchanged.

Incidentally, the speed change ratio (acceleration ratio) of the speed change mechanism 30 is determined by the gear ratio of the first sun gear 30A, the second sun gear 30E, the first planetary gear 30B and the second planetary gear 30D.

Here, the definition of the speed change ratio (acceleration ratio) of the speed change mechanism 30 will be expressed from a different viewpoint.

Figure 3:
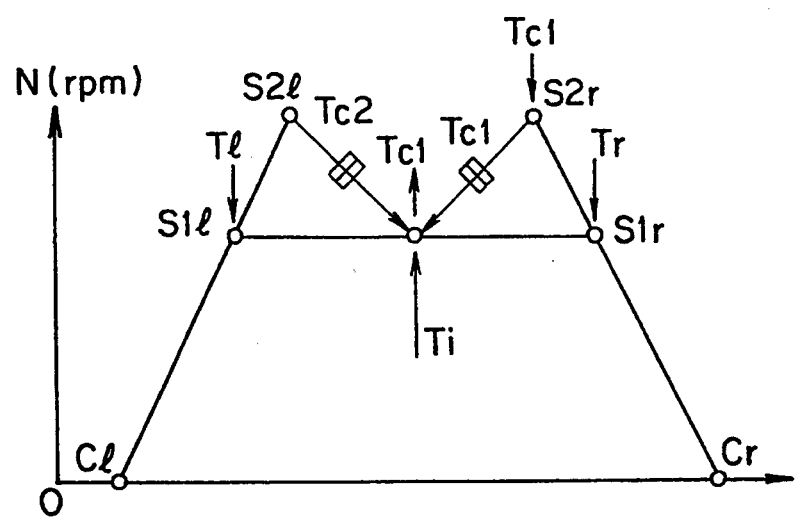
FIG. 3 is a velocity diagram of transmission of torque by the drive power distribution control system according to the first embodiment of the present invention.
Figure 4:
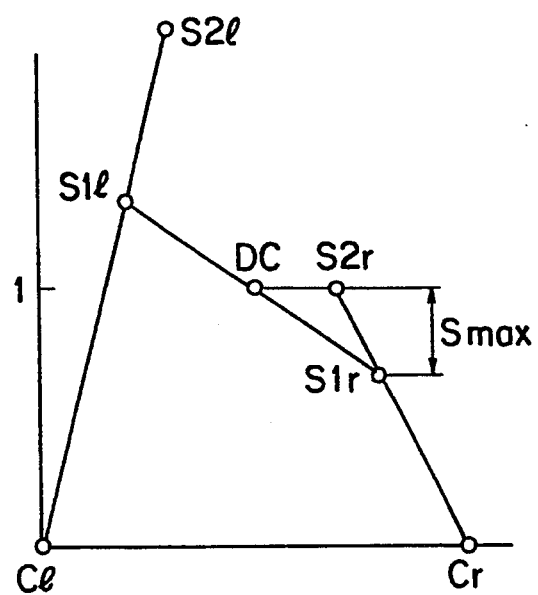
FIG. 4 is a velocity diagram of one example of transmission of torque by the drive power distribution control system according to the first embodiment of the present invention.

First, the preset speed ratio of the planetary gear mechanism to achieve a value (controllable maximum rotational speed ratio) Smax, which specifies a left/right rotational speed difference range permitting control of transfer of drive torque will be derived with reference to the velocity diagrams of FIGS. 3 and 4. Incidentally, the speed ratio Smax can be defined as the ratio of a change $\Delta N$ in rotational speed on the output side (namely, on the side of each of the output shafts 13,14) to a rotational speed Ni on the input side (namely, on the side of the differential casing 8A) when the side of the clutch plates 12A and the clutch plates 12B have become equal to each other in speed (namely, Smax = $\Delta N/Ni$).

In FIGS. 3 and 4, each symbol followed "l" relates to the left wheel whereas each symbol followed by "r" pertains to the right wheel. Cl,Cr each represents the rotational speed of the carrier 30F and is 0 as the carrier 30F does not rotate here. S1l,S1r each stands for the rotational speed of the first sun gear 30A. S2l,S2r each indicates the rotational speed of the second sun gear 30E. Because the first sun gear 30A has a greater diameter than the second sun gear 30E the rotational speeds S1l,S1r are lower than the rotational speeds S2l,S2r. Further, DC represents the rotational speed of the differential casing 8A.

Further, $Z_1$ is the number of teeth of the first sun gear 30A, $Z_2$ the number of teeth of the second sun gear 30E, $Z_3$ the number of teeth of the planetary gear 30B, $Z_4$ the number of teeth of the planetary gear 30D, Ti the input torque to the differential casing 8A, Tl,Tr the torques distributed to the left wheel and the right wheel, respectively, Tc1 the torque transmitted in the left direction when the multiplate clutch mechanism 12 in the right-wheel-side drive power transmission control mechanism 9B has been coupled, and Tc2 the torque transmitted in the right direction when the multiplate clutch mechanism 12 in the left-wheel-side drive power transmission control mechanism 9B has been coupled.

FIG. 3 illustrates a state in which the left and right wheels are rotating at the same speed, while FIG. 4 shows a state in which the multiplate clutch mechanism 12 in the right-wheel-side drive power transmission control mechanism 9B is fully coupled, the right wheel is restrained from rotation by the multi-plate clutch mechanism 12 and the rotational speed on the side of the right wheel is decelerated, and the rotational speed on the side of the left wheel is accordingly accelerated.

The preset speed ratio of the planetary gear mechanism for achieving the above-described Smax (the speed ratio indicating the controllable left/right rotational speed difference range) will be derived, This state of Smax is shown in FIG. 4. When the multiplate clutch mechanism 12 is fully coupled, the rotational speed DC of the differential casing 8A and the rotational speed S2r of the second sun gear 30E become equal to each other.

Accordingly, from FIG. 4, $$Z_3/Z_1 \cdot Z_4/Z_2 = 1 - Smax:1$$

$$\therefore Z_2Z_3/Z_1Z_4 = 1 - Smax$$

As is understood from the foregoing, the speed ratio Smax indicating the controllable left/right rotational speed difference range is determined in accordance with the speed change ratio of the speed change mechanism 30 (namely, the preset gear ratio of the gears 30A, 30E, 30B and 30D).

If the left/right wheel speed ratio $\alpha$ is defined as the ratio of the wheel speed deviation Vd [=(Vr−Vl)/2]to the average vehicle speed Vav [=(Vr+Vl)/2]of the right wheel speed Vr and the left wheel speed Vl, the left/right wheel speed ratio $\alpha$ can be expressed as follows:

$$\alpha = Vd/Vav = [(Vr - Vl)/2]/[(Vr + Vl)/2]$$
$$= (Vr - Vl)/(Vr + Vl)$$

If setting is made to make the above speed ratio Smax greater than the maximum left/right wheel speed ratio $\alpha$max in view of the maximum left/right wheel speed ratio $\alpha$max which always occurs upon cornering in a normal circle, the high/low relationship between the rotational speed on the side of the clutch plates 12A and that on the side of the clutch plates 12B in the multiplate clutch mechanism 12 remains unchanged so that control of transfer of drive power in a predetermined direction can be always effected.

The setting conditions for the speed change ratio (acceleration ratio) of the speed change mechanism 30 can be rephrased to set the speed change ratio in such a manner as satisfying the following formula:

$$Smax > \alpha max$$

No matter how big difference in rotation speed occurs between the left and right wheels upon cornering of a vehicle, such setting always makes it possible in the illustrated embodiment to couple the multiplate clutch mechanism 12 on the side of the left-wheel-side output shaft 13 so that drive torque from the input shaft 6C can be distributed more to the side of the right wheel or to couple the multiplate clutch mechanism 12 on the side of the right-wheel-side output shaft 14 so that drive torque from the input shaft 6C can be distributed more to the side of the left wheel.

Since the vehicle drive power distribution control system according to the first embodiment of this invention is constructed as described above, the distribution of torque is controlled by transferring a desired amount of torque on one side to the other side instead of controlling the distribution of torque by using an energy loss such as a brake. It is therefore possible to distribute torque at a desired ratio to the left and right drive wheels without inducing a large torque loss or energy loss.

As it is always possible to distribute more torque to the side of the right wheel by coupling the multiplate clutch mechanism 12 on the side of the left-wheel-side output shaft 13 or to the side of the left wheel by coupling the multiplate clutch mechanism 12 on the side of the right-wheel-side output shaft 14, it is always feasible to increase the torque to be distributed to the side of the left wheel or to the side of the right wheel.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

A description will next be made of the vehicle drive power distribution control system according to the second embodiment. In this system, the above-described system of the first embodiment is applied for the distribution of torque between front and rear wheels.

Figure 5:
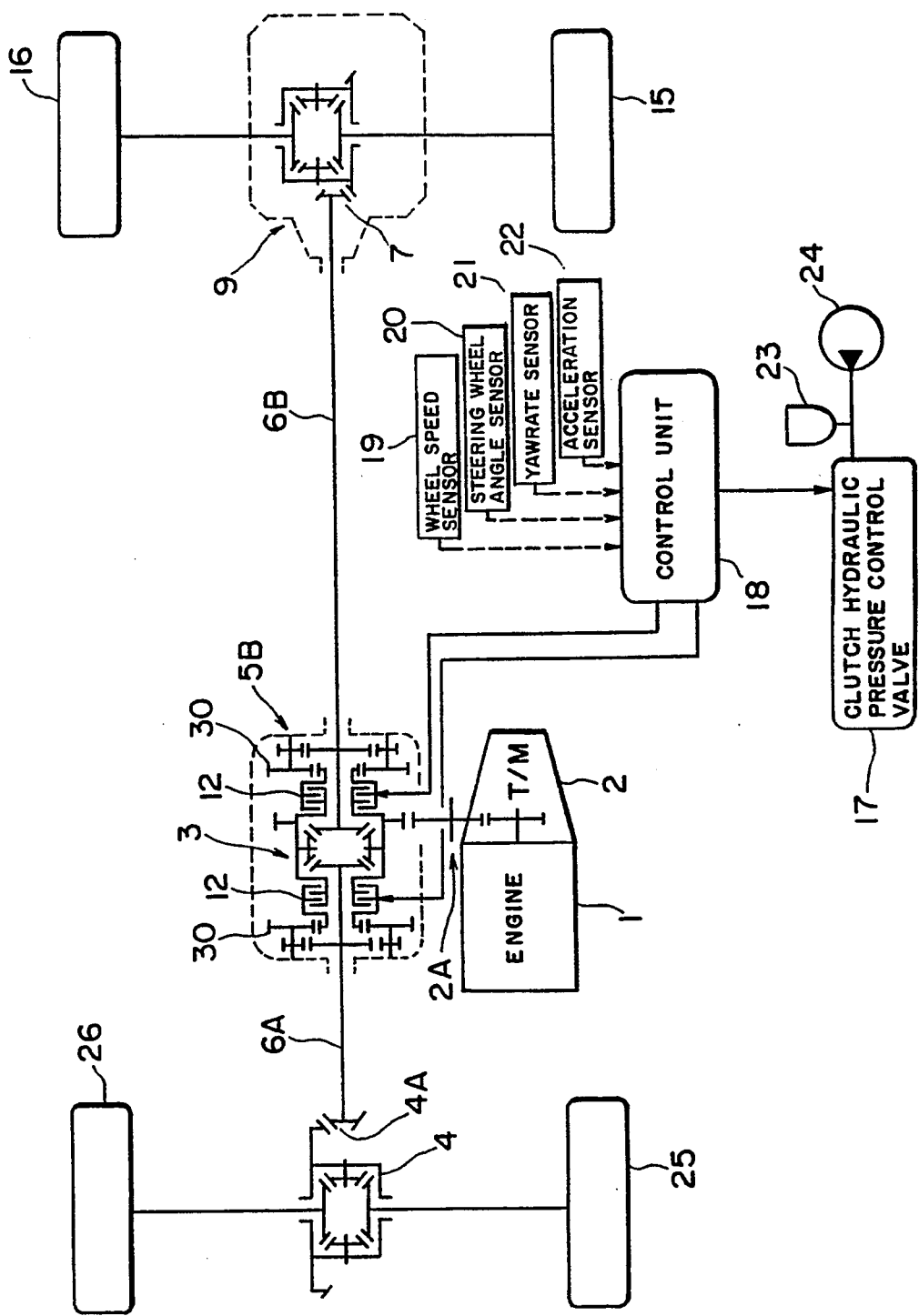
FIG. 5 is a simplified schematic block diagram of a drive system of an automotive vehicle equipped with a drive power distribution control system according to a second embodiment of the present invention.

A automotive vehicle drive system equipped with this system is constructed in such a way that, as illustrated in FIG. 5, drive power (hereinafter called "drive torque" or "torque") from the engine 1 is received at the central differential 3 as a differential mechanism via the transmission 2 and is then transmitted from the central differential 3 to the side of the front wheels and the side of the rear wheels via a front-wheel-side output shaft 6A and a rear-wheel-side output shaft 6B, respectively. At the central differential 3, the drive power from the transmission 2 is received via a gear 2A at a gear 3E disposed on a differential casing (input means) 3A and is then transmitted from pinions 3B,3B to the front-wheel-side output shaft 6A and the rear-wheel-side output shaft 6B via pinions 3C,3D while permitting a differential motion between the front-wheel-side output shaft 6A and the rear-wheel-side output shaft 6B.

At the central differential 3, there is arranged especially a drive power transmission control mechanism 5B (numeral 5 will hereinafter be used whenever the drive power transmission control mechanism is referred to in broad sense) which is constructed of the speed change mechanism 30 and the wet multiplate clutch mechanism 12 as a drive power transmission means. A vehicle drive power distribution control system is constructed of the drive power transmission control mechanism 5B and the central differential 3.

The wet multiplate clutch mechanism 12 is of the hydraulically driven type. By adjusting the level of hydraulic pressure, the press contact force can be controlled. In accordance with the state of the press contact, the distribution of drive power to the front and rear wheels can be controlled.

One of drive power fractions distributed from the central differential 3 as described above is transmitted to the left and right front wheels 25,26 through the front differential 4. On the other hand, the other fraction of the drive power, also distributed from the central differential 3, is transmitted to the rear differential 8 via the drive shaft 6 and further to the left and right rear wheels 15,16 via the rear differential 8. Numeral 7 indicates the bevel-gear mechanism which is formed of the drive pinion and the ring gear.

Although not shown in the drawing, arranged at the rear differential 8 is a drive power transmission control mechanism which is constructed of a speed change mechanism and a wet multiplate clutch mechanism as a power transmission mechanism. By controlling the hydraulic pressure of the multiplate clutch mechanism 12 and hence its press contact force, the distribution of drive power to the left and right wheels can be controlled.

The hydraulic system for the wet multiplate clutch mechanisms 12 in the above-described drive power transmission control mechanism 5B is controlled by the control unit 18 like the hydraulic system for the multiplate clutch mechanism in the left/right drive power distribution control system of the rear differential 8.

Described specifically, the hydraulic system for the multiplate clutch mechanisms 12,12 is constructed of unillustrated hydraulic oil compartments provided in association with the respective clutch mechanisms, the motor-driven pump 24 and the accumulator 23, both forming the hydraulic pressure source, and the clutch hydraulic pressure control valve 17 for feeding the hydraulic pressure to the hydraulic oil compartments as much as needed. The opening of the clutch hydraulic pressure control valve 17 is controlled by the control unit 18.

The control unit 18 controls the opening of the clutch hydraulic pressure control valve 17 on the basis of information from the wheel speed sensor 19, the steering wheel angle sensor 20, the yawrate sensor 21, the acceleration sensor (or acceleration computing means) 22, and the like.

Figure 6:
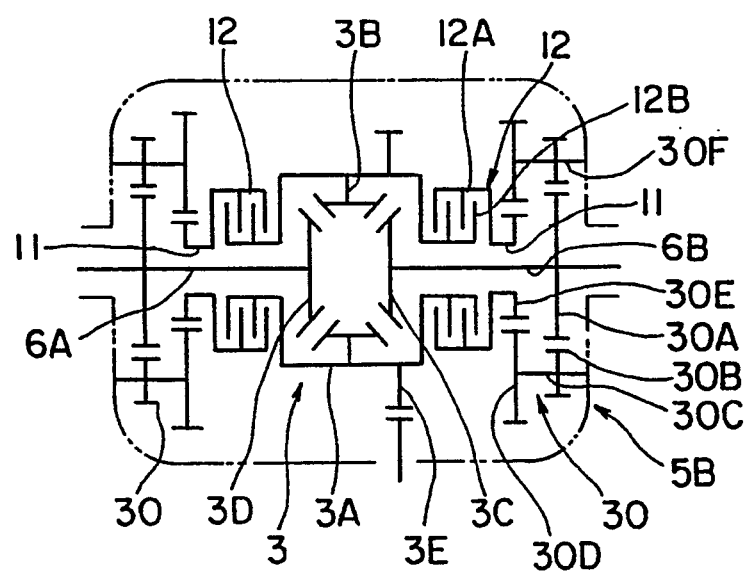
FIG. 6 is a schematic fragmentary power train diagram of the drive power distribution control system for the vehicle as the second embodiment of the present invention.

Describing now an essential part of the vehicle drive power distribution control system, there are provided, as depicted in FIG. 6, the differential casing (input means) 3A of the central differential 3 which receives rotational drive power from the transmission 2 via the gears 2A,3E, the first input shaft 6A (hereinafter called "the front-wheel-side output shaft as it is an output shaft for driving the front wheels 25,26) and the second input shaft 6B (hereinafter called" the rear-wheel-side output shaft as it is an output shaft for driving the rear wheels 15,16), said output shafts 6A,6B serving to output drive power inputted to the central differential 3, and the drive power transmission control mechanism 5B interposed among the front-wheel-side output shaft 6A, the rear-wheel-side output shaft 6B and the differential casing 3A of the central differential 3.

The drive power transmission control mechanism 5B can distribute drive power at a desired ratio for transmission to the front-wheel-side output shaft 6A and the rear-wheel-side output shaft 6B while permitting a differential motion between the front-wheel-side output shaft 6A and the rear-wheel-side output shaft 6B.

Between each of the front-wheel-side and rear-wheel-side output shafts 6A,6B and the differential casing 3A as the input means, the speed change mechanism 30 and the multiplate clutch mechanism 12 are interposed so that the rotational speed of the front-wheel-side output shaft 6A and the rear-wheel-side output shaft 6B is accelerated by the speed change mechanism 30 and then transmitted to the hollow shaft 11 as an auxiliary transmission member for drive power.

The multiplate clutch mechanism 12 is interposed between the hollow shaft 11 and the differential casing 3A (input means) 3A. Coupling of the multiplate clutch mechanism 12 makes it possible to feed drive power from the differential casing 3A on a higher-speed side to the hollow shaft 11 on a lower-speed side because, as a general characteristic of clutch plates arranged opposing each other, the transmission of the torque is effected from the higher-speed side to the lower-speed side.

When the multiplate clutch mechanism 12, for example, between the rear-wheel-side output shaft 6B and the differential casing 3A is coupled, the drive power distributed to the rear-wheel-side output shaft 6B is either increased or decreased in the course of its transmission from the side of the input shaft 3A so that the drive power to be distributed to the front-wheel-side output shaft 6A is decreased or increased.

Since the above-described speed change mechanism 30 is constructed similarly to that employed in the first embodiment, its description is omitted herein. In FIG. 6, elements of structure similar to their corresponding elements are indicated by like reference numerals.

Further, as in the first embodiment, the multiplate clutch mechanism 12 is of the hydraulically-driven type. By adjusting the level of hydraulic pressure, the state of coupling of the multiplate clutch mechanism 12 can be controlled. It is therefore possible to control at an appropriate level of accuracy the amount of drive power to be fed from the differential casing 3A to the front-wheel-side output shaft 6A or the rear-wheel-side output shaft 6B (namely, the front/rear distribution ratio of drive power).

Like the first embodiment, the front and rear multiplate clutch mechanisms 12 are designed in such a manner that they are not fully coupled at the same time. When one of the front and rear multiplate clutch mechanisms 12 is fully coupled, the other multiplate clutch mechanism 12 thus undergoes slipping.

Since the vehicle drive power distribution control system according to the second embodiment of this invention is constructed as described above, the distribution of torque is controlled by transferring a desired amount of torque on one side to the other side instead of controlling the distribution of torque by using an energy loss such as a brake. It is therefore possible to achieve a desired front/rear torque distribution ratio without inducing a large torque loss or energy loss.

Figure 7:
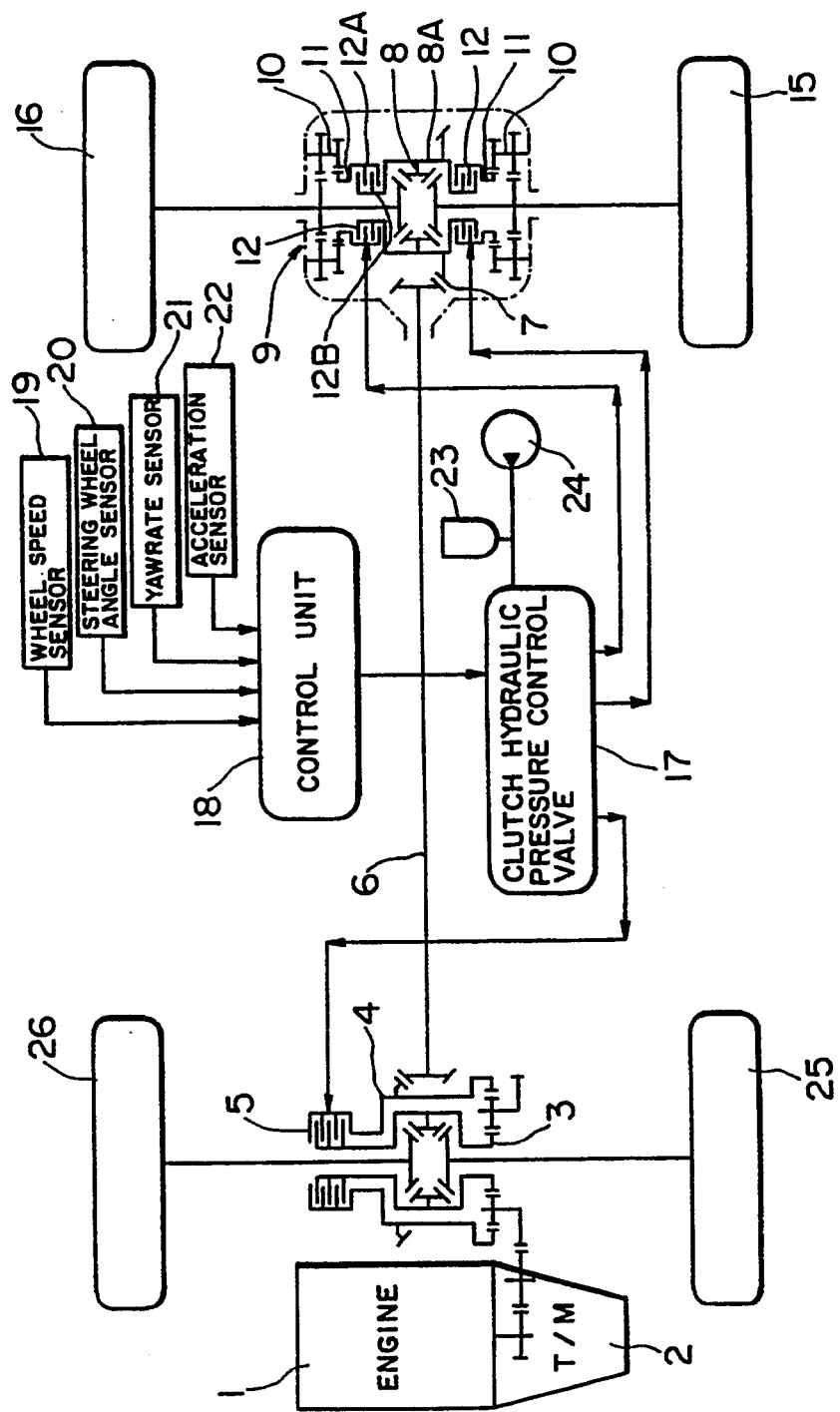
FIG. 7 is a simplified schematic block diagram of a drive system of an automotive vehicle equipped with a drive power distribution control system according to a third embodiment of the present invention.

The vehicle drive power distribution control system according to the third embodiment will next be described. The overall construction of a drive system of an automobile equipped with the system is as shown in FIG. 7 and is hence similar to that described above in connection with the first embodiment shown in FIG. 2. Description of the overall construction is therefore omitted herein.

Figure 8:
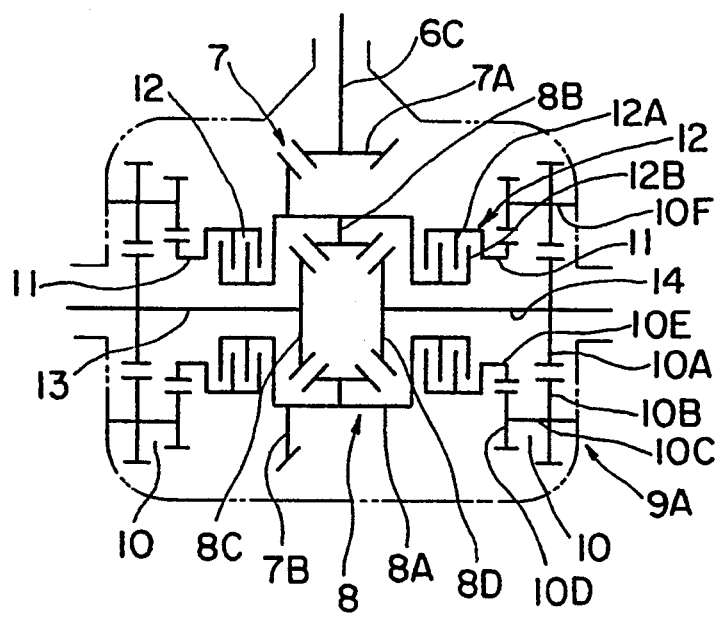
FIG. 8 is a schematic fragmentary power train diagram of the drive power distribution control system for the vehicle as the third embodiment of the present invention.

In a drive power transmission control mechanism 9A, a speed change mechanism 10 is different from the corresponding element in the first embodiment as depicted in FIGS. 7 and 8. A first sun gear 10A is formed smaller in diameter than the second sun gear 10E so that the rotational speed of the second sun gear 10E is lower than that of the first sun gear 10A. The speed change mechanism 10 therefore functions as a speed reduction mechanism. During normal running in which the difference in rotational speed between the left and right wheels is small, the rotational speed of the clutch plates 12A is lower than that of the clutch plates 12B and, when the multiplate clutch mechanism 12 is coupled, torque in an amount corresponding to the state of the coupling is fed additionally from the side of the input shaft 6C to the side of the right-wheel-side output shaft 14.

On the other hand, the speed change mechanism 10 and the multiplate clutch mechanism 12, which are associated with the left-wheel-side output shaft 13, are constructed likewise. When it is desired to distribute more drive torque from the input shaft 6C to the left-wheel-side output shaft 13, the multiplate clutch mechanism 12 on the side of the right-wheel-side output shaft 14 is suitably coupled in accordance with the desired amount of drive torque to be distributed (distribution ratio). When it is desired to distribute more to the right-wheel-side output shaft 14, the multiplate clutch mechanism 12 on the side of the left-wheel-side output shaft 13 is suitably coupled in accordance with the desired distribution ratio.

Like the first embodiment, the multiplate clutch mechanism 12 is of the hydraulically driven type. By adjusting the level of hydraulic pressure, the state of coupling of the multiplate clutch mechanism 12 can be controlled so that the amount of drive power to be fed from the input shaft 6C to the left-wheel-side output shaft 13 or the right-wheel-side output shaft 14 (namely, the left/right distribution ratio of drive power) can be controlled at an appropriate level of accuracy.

Like the first embodiment, the left and right multiplate clutch mechanisms 12 are designed in such a manner that they are not fully coupled at the same time. When one of the left and right multiplate clutch mechanisms 12 is fully coupled, the other multiplate clutch mechanism 12 thus undergoes slipping.

Further, the speed change ratio (acceleration ratio) of the above-described speed change mechanism 10 is also set to satisfy the below-described condition in the system of the third embodiment.

The speed change ratio is set in such a way that, even when the ratio in rotational speed of the left wheel to the right wheel becomes the greatest while the vehicle is cornering, the high/low relationship between a rotational speed on the side of the clutch plates 12A (i.e., on the side of the hollow shaft 11 which is the output means of the speed change mechanism 10) and that on the side of the clutch plates 12B (i.e., on the side of the differential casing 8A which is on the side of the input shaft 6C) in the multiplate clutch mechanism 12 remains unchanged.

Incidentally, the speed change ratio (acceleration ratio) of the speed change mechanism 10 is determined by the gear ratio of the first sun gear 10A, the second sun gear 10E, the first planetary gear 10B and the second planetary gear 10D.

Here, the definition of the speed change ratio (acceleration ratio) of the speed change mechanism 10 will be expressed from a different viewpoint. First, the preset speed ratio of the planetary gear mechanism to achieve Smax will be derived with reference to the velocity diagrams of FIGS. 9 and 10. Incidentally, the speed ratio Smax can be defined as the ratio of a change $\Delta N$ in rotational speed on the output side (namely, on the side of each of the output shafts 13,14) to a rotational speed Ni on the input side (namely, on the side of the differential casing 8A) when the side of the clutch plates 12A and the clutch plates 12B have become equal to each other in speed (namely, Smax=$\alpha$N/Ni).

Figure 9:
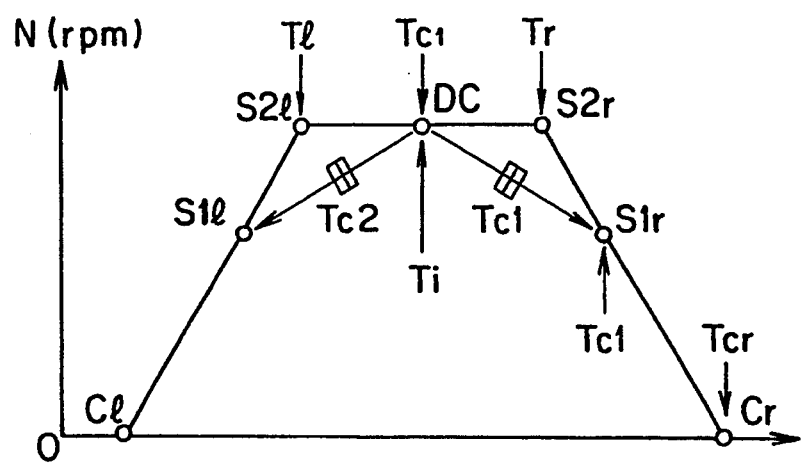
FIG. 9 is a velocity diagram of transmission of torque by the drive power distribution control system according to the third embodiment of the present invention.
Figure 10:
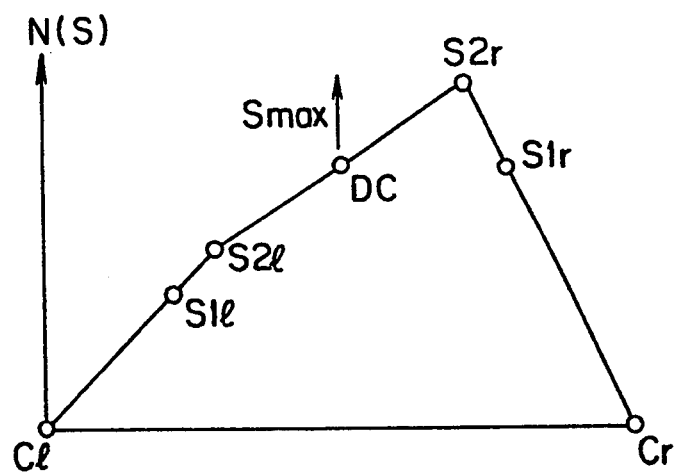
FIG. 10 is a velocity diagram of one example of transmission of torque by the drive power distribution control system according to the third embodiment of the present invention.

In FIGS. 9 and 10, each symbol followed "l" relates to the left wheel whereas each symbol followed by "r" pertains to the right wheel. Cl,Cr each represents the rotational speed of a carrier 10F and is 0 as the carrier 10F does not rotate here. S1l,S1r each stands for the rotational speed of the first sun gear 10A. S2l,S2r each indicates the rotational speed of the second sun gear 10E. Because the first sun gear 10A has a greater diameter than the second sun gear 10E, the rotational speeds S1l,S1r are lower than the rotational speeds S2l,S2r. Further, DC represents the rotational speed of the differential casing 8A.

Further, $Z_1$ is the number of teeth of the second sun gear 10E, $Z_2$ the number of teeth of the first sun gear 10A, $Z_3$ the number of teeth of the planetary gear 10D, $Z_4$ the number of teeth of the planetary gear 10B, Ti the input torque to the differential casing 8A, Tl,Tr the torques distributed to the left wheel and the right wheel, respectively, Tc1 the torque transmitted in the left direction when the multiplate clutch mechanism 12 in the right-wheel-side drive power transmission control mechanism 9B has been coupled, and Tc2 the torque transmitted in the right direction when the multiplate clutch mechanism 12 in the left-wheel-side drive power transmission control mechanism 9B has been coupled.

FIG. 9 illustrates a state in which the left and right wheels are rotating at the same speed, while FIG. 10 shows a state in which the multiplate clutch mechanism 12 in the right-wheel-side drive power transmission control mechanism 9A is fully coupled, the right wheel is restrained from rotation by the multiplate clutch mechanism 12 and the rotational speed on the side of the right wheel is decelerated, and the rotational speed on the side of the left wheel is accordingly accelerated.

The preset speed ratio of the planetary gear mechanism for achieving the above-described Smax (the speed ratio indicating the controllable left/right rotational speed difference range) will be derived.

This state of Smax is shown in FIG. 10. When the multiplate clutch mechanism 12 is fully coupled, the rotational speed DC of the differential casing 8A and the rotational speed S2r of the second sun gear 10E become equal to each other.

Accordingly, from FIG. 10, $$Z_3/Z_1 \cdot Z_4/Z_2 = 1 : Smax + 1$$

$$\therefore Z_2Z_3/Z_1Z_4 = 1/(Smax+1)$$

As is understood from the foregoing, the speed ratio Smax indicating the controllable left/right rotational speed difference range is determined in accordance with the speed change ratio of the speed change mechanism 10 (namely, the preset gear ratio of the gears 10A, 10E, 10B and 10D).

If the left/right wheel speed ratio $\alpha$ is defined as the ratio of the wheel speed deviation Vd $[=(Vr-Vl)/2]$ to the average vehicle speed Vav $[=(Vr+Vl)/2]$ of the right wheel speed Vr and the left wheel speed Vl, the left/right wheel speed ratio $\alpha$ can be expressed as follows:

$$\begin{aligned}\alpha = Vd/Vav &= [(Vr - Vl)/2]/[(Vr + Vl)/2] \\ &= (Vr - Vl)/(Vr + Vl)\end{aligned}$$

If setting is made to make the above speed ratio Smax greater than the maximum left/right wheel speed ratio $\alpha$max in view of the maximum left/right wheel speed ratio $\alpha$max which always occurs upon cornering in a normal circle, the high/low relationship between the rotational speed on the side of the clutch plates 12A and that on the side of the clutch plates 12B in the multiplate clutch mechanism 12 remains unchanged so that control of transfer of drive power in a predetermined direction can be always effected.

The setting conditions for the speed change ratio (acceleration ratio) of the speed change mechanism 10 can be rephrased to set the speed change ratio in such a manner as satisfying the following formula:

$$Smax > \alpha max$$

No matter how big difference in rotation speed occurs between the left and right wheels upon cornering of a vehicle, such setting always makes it possible in the illustrated embodiment to couple the multiplate clutch mechanism 12 on the side of the left-wheel-side output shaft 13 so that drive torque from the input shaft 6C can be distributed more to the side of the left wheel or to couple the multiplate clutch mechanism 12 on the side of the right-wheel-side output shaft 14 so that drive torque from the input shaft 6C can be distributed more to the side of the right wheel.

Since the vehicle drive power distribution control system according to the third embodiment of this invention is constructed as described above, the distribution of torque is controlled, as in the first embodiment, by transferring a desired amount of torque on one side to the other side instead of controlling the distribution of torque by using an energy loss such as a brake. It is therefore possible to achieve a desired left/right torque distribution ratio without inducing a large torque loss or energy loss.

As it is always possible to distribute more torque to the side of the left wheel by coupling the multiplate clutch mechanism 12 on the side of the left-wheel-side output shaft 13 or to the side of the right wheel by coupling the multiplate clutch mechanism 12 on the side of the right-wheel-side output shaft 14, it is always feasible to increase the torque to be distributed to the side of the left wheel or to the side of the right wheel.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

A description will next be made of the vehicle drive power distribution control system according to the fourth embodiment. In this system, the above-described system of the third embodiment is applied for the distribution of torque between front and rear wheels as shown in FIGS. 11 and 12.

In other words, the speed change mechanism 30 in the drive system of the automobile described above in connection with the second embodiment has been changed to the speed change mechanism 10 of the third embodiment.

Figure 11:
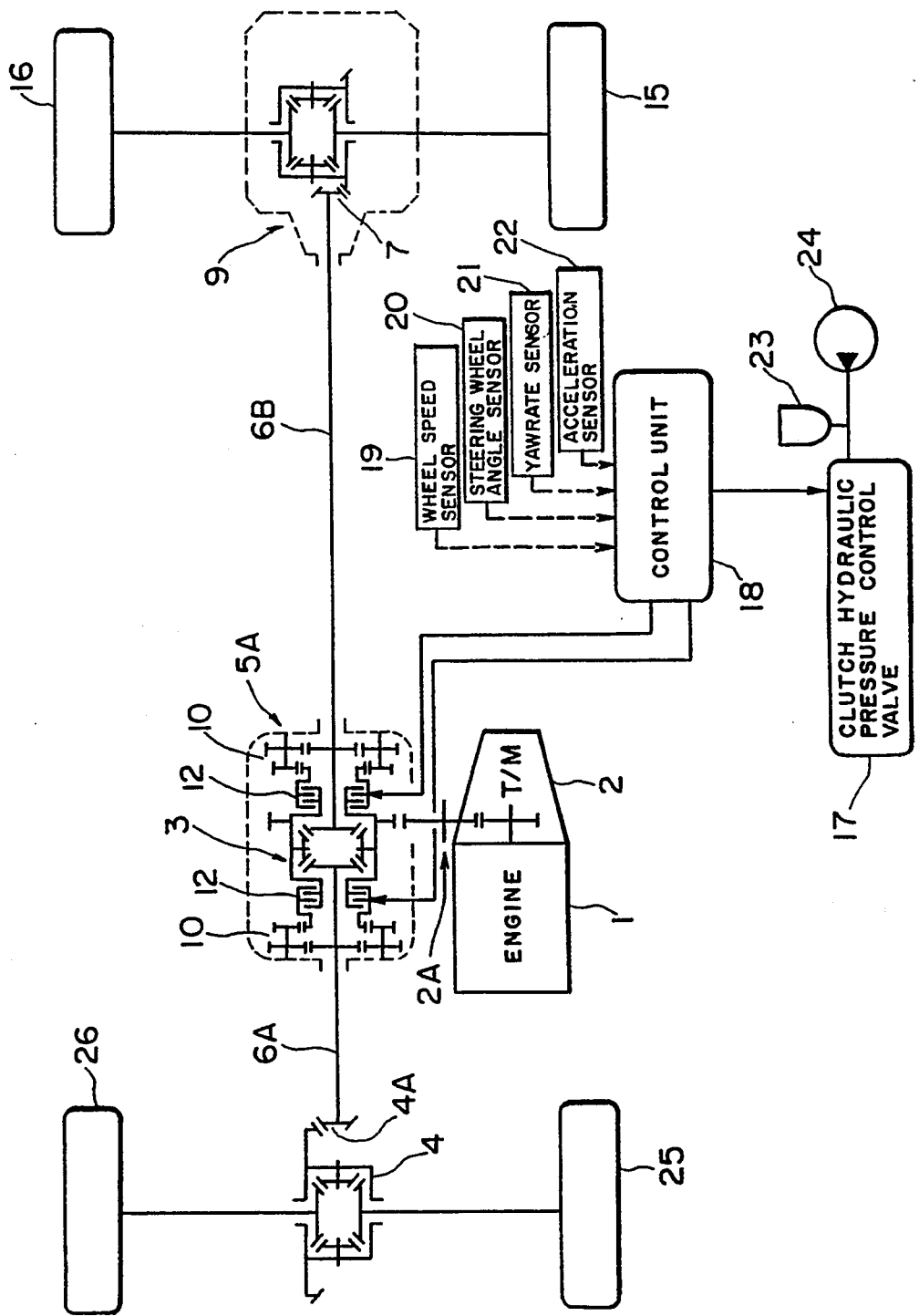
FIG. 11 is a simplified schematic block diagram of a drive system of an automotive vehicle equipped with a drive power distribution control system according to a fourth embodiment of the present invention.
Figure 12:
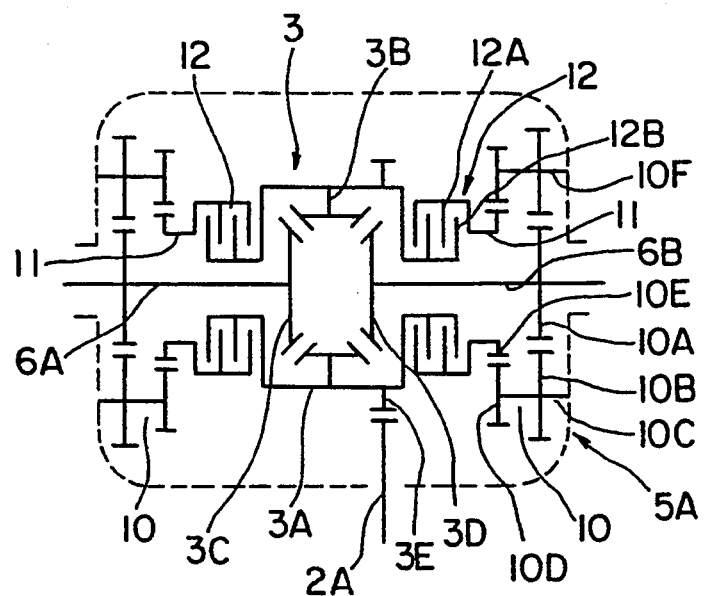
FIG. 12 is a schematic fragmentary power train diagram of the drive power distribution control system for the vehicle as the fourth embodiment of the present invention.

In the speed change mechanism 10, the first sun gear 10A is formed smaller in diameter than the second sun gear 10E like the speed change mechanism in the third embodiment as illustrated in FIG. 11 so that the rotational speed of the second sun gear 10E is lower than that of the first sun gear 10A. The speed change mechanism 10 therefore functions as a speed reduction mechanism so that the speed of rotation of the clutch plates 12A is lower than that of the clutch plates 12B. When the multiplate clutch mechanism 12 is coupled, torque in an amount corresponding to the state of the coupling is fed from the side of the differential casing 3A as an input means to the side of the rear-wheel-side output shaft 6B.

When it is desired to distribute more drive torque from the differential casing 3A to the front-wheel-side output shaft 6A by the speed change mechanism 10, the multiplate clutch mechanism 12 on the side of front-wheel-side output shaft 6A is suitably coupled in accordance with the desired torque amount to be distributed (distribution ratio). When it is desired to distribute more to the rear-wheel-side output shaft 6B, the multiplate clutch mechanism 12 on the side of the rear-wheel-side output shaft 6B is suitably coupled in accordance with the desired distribution ratio.

Incidentally, the multiplate clutch mechanism 12 is of the hydraulically driven type. By adjusting the level of hydraulic pressure, the state of coupling of the multiplate clutch mechanism 12 can be controlled so that the amount of drive power to be fed from the differential casing 3A to front-wheel-side output shaft 6A or the rear-wheel-side output shaft 6B (namely, the front/rear distribution ratio of drive power) can be controlled at an appropriate level of accuracy.

The front and rear multiplate clutch mechanisms 12 are designed in such a manner that they are not fully coupled at the same time. When one of the front and rear multiplate clutch mechanisms 12 is fully coupled, the other multiplate clutch mechanism 12 thus undergoes slipping.

Since the vehicle drive power distribution control system according to the fourth embodiment of this invention is constructed as described above, the distribution of torque is controlled, as in the first embodiment, by transferring a desired amount of torque on one side to the other side instead of controlling the distribution of torque by using an energy loss such as a brake. It is therefore possible to achieve a desired front/rear torque distribution ratio without inducing a large torque loss or energy loss.

The vehicle drive power distribution control system according to the fifth embodiment will next be described. The overall construction of a drive system of an automobile equipped with the system is substantially the same as that described above in connection with the first embodiment shown in FIG. 2. Description of the overall construction is therefore omitted herein.

Figure 13:
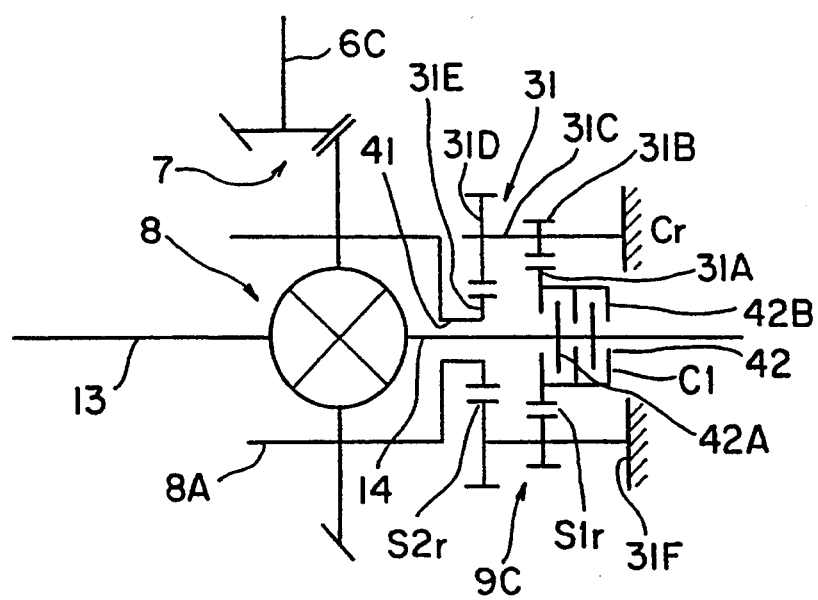

In the drive power transmission control mechanism 9A, a speed change mechanism 31 and a multiplate clutch mechanism 42 are different from the corresponding elements in the first and third embodiments as depicted in FIG. 13. The right-hand drive power transmission control mechanism will also be described in this embodiment.

The speed change mechanism 31 is composed of two sets of linear planetary gear mechanisms disposed on left and right sides of the differential casing 8A on the side of the input shaft 6C. Each linear planetary gear mechanism comprises a first sun gear 31A, a second sun gear 31E, a first planetary gear 31B, a second planetary gear 31D, a pinion shaft 31C, and a planetary carrier 31F. A plate portion of the first sun gear 31A serves as the auxiliary transmission member 41 for drive power.

The multiplate clutch mechanism 42 is interposed between the auxiliary drive power transmission member 41 and the right-wheel-side output shaft 14. This multiplate clutch mechanism 42 comprises clutch plates 42A on the side of the right-wheel-side output shaft 14 and clutch plates 42B on the side of the auxiliary drive power transmission member 41, said clutch plates 42A and said clutch plates 42B being disposed alternately. In accordance with hydraulic pressure fed from an unillustrated hydraulic pressure system, the state of coupling of the multiplate clutch mechanism is controlled.

When the multiplate clutch mechanism 42 is coupled, a drive power transmission train is established extending from the side of the right-wheel-side output shaft 14 to the differential casing 8A on the side of the input shaft 6C via the multiplate clutch mechanism 42, the first sun gear 31A, the first planetary gear 31B, the second planetary gear 31D and the second sun gear 31E.

Since the first sun gear 31A is formed greater in diameter than the second sun gear 31E, the rotational speed of the second sun gear 31E becomes higher than that of the first sun gear 31A. The speed change mechanism 31 therefore functions as a speed reduction mechanism that makes the auxiliary drive power transmission member 41 slower than the side of the input shaft 6C.

Accordingly, the rotational speed of the clutch plates 42A is higher than that of the clutch plates 42B and, when the multiplate clutch mechanism 42 is coupled, torque in an amount corresponding to the state of the coupling is fed (returned) from the side of the right-wheel-side output shaft 14 to the side of the input shaft 6C.

On the other hand, the speed change mechanism 31 and the multiplate clutch mechanism 42, which are associated with the left-wheel-side output shaft 13, are constructed likewise. When it is desired to distribute more drive torque from the input shaft 6C to the left-wheel-side output shaft 13, the multiplate clutch mechanism 42 on the side of the right-wheel-side output shaft 14 is suitably coupled in accordance with the desired amount of drive torque to be distributed (distribution ratio). When it is desired to distribute more to the right-wheel-side output shaft 14, the multiplate clutch mechanism 42 on the side of the left-wheel-side output shaft 13 is suitably coupled in accordance with the desired distribution ratio.

The multiplate clutch mechanism 42 is of the hydraulically driven type. By adjusting the level of hydraulic pressure, the state of coupling of the multiplate clutch mechanism 42 can be controlled so that the amount of drive power to be fed from the input shaft 6C to the left-wheel-side output shaft 13 or the right-wheel-side output shaft 14 (namely, the left/right distribution ratio of drive power) can be controlled at an appropriate level of accuracy.

Further, the left and right multiplate clutch mechanisms 42 are designed in such a manner that they are not fully coupled at the same time. When one of the left and right multiplate clutch mechanisms 42 is fully coupled, the other multiplate clutch mechanism 42 thus undergoes slipping.

In particular, the speed change ratio (acceleration ratio) of the above-described speed change mechanism 31 is also set to satisfy the below-described condition in the system of the fifth embodiment.

The speed change ratio is set in such a way that, even when the ratio in rotational speed of the left wheel to the right wheel becomes the greatest while the vehicle is cornering, the high/low relationship between a rotational speed on the side of the clutch plates 12A (i.e., on the side of the hollow shaft 11 which is the output means of the speed change mechanism 31) and that on the side of the clutch plates 12B (i.e., on the side of the differential casing 8A which is on the side of the input shaft 6C) in the multiplate clutch mechanism 42 remains unchanged.

Incidentally, the speed change ratio (acceleration ratio) of the speed change mechanism 31 is determined by the gear ratio of the first sun gear 31A, the second sun gear 31E, the first planetary gear 31B and the second planetary gear 31D.

Using the controllable maximum rotational speed ratio Smax and the maximum left/right wheel speed ratio $\alpha$max, the setting conditions for the speed change ratio (acceleration ratio) of the speed change mechanism 31 can be rephrased as setting the speed change ratio to satisfy the following formula:

$$Smax > \alpha max$$

No matter how big difference in rotation speed occurs between the left and right wheels upon cornering of a vehicle, such setting always makes it possible in the illustrated embodiment to couple the multiplate clutch mechanism 42 on the side of the left-wheel-side output shaft 13 so that drive torque from the input shaft 6C can be distributed more to the side of the right wheel or to couple the multiplate clutch mechanism 42 on the side of the right-wheel-side output shaft 14 so that drive torque from the input shaft 6C can be distributed more to the side of the left wheel.

Since the vehicle drive power distribution control system according to the fifth embodiment of this invention is constructed as described above, the distribution of torque is controlled, as in the first and third embodiments, by transferring a desired amount of torque on one side to the other side instead of controlling the distribution of torque by using an energy loss such as a brake. It is therefore possible to achieve a desired left/right torque distribution ratio without inducing a large torque loss or energy loss.

As it is always possible, as in the first embodiment, to distribute more torque to the side of the right wheel by coupling the multiplate clutch mechanism 42 on the side of the left-wheel-side output shaft 13 or to the side of the left wheel by coupling the multiplate clutch mechanism 42 on the side of the right-wheel-side output shaft 14, it is always feasible to increase the torque to be distributed to the side of the left wheel or to the side of the right wheel.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

Figure 14:
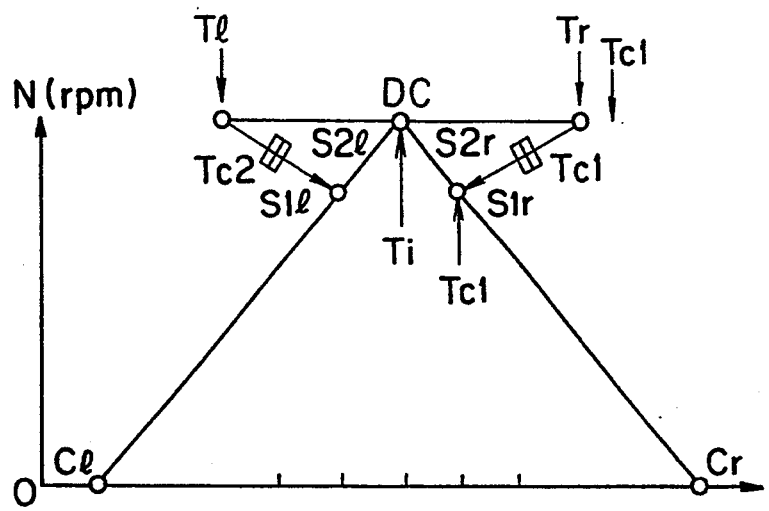
Figure 15:
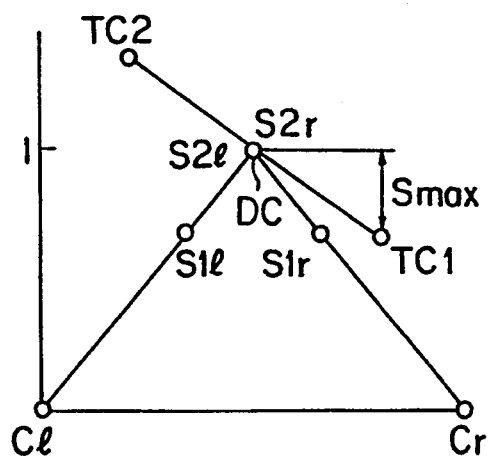

Here, the clutch capacity and energy loss of the vehicle drive power distribution control system will be considered with reference to FIGS. 14 and 15.

In FIGS. 14 and 15, each symbol followed "l" relates to the left wheel whereas each symbol followed by "r" pertains to the right wheel. Cl,Cr each represents the rotational speed of the carrier 31F and is 0 as the carrier 31F does not rotate here. S1l,S1r each stands for the rotational speed of the first sun gear 31A. S2l,S2r each indicates the rotational speed of the second sun gear 31E. Because the first sun gear 31A has a greater diameter than the second sun gear 31E, the rotational speeds S1l,S1r are lower than the rotational speeds S2l,S2r.

Further, $Z_1$ is the number of teeth of the first sun gear 31A, $Z_2$ the number of teeth of the second sun gear 31E, $Z_3$ the number of teeth of the planetary gear 31B, $Z_4$ the number of teeth of the planetary gear 31D, Ti the input torque to the differential casing 8A, Tl,Tr the torques distributed to the left wheel and the right wheel, respectively, Tc1 the torque transmitted in the left direction when the multiplate clutch mechanism 42 in a right-wheel-side drive power transmission control mechanism 9C has been coupled, and Tc2 the torque transmitted in the right direction when the multiplate clutch mechanism 42 in a left-wheel-side drive power transmission control mechanism 9C has been coupled.

FIG. 14 illustrates a state in which the left and right wheels are rotating at the same speed, while FIG. 15 shows a state in which the multiplate clutch mechanism 42 in the right-wheel-side drive power transmission control mechanism 9C is fully coupled, the right wheel is restrained from rotation by the multiplate clutch mechanism 42 and the rotational speed on the side of the right wheel is decelerated, and the rotational speed on the side of the left wheel is accordingly accelerated.

The preset speed ratio of the planetary gear mechanism for achieving Smax (the controllable left/right rotational speed difference range) will be derived.

This state of Smax is shown in FIG. 15. When the multiplate clutch mechanism 42 is fully coupled, the rotational speed of the output shaft 14 and the rotational speed S1r of the first sun gear 31A become equal to each other.

Accordingly, from FIG. 15, $$Z_3/Z_1 \cdot Z_4/Z_2 = 1 - Smax : 1$$

$$\therefore Z_2 Z_3 / Z_1 Z_4 = 1 - Smax \quad (2.16)$$

Next, the coupling torque Tc required for $\Delta T$ (the decrement in drive power from the side of the right wheel) will be derived. From a torque balancing formula at the differential [where the coupling (i.e., the multiplate clutch mechanism 42) associated with the right wheel has been brought into a transmitting state], $$Ti + (Z_2 Z_3 / Z_1 Z_4) Tc = Tl + [Tr + Tc]$$

$$Tl = Tr + Tc \quad (2.17)$$

From formulae (2.16) and (2.17), the drive torques of the left and right wheels are expressed as follows:

$$Tr = (\tfrac{1}{2}) Ti - [(1 + Smax)/2] Tc$$

$$Tl = (\tfrac{1}{2}) Ti + [(1 - Smax)/2] Tc \quad (2.18)$$

Hence, $$\Delta T = |Tr - Tl| = Tc$$

Therefore, the coupling torque Tc required for $\Delta T$ is:

$$Tc = \Delta T \quad (2.19)$$

The energy loss $\Delta E'$ (namely, the energy absorbed in the clutch) per unit time will next be determined. Here, assume:

$$|S| < Smax.$$

Then, the slip speed ratio Sc at the coupling is expressed as follows:

$$Z_3/Z_1 \cdot Z_4/Z_2 = x : 1$$

$$\therefore x = Z_2 Z_3 / Z_1 Z_4 = 1 - Smax \quad (2.20)$$

Hence, $$Sc = (1 + S) - (1 - Smax) = S + Smax \quad (2.21)$$

Accordingly, the energy loss $\Delta E'$ ($= d\Delta E/dt$) per unit time is:

$$\begin{aligned}\Delta E' &= Tc \cdot Sc \cdot \omega_{DC} \\ &= (S + Smax) \cdot \Delta T \cdot \omega_{DC}\end{aligned} \quad (2.22)$$

From the foregoing results, the vehicle drive power distribution control system according to the fifth embodiment is, in terms of clutch capacity, advantageous compared with that (see FIG. 3) of the first embodiment but disadvantageous compared with that (see FIG. 9) of the third embodiment.

Further, the energy loss $\Delta E'$ is equal to those in the first and third embodiments so that the energy loss $\Delta E'$ required to produce a moment in a turning direction is relatively small.

Like the systems of the first embodiment (see FIG. 3) and the third embodiment (see FIG. 9), the torque changes from the torque at the time where no control is effected (namely, $Tr = Tl$) are as follows:

$$\left(\begin{array}{c}\text{Torque change on} \\ \text{the decelerated side}\end{array}\right) > \left(\begin{array}{c}\text{Torque change on} \\ \text{the accelerated side}\end{array}\right)$$

A description will next be made of the vehicle drive power distribution control system according to the sixth embodiment. In this system, the system of the fifth embodiment described above is applied for the distribution of torque between front and rear wheels.

The overall construction of a drive system of an automobile equipped with the system of the sixth embodiment is substantially the same as that described above in connection with the second embodiment shown in FIG. 5. Description of the overall construction is therefore omitted herein.

Figure 16:
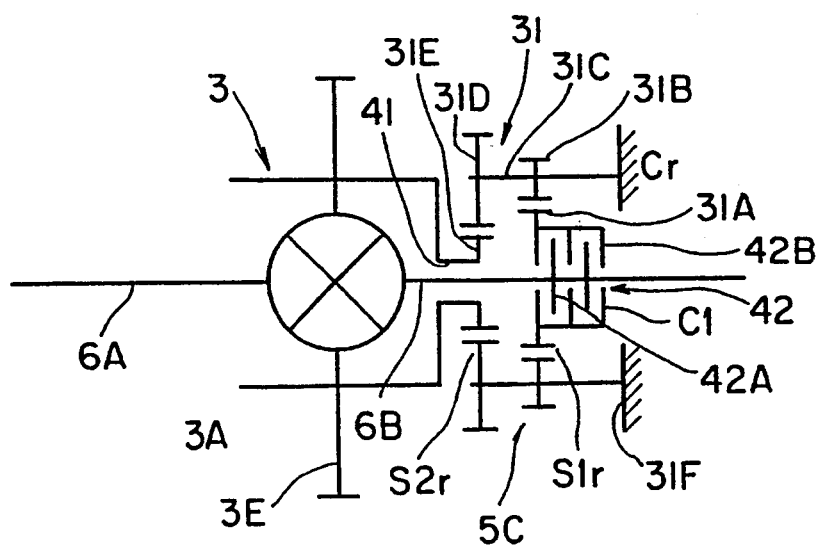

The drive power transmission control mechanism 5B in the system of the sixth embodiment, the speed change mechanism 31 and the multiplate clutch mechanism 42 are different from those of the second and fourth embodiments as depicted in FIG. 16. These speed change mechanism 31 and multiplate clutch mechanism 42 are constructed substantially the same as the corresponding mechanisms in the fifth embodiment.

In FIG. 16, only the drive power transmission control system 5C on the side of the rear wheels is illustrated and a drive power transmission control system on the side of the front wheels is omitted. It is to be noted that a system similar to the system 5C on the side of the rear wheels is also provided on the side of the front wheels in a symmetrical relation with the system on the side of the rear wheels. In FIG. 16, reference numerals similar to those employed in FIG. 13 designate like elements of structure.

The speed change mechanism 31 is composed of two sets of linear planetary gear mechanisms disposed in a front and rear parts of the differential casing (input means) 3A. Each linear planetary gear mechanism comprises the first sun gear 31A, the second sun gear 31E, the first planetary gear 31B, the second planetary gear 31D, the pinion shaft 31C, and planetary carrier 31F. The plate portion of the first sun gear 31A serves as the auxiliary transmission member 41 for drive power.

The multiplate clutch mechanism 42 is interposed between the auxiliary drive power transmission member 41 and the rear-wheel-side output shaft 6B. This multiplate clutch mechanism 42 comprises the clutch plates 42A on the side of the rear-wheel-side output shaft 6B and the clutch plates 42B on the side of the auxiliary drive power transmission member 41, said clutch plates 42A and said clutch plates 42B being disposed alternately. In accordance with hydraulic pressure fed from an unillustrated hydraulic pressure system, the state of coupling of the multiplate clutch mechanism is controlled.

When the multiplate clutch mechanism 42 is coupled, a drive power transmission train is established extending from the side of the rear-wheel-side output shaft 6B to the differential casing 3A as an input means on the side of the gear 3E via the multiplate clutch mechanism 42, the first sun gear 31A, the first planetary gear 31B, the second planetary gear 31D and the second sun gear 31E.

Since the first sun gear 31A is formed greater in diameter than the second sun gear 31E, the rotational speed of the second sun gear 31E becomes higher than that of the first sun gear 31A. The speed change mechanism 31 therefore functions as the speed reduction mechanism that makes the auxiliary drive power transmission member 41 slower than the side of the differential casing 3A.

Accordingly, the rotational speed of the clutch plates 42A is higher than that of the clutch plates 42B and, when the multiplate clutch mechanism 42 is coupled, torque in an amount corresponding to the state of the coupling is fed (returned) from the side of the rear-wheel-side output shaft 6B to the side of the differential casing 3A.

On the other hand, the speed change mechanism 31 and the multiplate clutch mechanism 42, which are associated with the front-wheel-side output shaft 6A, are constructed likewise. When it is desired to distribute more drive torque from the differential casing 3A to the front-wheel-side output shaft 6A, the multiplate clutch mechanism 42 on the side of the rear-wheel-side output shaft 6B is suitably coupled in accordance with the desired amount of drive torque to be distributed (distribution ratio). When it is desired to distribute more to the rear-wheel-side output shaft 6B, the multiplate clutch mechanism 42 on the side of the front-wheel-side output shaft 6A is suitably coupled in accordance with the desired distribution ratio.

Since the multiplate clutch mechanism 42 is of the hydraulically driven type, the state of coupling of the multiplate clutch mechanism 42 can be controlled by adjusting the level of hydraulic pressure. The amount of drive power to be fed from the differential casing 3A to the front-wheel-side output shaft 6A or the rear-wheel-side output shaft 6B (namely, the front/rear distribution ratio of drive power) can be controlled at an appropriate level of accuracy.

Further, the front and rear multiplate clutch mechanisms 42 are designed in such a manner that they are not fully coupled at the same time. When one of the front and rear multiplate clutch mechanisms 42 is fully coupled, the other multiplate clutch mechanism 42 thus undergoes slipping.

Since the vehicle drive power distribution control system according to the sixth embodiment of this invention is constructed as described above, the distribution of torque is controlled, as in the second and fourth embodiments, by transferring a desired amount of torque on one side to the other side instead of controlling the distribution of torque by using an energy loss such as a brake. It is therefore possible to achieve a desired front/rear torque distribution ratio without inducing a large torque loss or energy loss.

The vehicle drive power distribution control system according to the seventh embodiment will next be described. The overall construction of a drive system of an automobile equipped with the system is substantially the same as that described above in connection with the first embodiment shown in FIG. 2. Description of the overall construction is therefore omitted herein.

Figure 17:
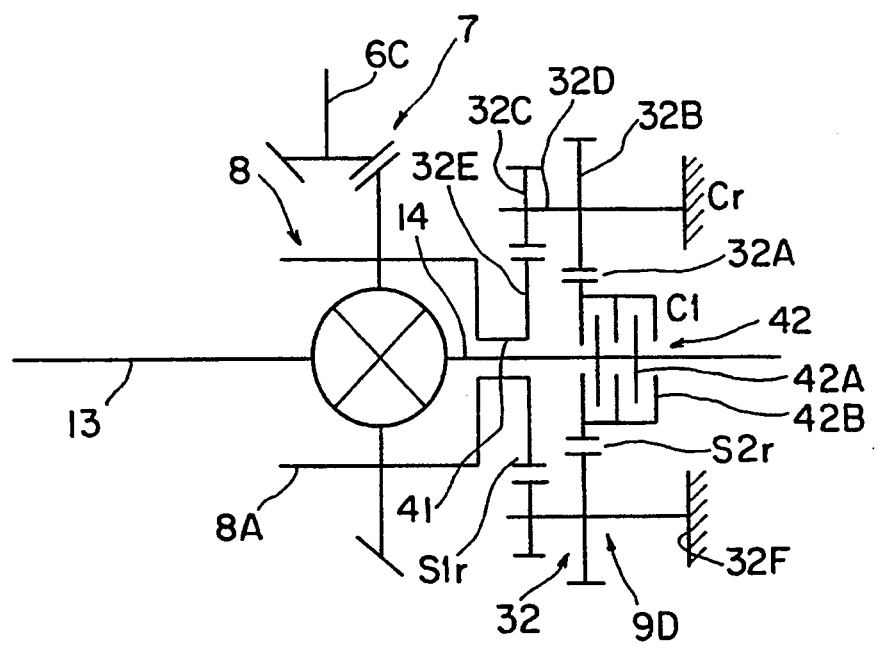

In its drive power transmission control mechanism 9D, a speed change mechanism 32 and the multiplate clutch mechanism 42 are arranged substantially as in the fifth embodiment as illustrated in FIG. 17. A first sun gear 32A is however formed smaller in diameter than the second sun gear 32E in this embodiment, whereby the rotational speed of the second sun gear 32E becomes lower than that of the first sun gear 32A. The speed change mechanism 32 therefore functions as a speed acceleration mechanism that makes the auxiliary drive power transmission member 41 faster than the side of the input shaft 6C.

Accordingly, the rotational speed of the clutch plates 42A is lower than that of the clutch plates 42B and, when the multiplate clutch mechanism 42 is coupled, torque in an amount corresponding to the state of the coupling is fed from the side of the input shaft 6C to the side of the right-wheel-side output shaft 14.

On the other hand, the speed change mechanism 32 and the multiplate clutch mechanism 42, which are associated with the left-wheel-side output shaft 13, are constructed likewise. When it is desired to distribute more drive torque from the input shaft 6C to the left-wheel-side output shaft 13, the multiplate clutch mechanism 42 on the side of the left-wheel-side output shaft 13 is suitably coupled in accordance with the desired amount of drive torque to be distributed (distribution ratio). When it is desired to distribute more to the right-wheel-side output shaft 14, the multiplate clutch mechanism 42 on the side of the right-wheel-side output shaft 14 is suitably coupled in accordance with the desired distribution ratio.

Since the multiplate clutch mechanism 42 is of the hydraulically driven type, the state of coupling of the multiplate clutch mechanism 42 can be controlled by adjusting the level of hydraulic pressure. The amount of drive power to be fed from the input shaft 6C to the left-wheel-side output shaft 13 or the right-wheel-side output shaft 14 (namely, the left/right distribution ratio of drive power) can be controlled at an appropriate level of accuracy.

Further, the left and right multiplate clutch mechanisms 42 are designed in such a manner that they are not fully coupled at the same time. When one of the left and right multiplate clutch mechanisms 42 is fully coupled, the other multiplate clutch mechanism 42 thus undergoes slipping.

In particular, the speed change ratio (acceleration ratio) of the above-described speed change mechanism 32 is also set to satisfy the below-described condition in the system of the seventh embodiment.

The speed change ratio is set in such a way that, even when the ratio in rotational speed of the left wheel to the right wheel becomes the greatest while the vehicle is cornering, the high/low relationship between a rotational speed on the side of the clutch plates 12A (i.e., on the side of the hollow shaft 11 which is the output means of the speed change mechanism 32) and that on the side of the clutch plates 12B (i.e., on the side of the differential casing 8A which is on the side of the input shaft 6C) in the multiplate clutch mechanism 42 remains unchanged.

Incidentally, the speed change ratio (acceleration ratio) of the speed change mechanism 32 is determined by the gear ratio of the first sun gear 32A, the second sun gear 32E, the first planetary gear 32B and the second planetary gear 32D.

Using the controllable maximum rotational speed ratio Smax and the maximum left/right wheel speed ratio $\alpha max$, the setting conditions for the speed change ratio (acceleration ratio) of the speed change mechanism 32 can be rephrased as setting the speed change ratio to satisfy the following formula:

$$Smax > \alpha max$$

No matter how big difference in rotation speed occurs between the left and right wheels upon cornering of a vehicle, such setting always makes it possible in the illustrated embodiment to couple the multiplate clutch mechanism 42 on the side of the left-wheel-side output shaft 13 so that drive torque from the input shaft 6C can be distributed more to the side of the left wheel. Coupling of the multiplate clutch mechanism 12 on the side of the right-wheel-side output shaft 14, on the other hand, allows to distribute more drive torque from the input shaft 6C to the side of the right wheel.

Since the vehicle drive power distribution control system according to the seventh embodiment of this invention is constructed as described above, the distribution of torque is controlled, as in the first, third and fifth embodiments, by transferring a desired amount of torque on one side to the other side instead of controlling the distribution of torque by using an energy loss such as a brake. It is therefore possible to distribute torque at a desired ratio to the left and right wheels without inducing a large torque loss or energy loss.

As it is always possible to distribute more torque to the side of the left wheel by coupling the multiplate clutch mechanism 42 on the side of the left-wheel-side output shaft 13 or to the side of the right wheel by coupling the multiplate clutch mechanism 42 on the side of the right-wheel-side output shaft 14, it is always feasible, as in the third embodiment, to increase the torque to be distributed to the side of the left wheel or to the side of the right wheel.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

Figure 18:
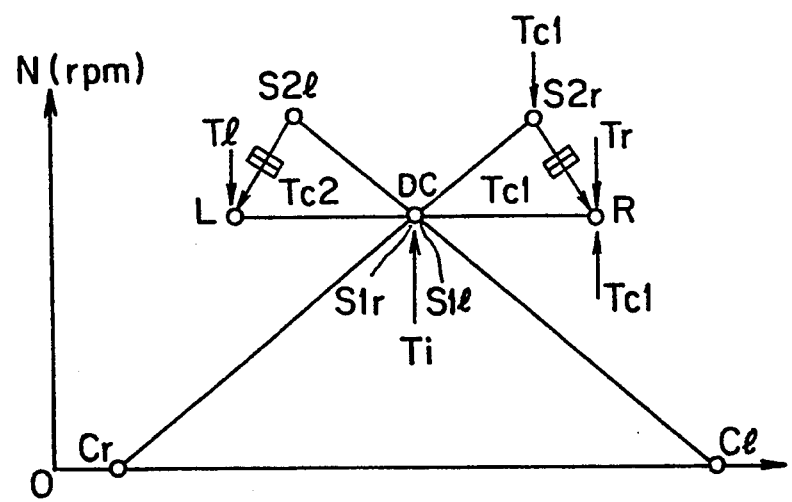
Figure 19:
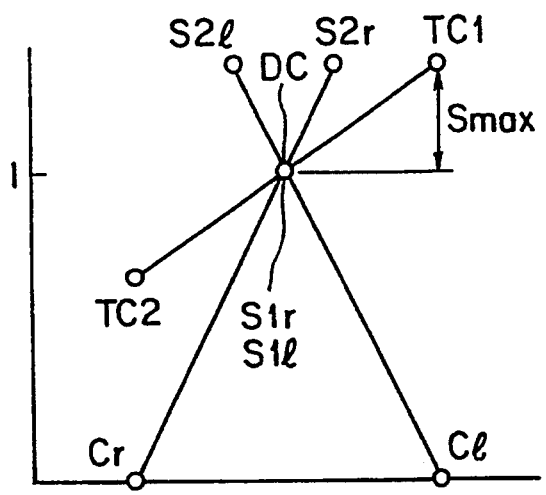

Here, the clutch capacity and energy loss of the vehicle drive power distribution control system will be considered with reference to FIGS. 18 and 19.

In FIGS. 18 and 19, each symbol followed "l" relates to the left wheel whereas each symbol followed by "r" pertains to the right wheel. Cl,Cr each represents the rotational speed of the carrier 32F and is 0 as the carrier 32F does not rotate here. S1l,S1r each stands for the rotational speed of the second sun gear 32E. S2l,S2r each indicates the rotational speed of the first sun gear 32A. Because the first sun gear 32A has a smaller diameter than the second sun gear 32E, the rotational speeds S2l,S2r are higher than the rotational speeds S1l,S1r.

Further, $Z_1$ is the number of teeth of the second sun gear 32E, $Z_2$ the number of teeth of the first sun gear 32A, $Z_3$ the number of teeth of a planetary gear 32C, $Z_4$ the number of teeth of the planetary gear 32B, Ti the input torque to the differential casing 8A, Tl,Tr the torques distributed to the left wheel and the right wheel, respectively, Tc1 the torque transmitted in the left direction when the multiplate clutch mechanism 42 in a right-wheel-side drive power transmission control mechanism 9D has been coupled, and Tc2 the torque transmitted in the right direction when the multiplate clutch mechanism 42 in the left-wheel-side drive power transmission control mechanism 9D has been coupled.

FIG. 18 illustrates a state in which the left and right wheels are rotating at the same speed, while FIG. 19 shows a state in which the multiplate clutch mechanism 42 in the right-wheel-side drive power transmission control mechanism 9D is fully coupled, the right wheel is restrained from rotation by the multiplate clutch mechanism 42 and the rotational speed on the side of the right wheel is decelerated, and the rotational speed on the side of the left wheel is accordingly accelerated.

The preset speed ratio of the planetary gear mechanism for achieving Smax (the controllable left/right rotational speed difference range) will be derived first.

This state of Smax is shown in FIG. 19. When the multiplate clutch mechanism 42 is fully coupled, the rotational speed DC of the differential casing 8A and the rotational speed S2r of the second sun gear 31E become equal to each other.

Accordingly, from FIG. 19, $$Z_3/Z_1 : Z_4/Z_2 = 1 : 1 + Smax$$

$$\therefore Z_2/Z_3/Z_1Z_4 = 1/(1+Smax) \qquad (2.23)$$

Next, the coupling torque Tc required for $\Delta T$ (the decrement in drive power from the side of the right wheel) will be derived. From a torque balancing formula at the differential [where the coupling (i.e., the multiplate clutch mechanism 42) associated with the right wheel has been brought into a transmitting state], $$Ti + (Z_1Z_4/Z_2Z_3)Tc = Tl + [Tr - Tc]$$

$$Tl = Tr - Tc \qquad (2.24)$$

From formulae (2.23) and (2.24), the drive torques of the left and right wheels are expressed as follows:

$$Tr = (\tfrac{1}{2})Tr + [(1-Smax)/2]Tc$$

$$Tl = (\tfrac{1}{2})Ti - [(1+Smax)/2]Tc \qquad (2.25)$$

Hence, $$\Delta T = |Tr - Tl| = Tc$$

Therefore, the coupling torque Tc required for $\Delta T$ is:

$$Tc = \Delta T \qquad (2.26)$$

The energy loss $\Delta E'$ (namely, the energy absorbed in the clutch) per unit time will next be determined. Here, assume:

$$|S| < Smax.$$

Then, the slip speed ratio Sc at the coupling is expressed as follows:

$$Z_3/Z_1 \cdot Z_4/Z_2 = 1:x$$

$$\therefore x = Z_1 Z_4 / Z_2 Z_3 = 1 + S_{max} \quad (2.27)$$

Hence, $$Sc = 1 + S_{max} - (1+S) = S_{max} - S \quad (2.28)$$

Accordingly, the energy loss $\Delta E'$ ($=d\Delta E/dt$) per unit time is:

$$\begin{aligned}\Delta E' &= Tc \cdot Sc \cdot \omega_{DC} \\ &= (S_{max} - S) \cdot \Delta T \cdot \omega_{DC}\end{aligned} \quad (2.29)$$

From the foregoing results, the vehicle drive power distribution control system according to the seventh embodiment is, in terms of clutch capacity, comparable with that (see FIG. 14) of the fifth embodiment, advantageous compared with that (see FIG. 3) of the first embodiment, and disadvantageous compared with that (see FIG. 9) of the third embodiment.

Further, the energy loss $\Delta E'$ is equal to those in the first to sixth embodiments so that the energy loss $\Delta E'$ required to produce a moment in a turning direction is relatively small.

Like the systems of the first embodiment (see FIG. 3), the third embodiment (see FIG. 9) and the fifth embodiment (see FIG. 14), the torque changes from the torque at the time where no control is effected (namely, $Tr = Tl$) are as follows:

$$\left(\begin{array}{c}\text{Torque change on}\\ \text{the decelerated side}\end{array}\right) > \left(\begin{array}{c}\text{Torque change on}\\ \text{the accelerated side}\end{array}\right)$$

A description will next be made of the vehicle drive power distribution control system according to the eighth embodiment. In this system, the system of the seventh embodiment described above is applied for the distribution of torque between front and rear wheels. Namely, the system of the eighth embodiment is similar to the system of the above-described sixth embodiment except that the drive power transmission control mechanism 5C has been changed to a drive power transmission control mechanism 5D.

The overall construction of a drive system of an automobile equipped with the system of the eighth embodiment is substantially the same as that described above in connection with the second embodiment shown in FIG. 5. Description of the overall construction is therefore omitted herein, and its drive power transmission control mechanism 5D will be described with reference to FIG. 20. In FIG. 20, the drive power transmission control mechanism 5D on the side of the rear wheels is only illustrated and a drive power transmission control mechanism on the side of the front wheels is omitted. It is to be noted that a drive power transmission control mechanism similar to the one on the side of the rear wheels is also provided on the side of the front wheels in a symmetrical relation with the mechanism on the side of the rear wheels.

In its drive power transmission control mechanism 5D, the speed change mechanism 32 and the multiplate clutch mechanism 42 are arranged substantially as in the sixth embodiment. The first sun gear 31A is however formed smaller in diameter than the second sun gear 31E in this embodiment, whereby the rotational speed of the second sun gear 31E becomes lower than that of the first sun gear 31A. The speed change mechanism 32 therefore functions as a speed acceleration mechanism that makes the auxiliary drive power transmission member 41 faster than the side of the differential casing 3A.

Accordingly, the rotational speed of the clutch plates 42A is lower than that of the clutch plates 42B and, when the multiplate clutch mechanism 42 is coupled, torque in an amount corresponding to the state of the coupling is fed from the side of the differential casing 3A to the side of the rear-wheel-side output shaft 6B.

On the other hand, the speed change mechanism 32 and the multiplate clutch mechanism 42, which are associated with the front-wheel-side output shaft 6A, are constructed likewise. When it is desired to distribute more drive torque from the differential casing 3A to the front-wheel-side output shaft 6A, the multiplate clutch mechanism 42 on the side of the front-wheel-side output shaft 6A is suitably coupled in accordance with the desired amount of drive torque to be distributed (distribution ratio). When it is desired to distribute more to the rear-wheel-side output shaft 6B, the multiplate clutch mechanism 42 on the side of the rear-wheel-side output shaft 6B is suitably coupled in accordance with the desired distribution ratio.

Since the multiplate clutch mechanism 42 is of the hydraulically driven type, the state of coupling of the multiplate clutch mechanism 42 can be controlled by adjusting the level of hydraulic pressure. The amount of drive power to be fed from the differential casing 3A to the front-wheel-side output shaft 6A or the rear-wheel-side output shaft 6B (in other words, the front/rear distribution ratio of drive power) can be controlled at an appropriate level of accuracy.

Further, the front and rear multiplate clutch mechanisms 42 are designed in such a manner that they are not fully coupled at the same time. When one of the front and rear multiplate clutch mechanisms 42 is fully coupled, the other multiplate clutch mechanism 42 thus undergoes slipping.

Since the vehicle drive power distribution control system according to the eighth embodiment of this invention is constructed as described above, the distribution of torque is controlled, as in the second, fourth and sixth embodiments, by transferring a desired amount of torque on one side to the other side instead of controlling the distribution of torque by using an energy loss such as a brake. It is therefore possible to achieve a desired front/rear torque distribution ratio without inducing a large torque loss or energy loss.

The vehicle drive power distribution control system according to the ninth embodiment will next be described. The overall construction of a drive system of an automobile equipped with the system is substantially the same as that described above in connection with the first embodiment shown in FIG. 2. Description of the overall construction is therefore omitted herein.

In the ninth embodiment, as in the first embodiment (see FIGS. 1 and 2), there are provided, as shown in FIG. 21, the input shaft 6C, to which rotational drive power is inputted, and the left-wheel-side and right-wheel-side output shafts 13,14 for outputting drive power inputted from the input shaft 6C. The system of the ninth embodiment is interposed among the leftwheel-side output shaft 13, the right-wheel-side output shaft 14 and the input shaft 6C.

Owing to the construction to be described next, the drive power transmission control mechanism 9F of the vehicle drive power distribution control system can distribute drive power, which is to be transmitted to the left-wheel-side output shaft 13 and the right-wheel-side output shaft 14, at a desired ratio while permitting a differential motion between the left-wheel-side output shaft 13 and the right-wheel-side output shaft 14.

Between the input shaft 6C and each of the left-wheel-side and right-wheel-side output shafts 13,14, a speed change mechanism 60 and the multiplate clutch mechanism 12 are interposed so that a rotational speed of the left-wheel-side output shaft 13 or the right-wheel-side output shaft 14 is decelerated by the speed change mechanism 60 and is transmitted to the hollow shaft 11 as an output means (an auxiliary transmission member for drive power) of the speed change mechanism 60.

The multiplate clutch mechanism 12 is interposed between the hollow shaft 11 and the differential casing 8A on the side of the input shaft 6C. By coupling the multiplate clutch mechanism 12, drive power is fed from the differential casing 8A on the higher speed side to the hollow shaft 11 on the lower speed side, because as general characteristics of clutch plates arranged in opposition to each other, the transmission of torque takes place from the clutch plates rotating at a higher speed to the clutch plates rotating at a lower speed.

When the multiplate clutch mechanism 12, for example, between the right-wheel-side output shaft 14 and the input shaft 6C is coupled, the drive power distributed to the right-wheel-side output shaft 14 is increased in the course of its direct transmission from the side of the input shaft 6C through the multiplate clutch mechanism 12 so that the drive power to be distributed to the left-wheel-side output shaft 13 is increased correspondingly.

The above-described speed change mechanism 60 is constructed of a single planetary gear mechanism. Taking by way of example the speed change mechanism 60 provided on the right-wheel-side output shaft 14, a description will be made next.

A sun gear 60A is fixed on the right-wheel-side output shaft 14. The sun gear 60A is, at an outer periphery thereof, in meshing engagement with a planetary gear (planetary pinion) 60B. A pinion shaft 60C on which the planetary gear 60B is pivotally supported is rotatably supported on the hollow shaft 11, so that the hollow shaft il can function as a carrier for the planetary gear mechanism. Further, the planetary gear 60B is in meshing engagement with a ring gear 60D which is fixed on a casing or the like of the drive power transmission control mechanism 9F to avoid rotation.

Since the revolution speed of the planetary gear 60B is lower than the rotation speed of the sun gear 60A in such a planetary gear mechanism, the hollow shaft 11 (namely, the output means of the speed-change mechanism 60) rotates at a lower speed than the right-wheel-side output shaft 14. The speed change mechanism 60 therefore functions as a speed reduction mechanism.

The rotational speed of the clutch plates 12A is therefore lower than that of the clutch plates 12B. When the multiplate clutch mechanism 12 is coupled, torque in a amount corresponding to the state of the coupling is fed from the side of the input shaft 6C to the side of right-wheel-side output shaft 14.

The speed change mechanism 60 and the multiplate clutch mechanism 12, both provided on the side of the left-wheel-side output shaft 13, are constructed likewise. When it is desired to distribute more drive torque from the input shaft 6C to the left-wheel-side output shaft 13, the multiplate clutch mechanism 12 on the side of the left-wheel-side output shaft 13 is suitably coupled in accordance with the desired amount of drive torque to be distributed (distribution ratio). When it is desired to distribute more to the right-wheel-side output shaft 14, on the other hand, the multiplate clutch mechanism 12 on the side of the right-wheel-side output shaft 14 is suitably coupled in accordance with the distribution ratio.

Since the multiplate clutch mechanism 12 is of the hydraulically driven type, the state of coupling of the multiplate clutch mechanism 12 can be controlled by adjusting the level of the hydraulic pressure so that the amount of drive power to be fed to the left-wheel-side output shaft 13 or the right-wheel-side output shaft 14 from the input shaft 6C (namely, the left/right distribution ratio of the drive power) can be controlled at an appropriate accuracy.

The left and right multiplate clutch mechanisms 12 are arranged such that they are prevented from being fully coupled at the same time. They are designed in such a manner that, when one of the left and right multiplate clutch mechanisms 12 is fully coupled, the other multiplate clutch mechanism 12 undergoes slipping.

In particular, the speed change ratio (acceleration ratio) of the above-described speed change mechanism 60 is also set to satisfy the below-described condition in the system of the seventh embodiment.

The speed change ratio is set in such a way that, even when the ratio in rotational speed of the left wheel to the right wheel becomes the greatest while the vehicle is cornering, the high/low relationship between a rotational speed on the side of the clutch plates 12A (i.e., on the side of the hollow shaft 11 which is the output means of the speed change mechanism 60) and that on the side of the clutch plates 12B (i.e., on the side of the differential casing 8A which is on the side of the input shaft 6C) in the multiplate clutch mechanism 12 remains unchanged.

Incidentally, the speed change ratio (acceleration ratio) of the speed change mechanism 60 is determined by the gear ratio of the sun gear 60A and planetary gear 60B.

Using the controllable maximum rotational speed ratio Smax and the maximum left/right wheel speed ratio $\alpha$max, the setting conditions for the speed change ratio (acceleration ratio) of the speed change mechanism 60 can be rephrased as setting the speed change ratio to satisfy the following formula:

$$S_{max} > \alpha_{max}$$

No matter how big difference in rotation speed occurs between the left and right wheels upon cornering of a vehicle, such setting always makes it possible in the illustrated embodiment to couple the multiplate clutch mechanism 12 on the side of the left-wheel-side output shaft 13 so that drive torque from the input shaft 6C can be distributed more to the side of the left wheel or to couple the multiplate clutch mechanism 12 on the side of the right-wheel-side output shaft 14 so that drive torque from the input shaft 6C can be distributed more to the side of the right wheel.

Since the vehicle drive power distribution control system according to the ninth embodiment of this invention is constructed as described above, the distribution of torque is controlled, as in the first, third, fifth and seventh embodiments, by transferring a desired amount of torque on one side to the other side instead of controlling the distribution of torque by using an energy loss such as a brake. It is therefore possible to distribute torque at a desired ratio to the left and right wheels without inducing a large torque loss or energy loss.

As it is always possible, as in the third embodiment, to distribute more torque to the side of the left wheel by coupling the multiplate clutch mechanism 12 on the side of the left-wheel-side output shaft 13 or to the side of the right wheel by coupling the multiplate clutch mechanism 12 on the side of the right-wheel-side output shaft 14, it is always feasible to increase the torque to be distributed to the side of the left wheel or to the side of the right wheel.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

A description will next be made of the vehicle drive power distribution control system according to the tenth embodiment. In this system, the system of the ninth embodiment described above is applied for the distribution of torque between front and rear wheels.

The overall construction of a drive system of an automobile equipped with the system of the tenth embodiment is substantially the same as that described above in connection with the second embodiment shown in FIG. 5. Description of the overall construction is therefore omitted herein.

In the tenth embodiment, as in the second embodiment (see FIG. 5), there are provided, as shown in FIG. 22, the differential casing 3A, to which rotational drive power is inputted, and the front-wheel-side and rear-wheel-side output shafts 6A,6B for outputting drive power inputted from the differential casing 3A. The system of the tenth embodiment is interposed among the front-wheel-side output shaft 6A, the rear-wheel-side output shaft 6B and the differential casing 3A.

The drive power transmission control mechanism 5F of the vehicle drive power distribution control system according to the tenth embodiment is constructed like the drive power transmission control mechanism 9F of the ninth embodiment, so that the drive power to be transmitted to the front-wheel-side output shaft 6A and the rear-wheel-side output shaft 6B can be distributed at a desired ratio to them while permitting a differential motion between the front-wheel-side output shaft 6A and the rear-wheel-side output shaft 6B.

Between the differential casing 3A and each of the front-wheel-side and rear-wheel-side output shaft 6A,6B, the speed change mechanism 60 and the multiplate clutch mechanism 12 are interposed so that a rotational speed of the front-wheel-side output shaft 6A or the rear-wheel-side output shaft 6B is decelerated by the speed change mechanism 60 and is outputted to the hollow shaft 11 as an output means (an auxiliary transmission member for drive power) of the speed change mechanism 60.

The speed change mechanism 60 and the multiplate clutch mechanism 12 are similar to those in the ninth embodiment and their description is omitted herein. Incidentally, in FIG. 22, numerals similar to those employed in FIG. 21 indicate like elements of structure.

Since the vehicle drive power distribution control system according to the tenth embodiment of this invention is constructed as described above, the distribution of torque is controlled, as in the second, fourth, sixth and eighth embodiments, by transferring a desired amount of torque on one side to the other side instead of controlling the distribution of torque by using an energy loss such as a brake. It is therefore possible to achieve a desired front/rear torque distribution ratio without inducing a large torque loss or energy loss.

The vehicle drive power distribution control system according to the eleventh embodiment will next be described. The overall construction of a drive system of an automobile equipped with the system is substantially the same as that described above in connection with the first embodiment shown in FIG. 2. Description of the overall construction is therefore omitted herein. In the eleventh embodiment, as in the first embodiment (see FIGS. 1 and 2), there are provided, as shown in FIG. 23, the input shaft 6C and the left-wheel-side and right-wheel-side output shafts 13,14. The system of the eleventh embodiment is interposed among the left-wheel-side output shaft 13, the right-wheel-side output shaft 14 and the input shaft 6C.

A drive power transmission control mechanism 9G in the vehicle drive power distribution control system is equipped with the speed change mechanism 60 as in the ninth embodiment (see FIG. 21). This speed change mechanism 60 is connected to the side of the input shaft 6C so that rotation on the side of the input shaft 6C is accelerated and outputted to the side of the output shafts 13,14.

In place of the multiplate clutch mechanisms 12 in the sixth embodiment, couplings 61 such as friction clutches are interposed between the sun gear 60A as an output means of the speed change mechanism and the output shafts 13,14, respectively. Where friction clutches are employed, those capable of transmitting torque in one direction are arranged in predetermined directions (i.e., with their torque transmitting directions aligned with the torque transmitting directions of the output shafts 13,14), respectively.

The speed change mechanism 60 is constructed of a single planetary gear mechanism. Taking by way of example the speed change mechanism 60 provided on the right-wheel-side output shaft 14, the speed change mechanism 60 will be described next. The sun gear 60A is fixed on one end (the input side) of coupling 61. The sun gear 60A is, at an outer periphery thereof, in meshing engagement with the planetary gear (planetary pinion) 60B. The pinion shaft 60C on which the planetary gear 60B is pivotally supported is rotatably supported on the carrier 60E provided extending from the differential casing 8A. The planetary gear 60B is in meshing engagement with the ring gear 60D which is fixed on a casing of the drive power transmission control mechanism 9G or the like to avoid rotation.

In the planetary gear mechanism constructed as described above, the revolution speed of the planetary gear 60B is lower than the rotation speed of the sun gear 60A so that the side of the sun gear 60A (namely, the output means of the speed change mechanism 60) rotates at a higher speed than the hollow shaft 11. The speed change mechanism 60 therefore functions as an accelerating mechanism.

The difference in rotational speed between the left and right wheels is therefore small. When the coupling 61 is engaged while the output shaft 14 is rotating at a speed close to the differential casing 8A, torque in an amount corresponding to the state of the engagement is fed from the side of the differential casing 8A (i.e., the side of the input shaft 6C) to the side of the right-wheel-side output shaft 14.

The speed change mechanism 60 and the coupling 61, both provided on the side of the left-wheel-side output shaft 13, are constructed likewise. When it is desired to distribute more drive torque from the input shaft 6C to the left-wheel-side output shaft 13, the coupling 61 on the side of the left-wheel-side output shaft 13 is suitably engaged in accordance with the desired amount of drive torque to be distributed (distribution ratio). When it is desired to distribute more to the right-wheel-side output shaft 14, on the other hand, the coupling 61 on the side of the right-wheel-side output shaft 14 is suitably engaged in accordance with the distribution ratio.

By controlling the state of engagement of the coupling 61 at this time, the amount of drive power to be fed to the left-wheel-side output shaft 13 or the right-wheel-side output shaft 14 from the input shaft 6C (namely, the left/right distribution ratio of the drive power) can be controlled at an appropriate accuracy.

The left and right couplings 61 are also arranged such that they are prevented from being fully engaged at the same time. They are designed in such a manner that, when one of the left and right couplings 61 is fully coupled, the other coupling 61 undergoes slipping.

In particular, the speed change ratio (acceleration ratio) of the above-described speed change mechanism 60 is also set to satisfy the below-described condition in the system of the eleventh embodiment.

The speed change ratio is set in such a way that, even when the ratio in rotational speed of the left wheel to the right wheel becomes the greatest while the vehicle is cornering, the high/low relationship between a rotational speed on one side of the coupling 61 (i.e., on the side of the sun gear 60A which is the output means of the speed change mechanism 60) and that on the side of the coupling 61 (i.e., on the side of the output shaft 13 or 14) remains unchanged.

Incidentally, the speed change ratio (acceleration ratio) of the speed change mechanism 60 is also determined by the gear ratio between the sun gear 60A and the planetary gear 60B.

Using the controllable maximum rotational speed ratio Smax and the maximum left/right wheel speed ratio αmax, the setting conditions for the speed change ratio (acceleration ratio) of the speed change mechanism 60 can be rephrased as setting the speed change ratio to satisfy the following formula:

Smax > αmax

No matter how big difference in rotation speed occurs between the left and right wheels upon cornering of a vehicle, such setting always makes it possible in the illustrated embodiment to engage the coupling 61 on the side of the left-wheel-side output shaft 13 so that drive torque from the input shaft 6C can be distributed more to the side of the left wheel or to engage the coupling 61 on the side of the right-wheel-side output shaft 14 so that drive torque from the input shaft 6C can be distributed more to the side of the right wheel.

Since the vehicle drive power distribution control system according to the eleventh embodiment of this invention is constructed as described above, the distribution of torque is controlled, as in the first, third, fifth, seventh and ninth embodiments, by transferring a desired amount of torque on one side to the other side instead of controlling the distribution of torque by using an energy loss such as a brake. It is therefore possible to distribute torque at a desired ratio to the left and right wheels without inducing a large torque loss or energy loss.

As it is always possible, as in the ninth embodiment, to distribute more torque to the side of the left wheel by engaging the coupling 61 on the side of the left-wheel-side output shaft 13 or to the side of the right wheel by engaging the coupling 61 on the side of the right-wheel-side output shaft 14, it is always feasible to increase the torque to be distributed to the side of the left wheel or to the side of the right wheel.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

A description will next be made of the vehicle drive power distribution control system according to the twelfth embodiment. In this system,. the system of the eleventh embodiment described above is applied for the distribution of torque between front and rear wheels.

The overall construction of a drive system of an automobile equipped with the system of the eleventh embodiment is substantially the same as that described above in connection with the second embodiment shown in FIG. 5. Description of the overall construction is therefore omitted herein.

In the eleventh embodiment, as in the second embodiment (see FIG. 5), there are provided, as shown in FIG. 24, the differential casing 3A and the front-wheel-side and rear-wheel-side output shafts 6A,6B. The system of the eleventh embodiment is interposed among the front-wheel-side output shaft 6A, the rear-wheel-side output shaft 6B and the differential casing 3A.

The drive power transmission control mechanism 5G in the vehicle drive power distribution control system is equipped with the speed change mechanism 60 as in the tenth embodiment (see FIG. 22). This speed change mechanism 60 is connected to the side of the differential casing 3A so that rotation on the side of the differential casing 3A is accelerated and outputted to the side of the output shafts 6A,6B.

In place of the multiplate clutch mechanisms 12 in the tenth embodiment, the couplings 61 such as friction clutches are interposed between the sun gear 60A as an output means of the speed change mechanism 60 and the output shafts 6A,6B, respectively. Where friction clutches are employed, those capable of transmitting torque in one direction are arranged in predetermined directions (i.e., with their torque transmitting directions aligned with the torque transmitting directions of the output shafts 6A,6B), respectively.

As the speed change mechanism 60 is substantially the same as that employed in the eleventh embodiment, its description is omitted herein. In FIG. 24, numerals similar to those employed in FIG. 23 indicate like elements of structure.

Since the vehicle drive power distribution control system according to the twelfth embodiment of this invention is constructed as described above, the distribution of torque is controlled, as in the second, fourth, sixth, eighth and tenth embodiments, by transferring a desired amount of torque on one side to the other side instead of controlling the distribution of torque by using an energy loss such as a brake. It is therefore possible to achieve a desired front/rear torque distribution ratio without inducing a large torque loss or energy loss.

The vehicle drive power distribution control system according to the thirteenth embodiment will next be described. The overall construction of a drive system of an automobile equipped with the system is substantially the same as that described above in connection with the first embodiment shown in FIG. 2. Description of the overall construction is therefore omitted herein.

In the thirteenth embodiment, as in the first embodiment (see FIGS. 1 and 2), there are provided, as shown in FIG. 25, the input shaft 6C, to which rotational drive power is inputted, and the left-wheel-side and right-wheel-side output shafts 13,14 for outputting drive power inputted from the input shaft 6C. The system of the thirteenth embodiment is interposed among the left-wheel-side output shaft 13, the right-wheel-side output shaft 14 and the input shaft 6C.

Owing to the construction to be described below, the drive power transmission control mechanism 9H of the vehicle drive power distribution control system can distribute drive power, which is to be transmitted to the left-wheel-side output shaft 13 and the right-wheel-side output shaft 14, at a desired ratio while permitting a differential motion between the left-wheel-side output shaft 13 and the right-wheel-side output shaft 14.

Between the input shaft 6C and each of the left-wheel-side and right-wheel-side output shafts 13,14, a speed change mechanism 62 and the multiplate clutch mechanism 12 are interposed. This speed change mechanism 62 can output a rotational speed after either accelerating or decelerating it by an output means, and is provided with a change-over mechanism 63 for changing over a state in which the rotational speed is outputted after acceleration (an accelerated output state) and a state in which the rotational speed is outputted after deceleration (a decelerated output state). Because of this, only one speed change mechanism 62 and only one multiplate clutch mechanism 12 are provided on the side of only one of the output shafts (on the side of the left-wheel-side output shaft 13 in this embodiment).

The above-described speed change mechanism 62 is constructed of three sets of planetary gear mechanisms connected in series to one another. On the side of the left-wheel-side output shaft 13, there are provided a large-diameter sun gear 62A and a small-diameter sun gear 62D. These sun gears 62A,62D are at their outer peripheries in meshing engagement with planetary gears (planetary pinions) 62B,62E, respectively.

These planetary gears 62B,62E are mounted on a pinion shaft 62C, which is rotatably supported on a common carrier (a stationary part), in such a way that the planetary gears 62B,62E are rotatable integrally with the pinion shaft 62C. In contrast to the relationship in diameter between the sun gears 62A and 62D, the diameter of the planetary gear 62B is formed smaller than that of the planetary gear 62E.

Another planetary gear 62F is also mounted on the pinion shaft 62C in such a manner that the planetary gear 62F is rotatable integrally with the pinion shaft 62C. Another sun gear 62G fixed on the hollow shaft 11 is disposed in meshing engagement with the planetary gear 62F. Incidentally, the diameter of the sun gear 62G is set smaller than that of the sun gear 62A but greater than that of the sun gear 62D, while the diameter of the planetary gear 62F is set greater than that of the planetary gear 62B but smaller than that of the planetary gear 62E.

The change-over mechanism 63 is provided between the sun gears 62A,62D and the left-wheel-side output shaft 13. This change-over mechanism 63 is constructed of an electromagnetic actuator (solenoid) 63A, a slide lever 63B driven by the actuator 63A, a connector member 63C driven by the slide lever 63B, a hub 64 provided on the left-wheel-side output shaft 13, a hub 65 provided on an inner periphery of the sun gear 62A and a hub 66 provided on an inner periphery of the sun gear 62D. The electromagnetic actuator 63A is provided in such a manner that its operation is governed by the control unit 18.

The connector member 63C is serration-connected at its inner periphery with the hub 64. Depending on the axial position of the connector member 63C, the connector member 63C can be serration-connected at the inner periphery thereof with the hub 65 or the hub 66 so that they can rotate together as an integral unit.

When the connector member 63C is driven by the slide lever 63B to a retreated position (namely, to the position moved leftwards as viewed in FIG. 25), its outer periphery is brought into engagement with the hub 65 through serrations formed therein so that the connector member 63C rotates integrally with the hub 65. When the connector member 63C is driven by the slide lever 63B to an advanced position (namely, to the position moved rightwards as viewed in FIG. 25), its outer periphery is brought into engagement with the hub 66 through serrations formed therein so that the connector member 63C rotates integrally with the hub 66.

When the connector member 63C is at the retreated position, the left-wheel-side output shaft 13 is therefore connected to the sun gear 62A via the hub 64, the connector member 63C and the hub 65 so that rotation of the left-wheel-side output shaft 13 is outputted from the sun gear 62A, the planetary gear 62B and the pinion shaft 62C to the hollow shaft 11 via the planetary gear 62F and sun gear 62G. Since the diameter of the sun gear 62G is smaller than the diameter of the sun gear 62A and the diameter of the planetary gear 62F is greater than the diameter of the planetary gear 62B, the sun gear 62G rotates at a higher speed than the sun gear 62A. In other words, the hollow shaft 11 rotates at a higher speed than the left-wheel-side output shaft 13. The speed change mechanism 62 therefore functions as an accelerating mechanism.

When the connector member 63C is at the advanced position, on the other hand, the left-wheel-side output shaft 13 is connected to the sun gear 62D via the hub 64, the connector member 63C and the hub 66 so that rotation of the left-wheel-side output shaft 13 is outputted from the sun gear 62D, the planetary gear 62E and the pinion shaft 62C to the hollow shaft 11 via the planetary gear 62F and the sun gear 62G. Since the diameter of the sun gear 62G is greater than the diameter of the sun gear 62D and the diameter of the planetary gear 62F is smaller than the diameter of the planetary gear 62E, the sun gear 62G rotates at a lower speed than the sun gear 62D. In other words, the hollow shaft 11 rotates at a lower speed than the left-wheel-side output shaft 13. The speed change mechanism 62 therefore functions as a decelerating mechanism.

The multiplate clutch mechanism 12 is interposed between the hollow shaft 11 and the differential casing 8A which is disposed on the side of the input shaft 6C. By coupling the multiplate clutch mechanism 12, drive power can be transferred between the differential casing 8A and the hollow shaft 11.

When the connector member 63C is placed at the retreated position, for example, the hollow shaft 11 as the output means of the speed change mechanism 62 rotates at a higher speed than the left-wheel-side output shaft 13 so that drive power is returned from the side of the hollow shaft 11, which is rotating at the higher speed, to the side of the differential casing 8A. The drive power to be distributed to the side of the left-wheel-side output shaft 13 is decreased by the amount of drive power so returned and in contrast, the drive power to be distributed to the side of the right-wheel-side output shaft 14 is increased by the amount of drive power so returned.

When the connector member 63C is placed at the advanced position, for example, the hollow shaft 11 as the output means of the speed change mechanism 62 rotates at a lower speed than the left-wheel-side output shaft 13 so that drive power is returned from the side of the differential casing 8, which is rotating at the higher speed, to the side of the hollow shaft 11. The drive power to be distributed to the side of the left-wheel-side output shaft 13 is increased by the amount of drive power so returned and in contrast, the drive power to be distributed to the side of the right-wheel-side output shaft 14 is decreased by the amount of drive power so returned.

In particular, the speed change ratio (acceleration ratio) of the above-described speed change mechanism 62 is also set to satisfy the below-described condition in the system of the eleventh embodiment.

The speed change ratio is set in such a way that, even when the ratio in rotational speed of the left wheel to the right wheel becomes the greatest while the vehicle is cornering, the high/low relationship between a rotational speed on the side of the clutch plates 12A (i.e., on the side of the hollow shaft 11 which is the output means of the speed change mechanism 62) and that on the side of the clutch plates 12B (i.e., on the side of the differential casing 8A which is on the side of the input shaft 6C) in the multiplate clutch mechanism 12 remains unchanged.

Incidentally, the speed change ratio (acceleration ratio) of the speed change mechanism 62 is also determined by the preset gear ratios among the sun gear 62A, the planetary gear 62B, the planetary gear 62F (via the pinion shaft 62C) and the sun gear 62G as well as the preset gear ratio among the sun gear 62D, the planetary gear 62E, the planetary gear 62F (via the pinion shaft 62C) and the sun gear 62G).

Using the controllable maximum rotational speed ratio Smax and the maximum left/right wheel speed ratio $\alpha$max, the setting conditions for the speed change ratio (acceleration ratio) of the speed change mechanism 62 can be rephrased as setting the speed change ratio to satisfy the following formula:

$$S_{max} > \alpha_{max}$$

No matter how big difference in rotation speed occurs between the left and right wheels upon cornering of a vehicle, such setting always makes it possible in the illustrated embodiment to couple the multiplate clutch mechanism 12 by operating the connector member 63C to make the hub 65 rotate integrally with the hub 64 so that drive torque from the input shaft 6C can be distributed more to the side of the right wheel or to couple the multiplate clutch mechanism 12 by operating the connector member 63C to make the hub 66 rotate integrally with the hub 64 so that drive torque from the input shaft 6C can be distributed more to the side of the left wheel.

Since the vehicle drive power distribution control system according to the thirteenth embodiment of this invention is constructed as described above, the distribution of torque is controlled, as in the first to twelfth embodiments, by transferring a desired amount of torque on one side to the other side instead of controlling the distribution of torque by using an energy loss such as a brake. It is therefore possible to obtain a desired torque distribution ratio without inducing a large torque loss or energy loss.

Further, it is required to provide only one speed change mechanism 62 and only one multiplate clutch mechanism 12 so that the system according to the thirteenth embodiment is advantageous in space and cost.

As it is always possible to distribute more drive torque from the input shaft 6C to the side of the right wheel by operating the connector member 63C to make the hub 65 rotate integrally with the hub 64 and hence coupling the multiplate clutch mechanism 12 or to the side of the left wheel by operating the connector member 63C to make the hub 66 rotate integrally with the hub 64 and hence coupling the multiplate clutch mechanism 12, it is always feasible to increase the torque to be distributed to the side of the left wheel or to the side of the right wheel.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

A description will next be made of the vehicle drive power distribution control system according to the fourteenth embodiment. In this system, the system of the thirteenth embodiment described above is applied for the distribution of torque between front and rear wheels.

The overall construction of a drive system of an automobile equipped with the system of the fourteenth embodiment is substantially the same as that described above in connection with the second embodiment shown in FIG. 5. Description of the overall construction is therefore omitted herein.

In the fourteenth embodiment, as in the first embodiment (see FIG. 1), there are provided, as shown in FIG. 26, the differential casing 3A, to which rotational drive power is inputted, and the front-wheel-side and rearwheel-side output shafts 6A,6B for outputting drive power inputted from the differential casing 3A. The system of the fourteenth embodiment is interposed among the front-wheel-side output shaft 6A, the rear-wheel-side output shaft 6B and the differential casing 3A.

Owing to the construction to be described below, a drive power transmission control mechanism 5H of the vehicle drive power distribution control system can distribute drive power, which is to be transmitted to the front-wheel-side output shaft 6A and the rear-wheel-side output shaft 6B, at a desired ratio while permitting a differential motion between the front-wheel-side output shaft 6A and the rear-wheel-side output shaft 6B.

The drive power transmission control mechanism 5H is constructed of a speed change mechanism 53 and a hydraulic wet multiplate clutch mechanism 57 and is interposed between the rear-wheel-side output shaft 6B and the differential casing 3A. Of these, the speed change mechanism 53 can output a rotational speed from an output means after either accelerating or decelerating it by an output means, and is provided with a change-over mechanism 59 for changing over a state in which the rotational speed is outputted after acceleration (an accelerated output state) and a state in which the rotational speed is outputted after deceleration (a decelerated output state). Because of this, only one speed change mechanism 53 and only one multiplate clutch mechanism 57 are provided on the side of only one of the output shafts (on the side of the front-wheel-side output shaft 6A in this embodiment).

The above-described speed change mechanism 53 is constructed of three sets of planetary gear mechanisms connected in series to one another. On the side of the rear-wheel-side output shaft 6B, there are provided a large-diameter sun gear 53A and a small-diameter sun gear 53E. These sun gears 53A,53E are at their outer peripheries in meshing engagement with planetary gears (planetary pinions) 53B,53D, respectively.

These planetary gears 53B,53D are mounted on a pinion shaft 53C, which is rotatably supported on a common carrier (a stationary part), in such a way that the planetary gears 53B,53D are rotatable integrally with the pinion shaft 53C. In contrast to the relationship in diameter between the sun gears 53A and 53E, the diameter of the planetary gear 53B is formed greater than that of the planetary gear 53D.

Another planetary gear 53F is also mounted on the pinion shaft 53C in such a manner that the planetary gear 53F is rotatable integrally with the pinion shaft 53C. Another sun gear 53G fixed on the hollow shaft 11 is disposed in meshing engagement with the planetary gear 53F. Incidentally, the diameter of the sun gear 53G is set smaller than that of the sun gear 53A but greater than that of the sun gear 53E, while the diameter of the planetary gear 53F is set greater than that of the planetary gear 53B but smaller than that of the planetary gear 53D.

The change-over mechanism 59 is provided between the sun gears 53A,53E and the rear-wheel-side output shaft 6B. This change-over mechanism 59 is constructed of an electromagnetic actuator (solenoid) 59A, a slide lever 59B driven by the actuator 59A, a connector member 59C driven by the slide lever 59B, a hub 59D provided on the rear-wheel-side output shaft 6B, a hub 59E provided on an inner periphery of the sun gear 53A, and a hub 59F provided on an inner periphery of the sun gear 53E. The electromagnetic actuator 59A is provided in such a manner that its operation is governed by the control unit 18.

The connector member 59C is serration-connected at its inner periphery with the hub 59D. Depending on the axial position of the connector member 59C, the connector member 59C can be serration-connected at the inner periphery thereof with the hub 59E or the hub 59F so that they can rotate together as an integral unit.

When the connector member 59C is driven by the slide lever 59B to a retreated position (namely, to the position moved rightwards as viewed in FIG. 26), its outer periphery is brought into engagement with the hub 59E through serrations formed therein so that the connector member 59C rotates integrally with the hub 59E. When the connector member 59C is driven by the slide lever 59B to an advanced position (namely, to the position moved leftwards as viewed in FIG. 26), its outer periphery is brought into engagement with the hub 59F through serrations formed therein so that the connector member 59C rotates integrally with the hub 59F.

When the connector member 59C is at the retreated position, the rear-wheel-side output shaft 6B is therefore connected to the sun gear 53A via the hub 59D, the connector member 59C and the hub 59E so that rotation of the rear-wheel-side output shaft 6B is outputted from the sun gear 53A, the planetary gear 53B and the pinion shaft 53C to the hollow shaft 11 via the planetary gear 53F and sun gear 53G. Since the diameter of the sun gear 53G is smaller than the diameter of the sun gear 53A and the diameter of the planetary gear 53F is greater than the diameter of the planetary gear 53B, the sun gear 53G rotates at a higher speed than the sun gear 53A. In other words, the hollow shaft 11 rotates at a higher speed than the rear-wheel-side output shaft 6B. The speed change mechanism 53 therefore functions as an accelerating mechanism.

When the connector member 59C is at the advanced position, on the other hand, the rear-wheel-side output shaft 6B is connected to the sun gear 53E via the hub 59D, the connector member 59C and the hub 59F so that rotation of the rear-wheel-side output shaft 6B is outputted from the sun gear 53E, the planetary gear 53D and the pinion shaft 53C to the hollow shaft 11 via the planetary gear 53F and the sun gear 53G. Since the diameter of the sun gear 53G is greater than the diameter of the sun gear 53E and the diameter of the planetary gear 53F is smaller than the diameter of the planetary gear 53D, the sun gear 53G rotates at a lower speed than the sun gear 53E. In other words, the hollow shaft 11 rotates at a lower speed than the rear-wheel-side output shaft 6B. The speed change mechanism 53 therefore functions as an decelerating mechanism.

The multiplate clutch mechanism 57 is interposed between the hollow shaft 11 and the differential casing 3A which is disposed on the side of the differential casing 3A. By coupling the multiplate clutch mechanism 57, drive power can be transferred between the differential casing 3A and the hollow shaft 11.

When the connector member 59C is placed at the retreated position, for example, the hollow shaft 11 as the output means of the speed change mechanism 53 rotates at a higher speed than the rear-wheel-side output shaft 6B so that drive power is returned from the side of the hollow shaft 11, which is rotating at the higher speed, to the side of the differential casing 3A. The drive power to be distributed to the side of the rear-wheel-side output shaft 6B is decreased by the amount of drive power so returned and in contrast, the drive power to be distributed to the side of the front-wheel-side output shaft 6A is increased by the amount of drive power so returned.

When the connector member 59C is placed at the advanced position, for example, the hollow shaft 11 as the output means of the speed change mechanism 53 rotates at a lower speed than the rear-wheel-side output shaft 6B so that drive power is returned from the side of the differential casing 3A, which is rotating at the higher speed, to the side of the hollow shaft 11. The drive power to be distributed to the side of the rear-wheel-side output shaft 6B is increased by the amount of drive power so returned and in contrast, the drive power to be distributed to the side of the front-wheel-side output shaft 6A is decreased by the amount of drive power so returned.

Since the vehicle drive power distribution control system according to the fourteenth embodiment of this invention is constructed as described above, the distribution of torque is controlled, as in the second, fourth, sixth, eighth, tenth and twelfth embodiments, by transferring a desired amount of torque on one side to the other side instead of controlling the distribution of torque by using an energy loss such as a brake. It is therefore possible to achieve a desired front/rear torque distribution ratio without inducing a large torque loss or energy loss.

Further, it is required to provide only one speed change mechanism 53 and only one multiplate clutch mechanism 57 so that the system according to the fourteenth embodiment is advantageous in space and cost.

The vehicle drive power distribution control system according to the fifteenth embodiment will next be described. The overall construction of a drive system of an automobile equipped with the system is substantially the same as that described above in connection with the first embodiment shown in FIG. 2. Description of the overall construction is therefore omitted herein.

In the fifteenth embodiment, as in the first embodiment (see FIGS. 1 and 2), there are provided, as shown in FIG. 27, the input shaft 6C, to which rotational drive power is inputted, and the left-wheel-side and right-wheel-side output shafts 13,14 for outputting drive power inputted from the input shaft 6C. The system of the fifteenth embodiment is interposed between the left-wheel-side output shaft 13 and the right-wheel-side output shaft 14.

Owing to the construction to be described below, a drive power transmission control mechanism 9I of the vehicle drive power distribution control system can distribute drive power, which is to be transmitted to the left-wheel-side output shaft 13 and the right-wheel-side output shaft 14, at a desired ratio while permitting a differential motion between the left-wheel-side output shaft 13 and the right-wheel-side output shaft 14.

Between the left-wheel-side output shaft 13 and the right-wheel-side output shaft 14, a speed change mechanism 99 and the multiplate clutch mechanism 12 are interposed. This speed change mechanism 99 can output a rotational speed of the right-wheel-side output shaft 14 after either accelerating or decelerating it, and is provided with a change-over mechanism 101 for changing over a state in which the rotational speed of the right-wheel-side output shaft 14 is outputted after acceleration (an accelerated output state) and a state in which the rotational speed is outputted after deceleration (a decelerated output state). Because of this, only one speed change mechanism 99 and only one multiplate clutch mechanism 12 are provided.

The speed change mechanism 99 is constructed of three sets of gear mechanisms which are disposed between the left-wheel-side output shaft 13 and a shaft (countershaft) 99C extending in parallel with the left-wheel-side output shaft 13. Namely, a small-diameter gear 99A and a large-diameter gear 99B are provided on the side of the counter shaft 99C while a large-diameter gear 14A and a small gear 14B are mounted on the left-wheel-side output shaft 13. The gear 99A and the gear 14A are meshed, whereas the gear 99B and the gear 14B are meshed. However, the gears 99A,99B are connected to the countershaft 99C via the change-over mechanism 101 and, depending on the state of the change-over mechanism 101, rotate relative to or integrally with the countershaft 99C.

An intermediate-diameter gear 99D is mounted on a left-wheel-side end of the countershaft 99C, and another intermediate-diameter gear 100C is disposed on the side of the left-wheel-side output shaft 13. These gears 99D and 100C are meshed. Further, the multiplate clutch mechanism 12 is interposed between the gear 100C and the left-wheel-side output shaft 13.

The change-over mechanism 101 is constructed of an electromagnetic actuator (solenoid) 101A, a slide lever 101B driven by the actuator 101A, a connector member 101C driven by the slide lever 101B, a hub 67 provided on the countershaft 99C, a hub 68 connected to the gear 99A, and a hub 69 connected to the sun gear 99B. The electromagnetic actuator 101A is provided in such a manner that its operation is governed by the control unit 18.

The connector member 101C is displaceable between a position where the connector member 101C is serration-connected with the hubs 67,68 and rotate integrally with the hubs 67,68 and another position where the connector member 101C is serration-connected with the hubs 67,69 and rotate integrally with the hubs 67,69.

When the connector member 101C is driven by the slide lever 101B to a retreated position (namely, to the position moved leftwards as viewed in FIG. 27), the hub 67 and the hub 68 integrally rotate via the connector member 101C. When the connector member 101C is driven by the slide lever 101B to an advanced position (namely, to the position moved rightwards as viewed in FIG. 27), the hub 67 and the hub 69 integrally rotate via the connector member 101C.

When the connector member 101C is at the retreated position, the rotation of the right-wheel-side output shaft 14 is transmitted to the countershaft 99C via the gears 14A,99A, the hub 67, the connector member 101C and the hub 68, and further to the multiplate clutch mechanism 12 via a gear 99E and the gear 100C. At this time, because of the sizes (the numbers of teeth) of the gears 14A, 99A, 99E and 100C, the gear 100C rotates at a higher speed than the right-wheel-side output shaft 14. In other words, the rotation of the right-wheel-side output shaft 14 is accelerated and then outputted to the gear 100C.

When the connector member 101C is at the advanced position, on the other hand, the rotation of the right-wheel-side output shaft 14 is transmitted to the countershaft 99C via the gears 14B,99B, the hub 67, the connector member 101C and the hub 69, and further to the multiplate clutch mechanism 12 via the gears 99E,100C. At this time, because of the sizes (the numbers of teeth) of the gears 14B, 99B, 99E and 100C, the gear 100C rotates at a lower speed than the right-wheel-side output shaft 14. In other words, the rotation of the right-wheel-side output shaft 14 is decelerated and then outputted to the gear 100C.

When the multiplate clutch mechanism 12 is coupled with the connector member 101C being held at the retreated position, the clutch plates on the side of the accelerated gear 100C rotate at a higher speed than the clutch plates on the side of the left-wheel-side output shaft 13 so that torque is transmitted from the side of the right-wheel-side output shaft 14 to the side of the left-wheel-side output shaft 13.

When the mutiplate clutch mechanism 12 is coupled with the connector member 101C being placed at the advanced position, on the other hand, the clutch plates on the side of the decelerated gear 100C rotate at a lower speed than the clutch plates on the side of the left-wheel-side output shaft 13 so that torque is transmitted from the side of the left-wheel-side output shaft 13 to the side of the right-wheel-side output shaft 14.

In particular, the speed change ratio (acceleration ratio) of the above-described speed change mechanism 99 is also set to satisfy the below-described condition in the system of the fifteenth embodiment.

The speed change ratio is set in such a way that, even when the ratio in rotational speed of the left wheel to the right wheel becomes the greatest while the vehicle is cornering, the high/low relationship between a rotational speed on the side of the clutch plates 12A (i.e., on the side of the hollow shaft 11 which is the output means of the speed change mechanism 99) and that on the side of the clutch plates 12B (i.e., on the side of the differential casing 8A which is on the side of the input shaft 6C) in the multiplate clutch mechanism 12 remains unchanged.

Incidentally, the speed change ratio (acceleration ratio) of the speed change mechanism 99 is also determined by the preset gear ratios among the gears 14A, 99A, 99D and 100C as well as the preset gear ratio among the gears 14B, 99B, 99D and 100C.

Using the controllable maximum rotational speed ratio Smax and the maximum left/right wheel speed ratio αmax, the setting conditions for the speed change ratio (acceleration ratio) of the speed change mechanism 99 can be rephrased as setting the speed change ratio to satisfy the following formula:

Smax > αmax

No matter how big difference in rotation speed occurs between the left and right wheels upon cornering of a vehicle, such setting always makes it possible in the illustrated embodiment to couple the multiplate clutch mechanism 12 by operating the connector member 101 to make the hub 68 rotate integrally with the hub 67 so that drive torque from the input shaft 6C can be distributed more to the side of the left wheel or to couple the multiplate clutch mechanism 12 by operating the connector member 101 to make the hub 69 rotate integrally with the hub 67 so that drive torque from the input shaft 6C can be distributed more to the side of the right wheel.

Since the vehicle drive power distribution control system according to the fifteenth embodiment of this invention is constructed as described above, the distribution of torque is controlled, as in the first, third, fifth, seventh, ninth, eleventh and thirteenth embodiments, by transferring a desired amount of torque on one side to the other side instead of controlling the distribution of torque by using an energy loss such as a brake. It is therefore possible to distribute torque at a desired ratio to the left and right drive wheels without inducing a large torque loss or energy loss.

Further, it is required to provide only one speed change mechanism 99 and only one multiplate clutch mechanism 12 so that the system according to the fifteenth embodiment is advantageous in space and cost.

As it is always possible to distribute more drive torque from the input shaft 6C to the side of the left wheel by operating the connector member 101 to make the hub 68 rotate integrally with the hub 67 and hence coupling the multiplate clutch mechanism 12 or to the side of the right wheel by operating the connector member 101 to make the hub 69 rotate integrally with the hub 67 and hence coupling the multiplate clutch mechanism 12, it is always feasible to increase the torque to be distributed to the side of the left wheel or to the side of the right wheel.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

A description will next be made of the vehicle drive power distribution control system according to the sixteenth embodiment. In this system, the system of the fifteenth embodiment described above is applied for the distribution of torque between front and rear wheels.

The overall construction of a drive system of an automobile equipped with the system of the sixteenth embodiment is substantially the same as that described above in connection with the second embodiment shown in FIG. 5. Description of the overall construction is therefore omitted herein.

In the sixteenth embodiment, as in the second embodiment (see FIG. 5), there are provided, as shown in FIG. 28, the differential casing 3A, to which rotational drive power is inputted, and the front-wheel-side and rear-wheel-side output shafts 6A,6B for outputting drive power inputted from the differential casing 3A. The system of the sixteenth embodiment is interposed between the output shaft 6A and the output shaft 6B.

Owing to the construction to be described below, a drive power transmission control mechanism 5I of the vehicle drive power distribution control system can distribute drive power, which is to be transmitted to the front-wheel-side output shaft 6A and the rear-wheel-side output shaft 6B, at a desired ratio while permitting a differential motion between the front-wheel-side output shaft 6A and the rear-wheel-side output shaft 6B.

Between the front-wheel-side output shaft 6A and the rear-wheel-side output shaft 6B, a speed change mechanism 52 and a hydraulic wet multiplate clutch mechanism 56 are interposed. The speed change mechanism 52 can output the rotational speed of the rear-wheel-side output shaft 6B after either accelerating or decelerating it, and is provided with a change-over mechanism 58 for changing over a state in which the rotational speed is outputted after acceleration (an accelerated output state) and a state in which the rotational speed is outputted after deceleration (a decelerated output state). Because of this, only one speed change mechanism 52 and only one multiplate clutch mechanism 56 are provided.

The speed change mechanism 52 is constructed of three sets of gear mechanisms which are disposed between the front-wheel-side output shaft 6A and a shaft (countershaft) 52C extending in parallel with the front-wheel-side output shaft 6A. Namely, a small-diameter gear 52B and a large-diameter gear 52E are provided on the side of the counter shaft 52C while a large-diameter gear 52A and a small gear 52D are mounted on the front-wheel-side output shaft 6A. The gear 52B and the gear 52A are meshed, whereas the gear 52E and the gear 52D are meshed. However, the gears 52B,52E are connected to the countershaft 52C via the change-over mechanism 58 and, depending on the state of the change-over mechanism 58, rotate relative to or integrally with the countershaft 52C.

An intermediate-diameter gear 52F is mounted on a front-wheel-side end of the countershaft 52C, and another intermediate-diameter gear 52G is disposed on the side of the front-wheel-side output shaft 6A. These gears 52F and 52G are meshed. Further, the multiplate clutch mechanism 56 is interposed between the gear 52G and the rear-wheel-side output shaft 6B.

The change-over mechanism 58 is constructed of an electromagnetic actuator (solenoid) 58A, a slide lever 58B driven by the actuator 58A, a connector member 58C driven by the slide lever 58B, a hub 58D provided on the countershaft 52C, a hub 58F connected to the gear 52B, and a hub 58E connected to the gear 52E. The electromagnetic actuator 58A is provided in such a manner that its operation is governed by the control unit 18.

The connector member 58C is displaceable between a position where the connector member 58C is serration-connected with the hubs 58D,58F and rotate integrally with the hubs 58D,58F and another position where the connector member 58C is serration-connected with the hubs 58D,58E and rotate integrally with the hubs 58D,58E.

When the connector member 58C is driven by the slide lever 58B to a retreated position (namely, to the position moved rightwards as viewed in FIG. 28), the hub 58D and the hub 58F integrally rotate via the connector member 58C. When the connector member 58C is driven by the slide lever 58B to an advanced position (namely, to the position moved leftwards as viewed in FIG. 28), the hub 58D and the hub 58E integrally rotate via the connector member 58C.

When the connector member 58C is at the retreated position, the rotation of the front-wheel-side output shaft 6A is transmitted to the countershaft 52C via the gears 52A,52B, the hub 58F, the connector member 58C and the hub 58D, and further to the multiplate clutch mechanism 56 via the gears 52E,52G. At this time, because of the sizes (the numbers of teeth) of the gears 52A, 52B, 52E and 52G, the gear 52G rotates at a higher speed than the front-wheel-side output shaft 6A. In other words, the rotation of the front-wheel-side output shaft 6A is accelerated and then outputted to the gear 52G.

When the connector member 58C is at the advanced position, on the other hand, the rotation of the front-wheel-side output shaft 6A is transmitted to the countershaft 52C via the gears 52D,52E, the hub 58E, the connector member 58C and the hub 58D, and further to the multiplate clutch mechanism 56 via the gears 52F,52G. At this time, because of the sizes (the numbers of teeth) of the gears 52D, 52E, 52F and 52G, the gear 52G rotates at a lower speed than the front-wheel-side output shaft 6A. In other words, the rotation of the front-wheel-side output shaft 6A is decelerated and then outputted to the gear 52G.

When the multiplate clutch mechanism 56 is coupled with the connector member 58C being held at the retreated position, the clutch plates on the side of the accelerated gear 52G rotate at a higher speed than the clutch plates on the side of the rear-wheel-side output shaft 6B so that torque is transmitted from the side of the front-wheel-side output shaft 6A to the side of the rear-wheel-side output shaft 6B.

When the mutiplate clutch mechanism 56 is coupled with the connector member 58C being placed at the advanced position, on the other hand, the clutch plates on the side of the decelerated gear 52G rotate at a lower speed than the clutch plates on the side of the rear-wheel-side output shaft 6B so that torque is transmitted from the side of the rear-wheel-side output shaft 6B to the side of the front-wheel-side output shaft 6A.

Since the vehicle drive power distribution control system according to the sixteenth embodiment of this invention is constructed as described above, the distribution of torque is controlled, as in the second, fourth, sixth, eighth, tenth, twelfth and fourteenth embodiments, by transferring a desired amount of torque on one side to the other side instead of controlling the distribution of torque by using an energy loss such as a brake. It is therefore possible to distribute torque at a desired ratio to the left and right drive wheels without inducing a large torque loss or energy loss.

Further, it is required to provide only one speed change mechanism 52 and only one multiplate clutch mechanism 56 so that the system according to the fifteenth embodiment is advantageous in space and cost.

The vehicle drive power distribution control system according to the seventeenth embodiment will next be described. The overall construction of a drive system of an automobile equipped with the system is substantially the same as that described above in connection with the first embodiment shown in FIG. 2. Description of the overall construction is therefore omitted herein.

In a drive power transmission control mechanism 9E arranged in the vehicle drive power distribution control system, a shaft (countershaft) 51C is provided in parallel with the output shafts 13,14 as illustrated in FIG. 29. The shaft 51C is provided with an intermediate-diameter gear 51B, a large-diameter gear 51D and a small-diameter gear 51E, one of the output shafts, i.e., the output shaft 13 is provided with an intermediate gear 51A rotatable in mesh with the intermediate gear 51B, and the other output shaft, i.e., the output shaft 14 is provided with a small-diameter gear 51F rotatable in mesh with the large-diameter gear 51D and also with a large-diameter gear 51G rotatable in mesh with the small-diameter gear 51E. These gears 51A, 51B, 51D and 51F, in combination, make up an accelerating mechanism as a speed change mechanism whereas the gears 51A, 51B, 51E and 51G, in combination, constitutes a decelerating mechanism as another speed change mechanism.

Between the output shaft 14 and the small-diameter gear 51F and between the output shaft 14 and the large-diameter gear 51G, hydraulic multiplate clutches 54,55 are interposed, respectively. Incidentally, the multiplate clutches 54,55 may be mounted on the countershaft 51C.

As a consequence, the countershaft 51C rotates at the same speed as the output shaft 13 but the small-diameter gear 51F on the output shaft 14 rotates at a higher speed than these countershaft 51C and the output shaft 13, whereby the small-diameter gear 51F rotates at a higher speed than the output shaft 14 during normal running in which no substantial differential motion occurs between the left wheel and the right wheel. On the other hand, the large-diameter gear 51G mounted on the output shaft 14 rotates at a lower speed than the countershaft 51C and the output shaft 13 so that the large-diameter gear 51G rotates at a lower speed than the output shaft 14 during normal running in which no substantial differential motion takes place between the left wheel and the right wheel.

When the multiplate clutch 54 is coupled, torque is therefore transmitted from the side of the small-diameter gear 51F, which is rotating at the higher speed than the output shaft 14, to the side of the output shaft 14 so that the torque to be transmitted to the side of the output shaft 13 is decreased by the amount of torque so transmitted.

When the multiplate clutch 55 is coupled, on the other hand, torque is returned from the side of the output shaft 14 to the side of the large-diameter gear 51G which is rotating at the lower speed than the output shaft 14, so that the torque to be transmitted to the side of the output shaft 13 is increased by the amount of torque so returned.

Since the multiplate clutch mechanisms 54,55 are of the hydraulically driven type, the states of coupling of the multiplate clutch mechanisms 54,55 can be controlled by adjusting the level of the hydraulic pressure so that the amount of drive power to be fed to the left-wheel-side output shaft 13 or the right-wheel-side output shaft 14 from the input shaft 6C (namely, the left/right distribution ratio of the drive power) can be controlled at an appropriate accuracy.

The two multiplate clutch mechanisms 54,55 are arranged such that they are prevented from being fully coupled at the same time. They are designed in such a manner that, when one of the two multiplate clutch mechanisms 54,55 is fully coupled, the other multiplate clutch mechanism undergoes slipping.

In particular, the speed change ratio (acceleration ratio) of each of the above-described speed change mechanisms is also set to satisfy the below-described condition in the system of the seventh embodiment.

The speed change ratio is set in such a way that, even when the ratio in rotational speed of the left wheel to the right wheel becomes the greatest while the vehicle is cornering, the high/low relationship between a rotational speed of the clutch plates on the side of the gear 51F and that of the clutch plates on the side of the output shaft 14 in the multiplate clutch mechanism 54 as well as the high/low relationship between a rotational speed of the clutch plates on the side of the gear 51G and that of the clutch plates on the side of the output shaft 14 in the multiplate clutch mechanism 55 remain unchanged.

Incidentally, the speed change ratios (acceleration ratios) of the speed change mechanisms are determined by the preset gear ratio among the gears 51A, 51B, 51D and 51F and the preset gear ratio among the gears 51A, 51B, 51E and 51G, respectively.

Using the controllable maximum rotational speed ratio Smax and the maximum left/right wheel speed ratio αmax, the setting conditions for the speed change ratio (acceleration ratio) of each speed change mechanism can be rephrased as setting the speed change ratio to satisfy the following formula:

$$S_{max} > \alpha_{max}$$

No matter how big difference in rotation speed occurs between the left and right wheels upon cornering of a vehicle, such setting always makes it possible in the illustrated embodiment to distribute more drive torque from the input shaft 6C to the side of the right wheel by coupling the multiplate clutch mechanism 54 or to the side of the left wheel by coupling the multiplate clutch mechanism 55.

Since the vehicle drive power distribution control system according to the seventeenth embodiment of this invention is constructed as described above, the distribution of torque is controlled, as in the first, third, fifth, seventh, ninth, eleventh, thirteenth and fifteenth embodiments, by transferring a desired amount of torque on one side to the other side instead of controlling the distribution of torque by using an energy loss such as a brake. It is therefore possible to distribute torque at a desired ratio to the left and right wheels without inducing a large torque loss or energy loss.

As it is always possible, as in the third embodiment, to distribute more torque from the input shaft 6C to the side of the right wheel by coupling the multiplate clutch mechanism 54 or to the side of the left wheel by coupling the multiplate clutch mechanism 55, it is always feasible to increase the torque to be distributed to the side of the left wheel or to the side of the right wheel.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

A description will next be made of the vehicle drive power distribution control system according to the eighteenth embodiment. In this system, the system of the seventeenth embodiment described above is applied for the distribution of torque between front and rear wheels.

The overall construction of a drive system of an automobile equipped with the system of the fourteenth embodiment is substantially the same as that described above in connection with the second embodiment shown in FIG. 5. Description of the overall construction is therefore omitted herein.

In the eighteenth embodiment, a drive power transmission mechanism 5E is constructed, as depicted in FIG. 30, like the drive power transmission control mechanism 9E in the seventeenth embodiment. Description of the drive power transmission mechanism 5E is therefore omitted herein. In FIG. 30, similar numerals to those employed in FIG. 29 designate like elements of structure.

Since the vehicle drive power distribution control system according to the eighteenth embodiment of this invention is constructed as described above, the distribution of torque is controlled, as in the second, fourth, sixth, eighth, tenth, twelfth, fourteenth and sixteenth embodiments, by transferring a desired amount of torque on one side to the other side instead of controlling the distribution of torque by using an energy loss such as a brake. It is therefore possible to achieve a desired front/rear torque distribution ratio without inducing a large torque loss or energy loss.

Next, the vehicle drive power distribution control system according to the nineteenth embodiment of the present invention will be described. An automobile equipped with the vehicle drive power distribution control system is an FWD vehicle, and the control system is provided on the side of the rear wheels 15,16 which are non-drive wheels (i.e., wheels to which no engine output is applied). Its drive power transmission control mechanism 90A is arranged between the output shaft 13 for the rear wheel 15 and the output shaft 14 for the rear wheel 16, and the drive power transmission control system 9A of the first embodiment is applied to the non-drive wheels.

As is illustrated in FIGS. 31 and 32, the output shafts 13,14 for the rear wheels 15,16 are independent from each other. A speed change mechanism 91 is provided on the side of the right-wheel-side output shaft 14 while another speed change mechanism 92 is provided on the side of the left-wheel-side output shaft 13. Between an output means of the speed change mechanism 91 and the left-wheel-side output shaft 13, a hydraulic multiplate clutch mechanism 93 is interposed. Between an output means of the speed change mechanism 92 and a hollow shaft 95 which rotates in association with and at the same speed as the left-wheel-side output shaft 13, there is interposed a hydraulic multiplate clutch mechanism 94 which is controlled by the controller 18 as in the first embodiment. Designated at 93A, 93B, 94A and 94B are clutch plates.

Of these speed change mechanisms, the speed change mechanism 91 is constructed of a sun gear 91A mounted for integral rotation on the right-wheel-side output shaft 14, a planetary gear 91B rotatable in mesh with the sun gear 91A, a planetary gear 91D provided on a planetary shaft 91C, on which the planetary gear 91B is pivotally supported, and rotatable integrally with the planetary gear 91B, and a sun gear 93C rotatable in mesh with the planetary gear 91D.

The sun gear 93C is formed smaller in diameter than the sun gear 91A and the planetary gear 91D is formed larger in diameter than the planetary gear 91B, so that the sun gear 93C rotates at a higher speed than the sun gear 91A. Accordingly, the speed change mechanism 91 accelerates the rotation of the right-wheel-side output shaft 14 and outputs the thus-accelerated rotation as rotation of the sun gear 93C.

When the hydraulic multiplate clutch mechanism 93 is coupled, the clutch plates 93B on the side of the left-wheel-side output shaft 13 therefore rotate at a lower speed than the clutch plates 93A on the accelerated sun gear 93C so that drive power is transmitted from the side of the sun gear 93C, namely, from the side of the right-wheel-side output shaft 14 to the side of the left-wheel-side output shaft 13.

Since the left-wheel-side output shaft 13 and the right-wheel-side output shaft 14 are both output shafts for the non-drive wheels in this case, no drive power is supplied to them from the engine. However, the left-wheel-side output shaft 13 applies rotational reaction force, which is received from the road surface, to the right-wheel-side output shaft 14. In other words, the left wheel 15 connected to the left-wheel-side output shaft 13 receives rotational reaction force from the road surface while applying brake force to the road surface. Further, the right wheel 16 connected to the right-wheel-side output shaft 14 applies drive power, which is received from the left-wheel-side output shaft 13, to the road surface. Since brake force is considered to be negative drive force, the distribution of drive power between the left-wheel-side output shaft 13 and the right-wheel-side output shaft 14 is controlled although their associated wheels 15,16 are non-drive wheels.

The speed change mechanism 92, on the other hand, is constructed of a sun gear 92A mounted for integral rotation on the left-wheel-side output shaft 13, a planetary gear 92B rotatable in mesh with the sun gear 92A, a planetary gear 92D provided on the planetary shaft 92C, on which the planetary gear 92B is pivotally supported, and rotatable integrally with the planetary gear 92B, and a sun gear 94C rotatable in mesh with the planetary gear 92D.

The sun gear 94C is formed smaller in diameter than the sun gear 92A and the planetary gear 92D is formed larger in diameter than the planetary gear 92B, so that the sun gear 94C rotates at a higher speed than the sun gear 92A. Accordingly, the speed change mechanism 92 accelerates the rotation of the left-wheel-side output shaft 13 and outputs the thus-accelerated rotation as rotation of the sun gear 94C. The hollow shaft 95 on which one group of the clutch plates the hydraulic multiplate clutch mechanism 94, namely, the clutch plates 94B are fixed is associated with the right-wheel-side output shaft 14 via a sun gear 95A rotatable integrally with the hollow shaft 95, a planetary gear 91E mounted on the planetary shaft 91C and rotatable in mesh with the sun gear 95A, the planetary shaft 91C, the planetary gear 91B and the sun gear 91A.

The sun gear 95A has the same diameter as the sun gear 91A and the planetary gear 91E has the same diameter as the planetary gear 91B, whereby the hollow shaft 95 is always associated at the same speed with the right-wheel-side output shaft 14.

When the hydraulic multiplate clutch mechanism 94 is coupled, the clutch plates 94B on the side of the hollow shaft 95 (namely, on the side of the right-wheel-side output shaft 14) therefore rotate at a lower speed than the clutch plates 94A on the side of the accelerated sun gear 94C so that drive power is transmitted from the side of the left-wheel-side output shaft 13 to the side of the right-wheel-side output shaft 14.

Since the left-wheel-side output shaft 13 and the right-wheel-side output shaft 14 are both output shafts for the non-drive wheels in this case, no drive power is supplied to them from the engine. However, the left-wheel-side output shaft 13 applies rotational reaction force, which has been received from the road surface, to the right-wheel-side output shaft 14. In other words, the left wheel 15 connected to the left-wheel-side output shaft 13 receives rotational reaction force from the road surface while applying brake force to the road surface. Further, the right wheel 16 connected to the right-wheel-side output shaft 14 applies drive power, which is received from the left-wheel-side output shaft 13, to the road surface. The distribution of drive power between the left-wheel-side output shaft 13 and the right-wheel-side output shaft 14 is therefore controlled although their associated wheels 15,16 are non-drive wheels.

In particular, the speed change ratio (acceleration ratio) of each of the above-described speed change mechanisms 91,92 is also set to satisfy the below-described condition in the system of the seventh embodiment.

The speed change ratio is set in such a way that, even when the ratio in rotational speed of the left wheel to the right wheel becomes the greatest while the vehicle is cornering, the high/low relationship between a rotational speed of the clutch plates 93A on the side of the right-wheel-side output shaft 14 and that of the clutch plates 92B on the side of the left-wheel-side output shaft 13 in the multiplate clutch mechanism 93 as well as the high/low relationship between a rotational speed of the clutch plates 94A on the side of the left-wheel-side output shaft 13 and that of the clutch plates 94B attached to the hollow shaft 95 on the side of the right-wheel-side output shaft 14 in the multiplate clutch mechanism 94 remain unchanged.

Incidentally, the speed change ratio (acceleration ratio) of the speed change mechanism 91 is determined by the gear ratio among the gears 91A, 91B, 91D and 93C, and the speed change ratio (acceleration ratio) of the speed change mechanism 92 is also determined by the gear ratio among the gears 92A, 92B, 92D, 94C, etc., respectively.

Using the controllable maximum rotational speed ratio Smax and the maximum left/right wheel speed ratio $\alpha$max, the setting conditions for the speed change ratio (acceleration ratio) of each speed change mechanism 91 or 92 can be rephrased as setting the speed change ratio to satisfy the following formula:

$$Smax > \alpha max$$

No matter how big difference in rotation speed occurs between the left and right wheels upon cornering of a vehicle, such setting always makes it possible in the illustrated embodiment to transfer drive torque from the side of the right wheel to the side of the left wheel by coupling the multiplate clutch mechanism 94 or from the side of the left wheel to the side of the right wheel by coupling the multiplate clutch mechanism 93.

Owing to the construction as described above, the vehicle drive power distribution control system according to the nineteenth embodiment of this invention can control the distribution of drive power to the left or right wheel although these wheels are non-drive wheels not applied with drive power from the engine. By using such control, it is possible to improve, for example, the cornering performance and/or running stability of a vehicle.

Further, the distribution of torque is controlled by transferring a desired amount of torque on one side to the other side instead of controlling the distribution of torque by using an energy loss such as a brake. It is therefore possible to achieve a desired torque distribution ratio without inducing a large torque loss or energy loss.

As it is always possible to transfer drive torque from the side of the right wheel to the side of the left wheel by coupling the multiplate clutch mechanism 93 or from the side of the left wheel to the side of the right wheel by coupling the multiplate clutch mechanism 94, it is always feasible to freely conduct transfer of torque from the side of the right wheel to the side of the left wheel or from the side of the left wheel to the side of the right wheel Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

Next, the vehicle drive power distribution control system according to the twentieth embodiment of the present invention will be described. The system is also provided on the side of the rear wheels 15,16, which are non-drive wheels (i.e., wheels to which no engine output is applied), in an FWD vehicle like the nineteenth embodiment. Its drive power transmission control mechanism 90A is arranged between the output shaft 13 for the rear wheel 15 and the output shaft 14 for the rear wheel 16, and the drive power transmission control system 9A of the third embodiment is applied to the non-drive wheels.

The system of the twentieth embodiment is constructed substantially as in the nineteenth embodiment except for the gear ratio (the large/small relationship of gears) of the speed change mechanism 91.

The speed change mechanism 91 is constructed of the sun gear 91A mounted for integral rotation on the right-wheel-side output shaft 14, a planetary gear 91B rotatable in mesh with the sun gear 91A, a planetary gear 91D provided on a planetary shaft 91C, on which the planetary gear 91B is pivotally supported, and rotatable integrally with the planetary gear 91B, and a sun gear 93C rotatable in mesh with the planetary gear 91D.

The sun gear 93C is formed larger in diameter than the sun gear 91A and the planetary gear 91D is formed larger in diameter than the planetary gear 91B, so that the sun gear 93C rotates at a lower speed than the sun gear 91A. Accordingly, the speed change mechanism 91 decelerates the rotation of the right-wheel-side output shaft 14 and outputs the thus-decelerated rotation as rotation of the sun gear 93C.

When the hydraulic multiplate clutch mechanism 93 is coupled, the clutch plates 93B on the side of the left-wheel-side output shaft 13 therefore rotate at a higher speed than the clutch plates 93A on the side of the decelerated sun gear 93C so that drive power is transmitted from the side of the left-wheel-side output shaft 13 to the side of the sun gear 93C, namely, to the side of the right-wheel-side output shaft 14.

Since the left-wheel-side output shaft 13 and the right-wheel-side output shaft 14 are both output shafts for the non-drive wheels in this case, no drive power is supplied to them from the engine. However, the left-wheel-side output shaft 13 applies rotational reaction force, which is received from the road surface, to the right-wheel-side output shaft 14. In other words, the left wheel 15 connected to the left-wheel-side output shaft 13 receives rotational reaction force from the road surface while applying brake force to the road surface. Further, the right wheel 16 connected to the right-wheel-side output shaft 14 applies drive power, which is received from the left-wheel-side output shaft 13, to the road surface. Since brake force is considered to be negative drive force, the distribution of drive power between the left-wheel-side output shaft 13 and the right-wheel-side output shaft 14 is controlled although their associated wheels 15,16 are non-drive wheels.

The speed change mechanism 92, on the other hand, is constructed of a sun gear 92A mounted for integral rotation on the left-wheel-side output shaft 13, the planetary gear 92B rotatable in mesh with the sun gear 92A, a planetary gear 92D provided on the planetary shaft 92C, on which the planetary gear 92B is pivotally supported, and rotatable integrally with the planetary gear 92B, and the sun gear 94C rotatable in mesh with the planetary gear 92D.

The sun gear 94C is formed larger in diameter than the sun gear 92A but the planetary gear 92D is formed smaller in diameter than the planetary gear 92B, so that the sun gear 94C rotates at a higher speed than the sun gear 92A. Accordingly, the speed change mechanism 92 decelerates the rotation of the left-wheel-side output shaft 13 and outputs the thus-decelerated rotation as rotation of the sun gear 94C.

The hollow shaft 95 on which one group of the clutch plates of the hydraulic multiplate clutch mechanism 94, namely, the clutch plates 94B are fixed is associated with the right-wheel-side output shaft 14 via the sun gear 95A rotatable integrally with the hollow shaft 95, the planetary gear 91E mounted on the planetary shaft 91C and rotatable in mesh with the sun gear 95A, the planetary shaft 91C, the planetary gear 91B and the sun gear 91A.

The sun gear 95A has the same diameter as the sun gear 91A and the planetary gear 91E has the same diameter as the planetary gear 91B, whereby the hollow shaft 95 is always associated at the same speed with the right-wheel-side output shaft 14.

When the hydraulic multiplate clutch mechanism 94 is coupled, the clutch plates 94B on the side of the hollow shaft 95 (namely, on the side of the right-wheel-side output shaft 14) therefore rotate at a higher speed than the clutch plates 94A on the side of the decelerated sun gear 94C so that drive power is transmitted from the side of the right-wheel-side output shaft 14 to the side of the left-wheel-side output shaft 13.

Since the left-wheel-side output shaft 13 and the right-wheel-side output shaft 14 are also output shafts for the non-drive wheels in this case, no drive power is supplied to them from the engine. However, the right-wheel-side output shaft 14 applies rotational reaction force, which is received from the road surface, to the left-wheel-side output shaft 13. In other words, the right wheel 16 connected to the right-wheel-side output shaft 14 receives rotational reaction force from the road surface while applying brake force to the road surface. Further, the left wheel 15 connected to the left-wheel-side output shaft 13 applies drive power, which is received from the right-wheel-side output shaft 14, to the road surface. The distribution of drive power between the left-wheel-side output shaft 13 and the right-wheel-side output shaft 14 is therefore controlled although their associated wheels 15,16 are non-drive wheels.

In particular, the speed change ratio (acceleration ratio) of each of the above-described speed change mechanisms 91,92 is also set to satisfy the below-described condition in the system of the seventh embodiment.

The speed change ratio is set in such a way that, even when the ratio in rotational speed of the left wheel to the right wheel becomes the greatest while the vehicle is cornering, the high/low relationship between a rotational speed of the clutch plates 93A on the side of the right-wheel-side output shaft 14 and that of the clutch plates 93B on the side of the left-wheel-side output shaft 13 in the multiplate clutch mechanism 93 as well as the high/low relationship between a rotational speed of the clutch plates 94A on the side of the left-wheel-side output shaft 13 and that of the clutch plates 94B attached to the hollow shaft 95 on the side of the right-wheel-side output shaft 14 in the multiplate clutch mechanism 94 remain unchanged.

Incidentally, the speed change ratio (acceleration ratio) of the speed change mechanism 91 is determined by the gear ratio among the gears 91A, 91B, 91D and 93C, and the speed change ratio (acceleration ratio) of the speed change mechanism 92 is also determined by the gear ratio among the gears 92A, 92B, 92D, 94C, etc., respectively.

Using the controllable maximum rotational speed ratio Smax and the maximum left/right wheel speed ratio $\alpha$max, the setting conditions for the speed change ratio (acceleration ratio) of each speed change mechanism 91 or 92 can be rephrased as setting the speed change ratio to satisfy the following formula:

$$S_{max} > \alpha_{max}$$

No matter how big difference in rotation speed occurs between the left and right wheels upon cornering of a vehicle, such setting always makes it possible in the illustrated embodiment to transfer drive torque from the side of the right wheel to the side of the left wheel by coupling the multiplate clutch mechanism 94 or from the side of the left wheel to the side of the right wheel by coupling the multiplate clutch mechanism 93.

Owing to the construction as described above, the vehicle drive power distribution control system according to the twentieth embodiment of this invention can control the distribution of drive power although these wheels are non-drive wheels not applied with drive power from the engine. By using such control, it is possible to improve, for example, the cornering performance and/or running stability of a vehicle.

Further, the distribution of torque is controlled by transferring a desired amount of torque on one side to the other side instead of controlling the distribution of torque by using an energy loss such as a brake. It is therefore possible to achieve a desired torque distribution ratio without inducing a large torque loss or energy loss.

As it is always possible to transfer drive torque from the side of the right wheel to the side of the left wheel by coupling the multiplate clutch mechanism 94 or from the side of the left wheel to the side of the right wheel by coupling the multiplate clutch mechanism 93, it is always feasible to freely conduct transfer of torque from the side of the right wheel to the side of the left wheel or from the side of the left wheel to the side of the right wheel Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

Next, the vehicle drive power distribution control system according to the twenty-first embodiment of the present invention will be described. An automobile equipped with the vehicle drive power distribution control system is an FWD vehicle, and the control system is provided on the side of the rear wheels 15,16 which are non-drive wheels. Its drive power transmission control mechanism 90D is arranged between the output shaft 13 for the rear wheel 15 and the output shaft 14 for the rear wheel 16, and the drive power transmission control system 9H of the thirteenth embodiment is applied to the non-drive wheels.

As is illustrated in FIGS. 35 and 36, the output shafts 13,14 for the rear wheels 15,16 are independent from each other. The speed change mechanism 62 and the multiplate clutch mechanism 12 are interposed between the left-wheel-side output shaft 13 and the right-wheel-side output shaft 14. The speed change mechanism 62 is provided with the change-over mechanism 63 for changing over a state in which a rotational speed is outputted at an output means after acceleration (an accelerated output state) and a state in which a rotational speed is outputted after deceleration (a decelerated output state). Because of this, only one speed change mechanism 62 and only one multiplate clutch mechanism 12 are provided on the side of only one of the output shafts (on the side of the left-wheel-side output shaft 13 in the illustrated embodiment).

The speed change mechanism 62 and the change-over mechanism 63 are similar to the speed change mechanism 62 and the change-over mechanism 63 of the mechanism 9H in the thirteenth embodiment and their description is therefore omitted herein. In FIGS. 35 and 36, similar numerals to those employed in FIG. 25 designate like elements of structure.

In particular, the speed change ratio (acceleration ratio) of the above-described speed change mechanisms 62 is also set to satisfy the below-described condition in the system of the twenty-first embodiment.

The speed change ratio is set in such a way that, even when the ratio in rotational speed of the left wheel to the right wheel becomes the greatest while the vehicle is cornering, the high/low relationship between a rotational speed on the side of the clutch plates 12A (i.e., on the side of the hollow shaft 11 which is on the side of the output means of the speed change mechanism 62) and that on the side of the clutch plates 12B (i.e., on the side of the differential casing 8A which is on the side of the input shaft 6C) in the multiplate clutch mechanism 12 remains unchanged.

Incidentally, the speed change ratio (acceleration ratio) of the speed change mechanism 62 is also determined by the preset gear ratio among the sun gear 62A, the planetary gear 62B, the planetary gear 62F (via the pinion shaft 62C) and the sun gear 62G and also by the preset gear ratio among the sun gear 62D, the planetary gear 62E, the planetary gear 62F (via the pinion shaft 62C) and the sun gear 62G.

Using the controllable maximum rotational speed ratio Smax and the maximum left/right wheel speed ratio αmax, the setting conditions for the speed change ratio (acceleration ratio) of each speed change mechanism 62 can be rephrased as setting the speed change ratio to satisfy the following formula:

$$Smax > \alpha max$$

No matter how big difference in rotation speed occurs between the left and right wheels upon cornering of a vehicle, such setting always makes it possible in the illustrated embodiment to transfer drive torque from the side of the left wheel to the side of the right wheel by operating the connector member 63C to make the hub 65 rotate integrally with the hub 64 and hence coupling the multiplate clutch mechanism 12 or from the side of the right wheel to the side of the left wheel by operating the connector member 63C to make the hub 66 rotate integrally with the hub 64 and hence coupling the multiplate clutch mechanism 12.

Owing to the construction as described above, the vehicle drive power distribution control system according to the twenty-first embodiment of this invention can control the distribution of drive power to the left or right wheel although these wheels are non-drive wheels not applied with drive power from the engine. By using such control, it is possible to improve, for example, the cornering performance and/or running stability of a vehicle.

Further, it is required to provide only one speed change mechanism 62 and only one multiplate clutch mechanism 12 so that the system according to the twenty-first embodiment is advantageous in space and cost.

The distribution of torque is also controlled by transferring a desired amount of torque on one side to the other side instead of controlling the distribution of torque by using an energy loss such as a brake. It is therefore possible to achieve a desired torque distribution ratio without inducing a large torque loss or energy loss.

As it is always possible to transfer drive torque from the side of the left wheel to the side of the right wheel by operating the connector member 63C to make the hub 65 rotate integrally with the hub 64 and hence coupling the multiplate clutch mechanism 12 or from the side of the right wheel to the side of the left wheel by operating the connector member 63C to make the hub 66 rotate integrally with the hub 64 and hence coupling the multiplate clutch mechanism 12.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

Next, the vehicle drive power distribution control system according to the twenty-second embodiment of the present invention will be described. An automobile equipped with the vehicle drive power distribution control system is an FWD vehicle, and the control system is provided on the side of the rear wheels 15,16 which are non-drive wheels. Its drive power transmission control mechanism 90C is arranged between the output shaft 13 for the rear wheel 15 and the output shaft 14 for the rear wheel 16, and the drive power transmission control system 9I of the fifteenth embodiment is applied to the non-drive wheels.

As is illustrated in FIGS. 37 and 38, the output shafts 13,14 for the rear wheels 15,16 are independent from each other. The speed change mechanism 99 and the multiplate clutch mechanism 12 are interposed between the left-wheel-side output shaft 13 and the right-wheel-side output shaft 14. The speed change mechanism 99 can output the rotational speed of the right-wheel-side output shaft 14 after either acceleration or deceleration. It is provided with the change-over mechanism 101 which changes over a state in which the rotational speed is outputted after acceleration (an accelerated output state) and a state in which the rotational speed is outputted after deceleration (a decelerated output state). Because of this, only one speed change mechanism 99 and only one multiplate clutch mechanism 12 are provided.

The speed change mechanism 99 and the change-over mechanism 101 are similar to the speed change mechanism 99 and the change-over mechanism 101 of the mechanism 9I in the fifteenth embodiment and also to the speed change mechanism 62 and the change-over mechanism 63 of the mechanism 9H in the thirteenth embodiment. Their description is therefore omitted herein. In FIGS. 37 and 38, similar numerals to those employed in FIG. 27 designate like elements of structure.

In particular, the speed change ratio (acceleration ratio) of the above-described speed change mechanisms 99 is also set to satisfy the below-described condition in the system of the twenty-second embodiment.

The speed change ratio is set in such a way that, even when the ratio in rotational speed of the left wheel to the right wheel becomes the greatest while the vehicle is cornering, the high/low relationship between a rotational speed on the side of the clutch plates 12A (i.e., on the side of the speed change mechanism 99 which is on the side of the right-wheel-side output shaft 14) and that on the side of the clutch plates 12B (i.e., on the side of the left-wheel-side output shaft 13) in the multiplate clutch mechanism 12 remains unchanged.

Incidentally, the speed change ratio (acceleration ratio) of the speed change mechanism 99 is also determined by the preset gear ratio among the gears 14A, 99A, 99D and 100C and also by the preset gear ratio among the gears 14B, 99B, 99D and 100C.

Using the controllable maximum rotational speed ratio Smax and the maximum left/right wheel speed ratio αmax, the setting conditions for the speed change ratio (acceleration ratio) of each speed change mechanism 99 can be rephrased as setting the speed change ratio to satisfy the following formula:

Smax > αmax

No matter how big difference in rotation speed occurs between the left and right wheels upon cornering of a vehicle, such setting always makes it possible in the illustrated embodiment to transfer drive torque from the side of the right wheel to the side of the left wheel by operating the connector member 101 to make the hub 68 rotate integrally with the hub 67 and hence coupling the multiplate clutch mechanism 12 or from the side of the right wheel to the side of the left wheel by operating the connector member 101 to make the hub 69 rotate integrally with the hub 67 and hence coupling the multiplate clutch mechanism 12.

Owing to the construction as described above, the vehicle drive power distribution control system according to the twenty-second embodiment of this invention can control the distribution of drive power to the left or right wheel although these wheels are non-drive wheels not applied with drive power from the engine. By using such control, it is possible to improve, for example, the cornering performance and/or running stability of a vehicle.

Further, it is required to provide only one speed change mechanism 99 and only one multiplate clutch mechanism 12 so that the system according to the twenty-second second embodiment is advantageous in space and cost.

The distribution of torque is also controlled by transferring a desired amount of torque on one side to the other side instead of controlling the distribution of torque by using an energy loss such as a brake. It is therefore possible to achieve a desired torque distribution ratio without inducing a large torque loss or energy loss.

As it is always possible to transfer drive torque 10 from the side of the right wheel to the side of the left wheel by operating the connector member 101 to make the hub 68 rotate integrally with the hub 67 and hence coupling the multiplate clutch mechanism 12 or from the side of the left wheel to the side of the right wheel by operating the connector member 101 to make the hub 69 rotate integrally with the hub 67 and hence coupling the multiplate clutch mechanism 12.

Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

Next, the vehicle drive power distribution control system according to the twenty-third embodiment of the present invention will be described. An automobile equipped with the vehicle drive power distribution control system is an FWD vehicle, and the control system is provided on the side of the rear wheels 15,16 which are non-drive wheels. Its drive power transmission control mechanism 90B is arranged between the output shaft 13 for the rear wheel 15 and the output shaft 14 for the rear wheel 16, and the drive power transmission control system 9E of the seventeenth embodiment is applied to the non-drive wheels.

As is illustrated in FIGS. 39 and 40, the output shafts 13,14 for the rear wheels 15,16 are independent from each other. A speed change mechanism 96 is provided between these output shafts 13 and 14 and on the side of the left-wheel-side output shaft 13, there are provided a hydraulic multiplate clutch mechanism 97 between the output shaft 13 and the accelerated output means of the speed change mechanism 96 and another hydraulic multiplate clutch mechanism 98 between the output shaft 13 and the decelerated output means of the speed change mechanism 96.

The speed change mechanism 96 is composed of the gear 14A provided on the right-wheel-side output shaft 14, a shaft (countershaft) 96B disposed in parallel with the output shafts 13,14, a gear 96A provided on the countershaft 96B and rotatable in mesh with the gear 14A, a gear 97C provided on the side of the left-wheel-side output shaft 13 via the hydraulic multiplate clutch mechanism 97, a gear 98C provided on the side of the left-wheel-side output shaft 13 via the hydraulic multiplate clutch mechanism 98, a gear 96C provided on the countershaft 96B and rotatable in mesh with the gear 97C, and a gear 96D provided on the countershaft 96B and rotatable in mesh with the gear 98C.

The gear 97C is set smaller in diameter than the gear 14A, the gear 98C is set larger in diameter than the gear 14A, the gear 96C is set larger in diameter than the gear 96A, and the gear 96D is set smaller than the gear 96A.

Accordingly, rotational force is transmitted to the gear 97C through the route of the gear 14A, the gear 96A, the gear 96C and the gear 97C, whereby the gear 97C rotates at a higher speed than the gear 14A. This gear 97C serves as the accelerated output means of the speed change mechanism 96. On the other hand, rotational force is transmitted to the gear 98C through the route of the gear 14A, the gear 96A, the gear 96D and the gear 98C, whereby the gear 98C rotates at a lower speed than the gear 14A. This gear 98C serves as the decelerated output means of the speed change mechanism 96.

When the hydraulic multiplate clutch mechanism 97 is coupled, the clutch plates 97A on the side of the left-wheel-side output shaft 13 therefore rotate at a lower speed than the clutch plates 97B on the side of the accelerated gear 97C so that drive power is transmitted from the side of the right-wheel-side output shaft 14 to the side of the left-wheel-side output shaft 13.

When the hydraulic multiplate clutch mechanism 98 is coupled, the clutch plates 98A on the side of the left-wheel-side output shaft 13 therefore rotate at a higher speed than the clutch plates 98B on the side of the decelerated gear 98C so that drive power is transmitted from the side of the left-wheel-side output shaft 13 to the side of the right-wheel-side output shaft 14.

Since the left-wheel-side output shaft 13 and the right-wheel-side output shaft 14 are also output shafts for the non-drive wheels in this case, no drive power is supplied to them from the engine. However, one of the output shafts 13,14, said one output shaft being on the drive side, applies rotational reaction force, which is received from the road surface, to the other output shaft. In other words, the wheel 15 or 16 connected to the output shaft 13 or 14, said output shaft being on the drive side, receives rotational reaction force from the road surface while applying brake force to the road surface. Further, the wheel 16 or 15 connected to the output shaft 14 or 13, said output shaft being on the driven side, receives the rotational reaction force and transmits it as drive power to the road surface.

In particular, the speed change ratio (acceleration ratio) of each of the above-described speed change mechanisms 97,98 is also set to satisfy the below-described condition in the system of the seventh embodiment.

The speed change ratio is set in such a way that, even when the ratio in rotational speed of the left wheel to the right wheel becomes the greatest while the vehicle is cornering, the high/low relationship between a rotational speed of the clutch plates 97A on the side of the left-wheel-side output shaft 13 and that of the clutch plates 97B on the side of the right-wheel-side output shaft 14 (on the side of the speed change mechanism 96) in the multiplate clutch mechanism 97 as well as the high/low relationship between a rotational speed of the clutch plates 98A on the side of the left-wheel-side output shaft 13 and that of the clutch plates 98B on the side of the right-wheel-side output shaft 14 (on the side of the speed change mechanism 96) in the multiplate clutch mechanism 98 remain unchanged.

Incidentally, the speed change ratio (acceleration ratio) of the speed change mechanism 97 is determined by the gear ratio among the gears 14A, 96A, 96C and 97C, and the speed change ratio (acceleration ratio) of the speed change mechanism 98 is also determined by the gear ratio among the gears 14A, 96A, 96D and 98C.

Using the controllable maximum rotational speed ratio Smax and the maximum left/right wheel speed ratio $\alpha$max, the setting conditions for the speed change ratio (acceleration ratio) of each speed change mechanism 97 or 98 can be rephrased as setting the speed change ratio to satisfy the following formula:

$$Smax > \alpha max$$

No matter how big difference in rotation speed occurs between the left and right wheels upon cornering of a vehicle, such setting always makes it possible in the illustrated embodiment to transfer drive torque from the side of the right wheel to the side of the left wheel by coupling the multiplate clutch mechanism 97 or from the side of the left wheel to the side of the right wheel by coupling the multiplate clutch mechanism 98.

Owing to the construction as described above, the vehicle drive power distribution control system according to the twenty-third embodiment of this invention can control the distribution of drive power although these wheels are non-drive wheels not applied with drive power from the engine. By using such control, it is possible to improve, for example, the cornering performance and/or running stability of a vehicle.

Further, the distribution of torque is controlled by transferring a desired amount of torque on one side to the other side instead of controlling the distribution of torque by using an energy loss such as a brake. It is therefore possible to achieve a desired torque distribution ratio without inducing a large torque loss or energy loss.

As it is always possible to transfer drive torque from the side of the right wheel to the side of the left wheel by coupling the multiplate clutch mechanism 97 or from the side of the left wheel to the side of the right wheel by coupling the multiplate clutch mechanism 98, it is always feasible to freely conduct transfer of torque from the side of the right wheel to the side of the left wheel or from the side of the left wheel to the side of the right wheel Transfer of torque to the side of the outer wheel can therefore be freely effected upon cornering. It is hence possible to improve the cornering performance of the vehicle, for example, by increasing drive power to be distributed to the side of the outer wheel upon cornering whereby a moment can be produced in the cornering direction on the vehicle owing to the imbalance in drive power between the left and right wheels and the turning performance upon cornering can thus be improved.

In each of the embodiments described above, one or two hydraulic multiplate clutch mechanisms or the like are provided as torque transmission mechanism(s) of the variable transmission capacity type. No particular limitation is however imposed on such torque transmission mechanism(s) of the variable transmission capacity type as long as they are torque transmission mechanisms whose transmission torque capacities are variable and controllable. Besides the above-exemplified mechanisms, it is also possible to use other multiplate clutch mechanisms such as electromagnetic multiplate clutch mechanisms and, in addition to these multiplate clutch mechanisms, hydraulic or electromagnetic friction clutches, hydraulic or electromagnetic controllable VCUs (viscous coupling units), hydraulic or electromagnetic controllable HCUs (hydraulic coupling units, i.e., hydraulic couplings of the differential pump type), and other couplings such as electromagnetic fluid or electromagnetic powder clutches.

In the case of friction clutches, those capable of adjusting their coupling force by hydraulic pressure or the like, similar to multiplate clutch mechanisms, can be used. In particular, friction clutches each of which can transmit torque in one direction can be arranged in predetermined directions (namely, with their torque transmitting directions aligned with the predetermined torque transmitting directions).

Further, it may be contemplated of using conventional VCUs or HCUs having fixed power transmission characteristics. Those permitting control of their power transmission characteristics are however suited. Adjustment or control of their coupling force and power transmission characteristics can be conducted using a drive means other than hydraulic pressure, such as electromagnetic force.

In each of the embodiments relating to the left and right wheels, namely, the first, third, fifth, seventh, ninth, eleventh, thirteenth, fifteenth, seventeenth, and nineteenth to twenty-third embodiments described above, the vehicle drive power distribution control system is associated with the rear wheels. Needless to say, the vehicle drive power distribution control system can also be applied to the front wheels.

In each of the first, third, fifth, seventh, ninth, eleventh, thirteenth, fifteenth and seventeenth embodiments described above, the vehicle drive power distribution control system is associated with the drive system of the rear wheels in the 4WD vehicle. The vehicle drive power distribution control system can of course be applied to the drive system of the front wheels in a 4WD vehicle, to the drive system of the rear wheels in a RWD vehicle, or to the drive system of the front wheels in a FWD vehicle.

In each of the nineteenth to twenty-third embodiments described above, the vehicle drive power distribution control system is associated with the rear wheels, i.e., the non-drive wheels in the FWD vehicle. The vehicle drive power distribution control system can also be applied to the front wheels, i.e., non-drive wheels in a RWD vehicle.

It is also possible to combine one of the systems in the embodiments directed to the front and rear wheels, namely, the second, fourth, sixth, eighth, tenth, twelfth, fourteenth, sixteenth and eighteenth embodiments with one of the systems for the left and right drive wheels in the first, third, fifth, seventh, ninth, eleventh, thirteenth, fifteenth and seventeenth embodiments.

What is claimed is:

1. In a drive power distribution control system for a vehicle, said system being provided, between a first output shaft and a second output shaft in the vehicle, with:

input means to which drive power is inputted from an engine;

a differential mechanism for transmitting the drive power, which has been inputted from said input means, to the first output shaft and the second output shaft while permitting a differential motion between the first output shaft and the second output shaft; and a drive power transmission control mechanism capable of controlling the state of the transmission of the drive power to control the distribution of the drive power to the first output shaft and the second output shaft, the drive power transmission control mechanism comprising:

a speed change mechanism constructed of a first gear fixed on the first output shaft or the second output shaft, a second gear rotatably provided in meshing engagement with the first gear, a third gear provided for integral rotation with the second gear and having teeth different in number from the second gear, and a an output means, including a fourth gear in meshing engagement with the third gear, for rotation coaxially with the first gear relative to the first output shaft and the second output shaft;

a drive power transmission mechanism capable of transmitting drive power between said input means and said output means of the speed change mechanism; and means for controlling the state of the transmission of drive power in the drive power transmission mechanism.

2. The system of claim 1, wherein the drive power transmission mechanism comprises a wet multiplate clutch.

3. The system of claim 1, wherein the third gear has teeth greater in number than the second gear.

4. The system of claim 1, wherein the second gear has teeth greater in number than the third gear.

5. The system of claim 1, wherein the first output shaft and the second output shaft are constructed as an axle for transmitting drive power to a left and right drive wheels.

6. The system of claim 1, wherein the speed change mechanism is set at such a speed change ratio that, even when the ratio in rotational speed of the first output shaft to the second output shaft becomes the greatest while the vehicle is cornering, the high/low relationship between a rotational speed on the side of said input means and that on the side of said output means of the speed change mechanism in the drive power transmission mechanism remains unchanged.

7. The system of claim 1, wherein the first output shaft and the second output shaft are constructed as a front-axle drive for transmitting drive power to the side of front wheels and as a rear-axle drive for transmitting drive power to the side of rear wheels, respectively.

8. The system of claim 1, wherein the differential mechanism is constructed of a bevel-gear differential.

9. The system of claim 1, wherein the first gear and the fourth gear are each constructed as a sun gear, and the second gear and the third gear are each constructed as a gear arranged outside the sun gear, in meshing engagement with the sun gear, and supported for rotation on a fixed shaft.

10. In a drive power distribution control system for a vehicle, said system being provided, between a first output shaft and a second output shaft in the vehicle, with:

input means to which drive power is inputted from an engine;

a differential mechanism for transmitting the drive power, which has been inputted from said input means, to the first output shaft and the second output shaft while permitting a differential motion between the first output shaft and the second output shaft; and a drive power transmission control mechanism capable of controlling the state of the transmission of the drive power to control the distribution of the drive power to the first output shaft and the second output shaft, the drive power transmission control mechanism comprising:

a speed change mechanism constructed of a first gear rotatably supported on the first output shaft or the second output shaft, a second gear rotatably provided in meshing engagement with the first gear, a third gear provided for integral rotation with the second gear and having teeth different in number from the second gear, and a fourth gear provided in meshing engagement with the third gear and for rotation integrally with said input means and coaxially with the first gear;

a drive power transmission mechanism capable of transmitting drive power between the fourth gear of the speed change mechanism and the first output shaft or the second output shaft; and means for controlling the state of the transmission of drive power in the drive power transmission mechanism.

11. The system of claim 10, wherein the drive power transmission mechanism comprises a wet multiplate clutch.

12. The system of claim 10, wherein the third gear has teeth greater in number than the second gear.

13. The system of claim 10, wherein the second gear has teeth greater in number than the third gear.

14. The system of claim 10, wherein the first output shaft and the second output shaft are constructed as an axle for transmitting drive power to a left and right drive wheels.

15. The system of claim 10, wherein the speed change mechanism is set at such a speed change ratio that, even when the ratio in rotational speed of the first output shaft to the second output shaft becomes the greatest while the vehicle is cornering, the high/low relationship between a rotational speed on the side of said output means and that on the side of the first output shaft or the second output shaft in the drive power transmission mechanism remains unchanged.

16. The system of claim 10, wherein the first output shaft and the second output shaft are constructed as a front-axle drive for transmitting drive power to the side of front wheels and as a rear-axle drive for transmitting drive power to the side of rear wheels, respectively.

17. The system of claim 10, wherein the differential mechanism is constructed of a bevel-gear differential.

18. The system of claim 10, wherein the first gear and the fourth gear are each constructed as a sun gear, and the second gear and the third gear are each constructed as a gear arranged outside the sun gear in a meshing engagement with the sun gear and supported for rotation on a fixed shaft.

19. In a drive power distribution control system for a vehicle, said system being provided, between a first output shaft and a second output shaft in the vehicle, with:

input means to which drive power is inputted from an engine;

a differential mechanism for transmitting the drive power, which has been inputted from said input means, to the first output shaft and the second output shaft while permitting a differential motion between the first output shaft and the second output shaft; and a drive power transmission control mechanism capable of controlling the state of the transmission of the drive power to control the distribution of the drive power to the first output shaft and the second output shaft, the drive power transmission control mechanism comprising:

a speed change mechanism constructed of a sun gear fixed on the first output shaft or the second output shaft, a ring gear fixed on a stationary member, and another gear arranged outside the sun gear and provided in meshing engagement with the sun gear and the ring gear and rotatably supported on a carrier; and a drive power transmission mechanism capable of transmitting drive power between said input means and said another gear of the speed change mechanism.

20. The system of claim 19, wherein the drive power transmission mechanism comprises a wet multiplate clutch.

21. The system of claim 19, wherein the first output shaft and the second output shaft are constructed as an axle for transmitting drive power to a left and right drive wheels.

22. The system of claim 19, wherein the speed change mechanism is set at such a speed change ratio that, even when the ratio in rotational speed of the first output shaft to the second output shaft becomes the greatest while the vehicle is cornering, the high/low relationship between a rotational speed on the side of said input means and that on the side of said output means of the speed change mechanism in the drive power transmission mechanism remains unchanged.

23. The system of claim 19, wherein the first output shaft and the second output shaft are constructed as a front-axle drive for transmitting drive power to the side of front wheels and as a rear-axle drive for transmitting drive power to the side of rear wheels, respectively.

24. The system of claim 19, wherein the differential mechanism is constructed of a bevel-gear differential.

25. In a drive power distribution control system for a vehicle, said system being provided, between a first output shaft and a second output shaft in the vehicle, with:

in put means to which drive power is inputted from an engine;

a differential mechanism for transmitting the drive power, which as been inputted from said input means, to the first output shaft and the second output shaft while permitting a differential motion between the first output shaft and the second output shaft; and a drive power transmission control mechanism capable of controlling the state of the transmission of the drive power to control the distribution of the drive power to the first output shaft and the second output shaft, the drive power transmission control mechanism comprising:

a speed change mechanism constructed of a sun gear rotatably supported on the first output shaft or the second output shaft, a ring gear fixed on a stationary member, and a carrier supported for rotation integrally with said input means, and another gear arranged outside the sun gear and provided in meshing engagement with the sun gear and the ring gear and rotatably supported on the carrier; and a drive power transmission mechanism capable of transmitting drive power between the another gear of the speed change mechanism and the first input shaft or the second input shaft.

26. The system of claim 25, wherein the drive power transmission mechanism comprises a wet multiplate clutch.

27. The system of claim 25, wherein the first output shaft and the second output shaft are constructed as an axle for transmitting drive power to a left and right drive wheels.

28. The system of claim 25, wherein the speed change mechanism is set at such a speed change ratio that, even when the ratio in rotational speed of the first output shaft to the second output shaft becomes the greatest while the vehicle is cornering, the high/low relationship between a rotational speed on the side of output means and that on the side of the first output shaft or the second output shaft in the drive power transmission mechanism remains unchanged.

29. The system of claim 25, wherein the first output shaft and the second output shaft are constructed as a front-axle drive for transmitting drive power to the side of front wheels and as a rear-axle drive for transmitting drive power to the side of rear wheels, respectively.

30. The system of claim 25, wherein the differential mechanism is constructed of a bevel-gear differential.

31. In a drive power distribution control system for a vehicle, said system being provided, between a first output shaft and a second output shaft in the vehicle, with a drive power transmission control mechanism capable of transferring drive power between the output shafts to control drive power of the output shafts, the drive power transmission control mechanism comprising:
- a speed change mechanism connected to one of the first output shaft and the second output shaft so that a rotational speed on the side of said one output shaft can be changed; and
- a drive power transmission mechanism interposed between an output of the speed change mechanism and the other one of the first output shaft and the second output shaft so that drive power can be transmitted between both the output shafts upon engagement.

32. The system of claim 31, wherein the speed change mechanism comprises:
- a first gear fixed on the first output shaft or the second output shaft;
- a second gear arranged for rotation in meshing engagement with the first gear;
- a third gear arranged for integral rotation with the second gear and having teeth different in number from the second gear; and
- a fourth gear arranged for meshing engagement with the third gear and for rotation coaxially with the first gear relative to the first output shaft and the second output shaft.

33. The system of claim 31, wherein the drive power transmission mechanism comprises a wet multiplate clutch.

34. The system of claim 31, wherein the first output shaft and the second output shaft are constructed as an axle for transmitting drive power to a left and right drive wheels.

35. The system of claim 31, wherein the first output shaft and the second output shaft are constructed as rotary shafts for transferring drive power between wheels which are not applied with any engine output.

36. The system of claim 31, wherein the speed change mechanism is set at such a speed change ratio that, even when the ratio in rotational speed of the first output shaft to the second output shaft becomes the greatest while the vehicle is cornering, the high/low relationship between a rotational speed on the side of output means of the speed change mechanism and that on the side of the other one of the first output shaft and the second output shaft in the drive power transmission mechanism remains unchanged.

37. The system of claim 31, wherein the first gear and the fourth gear are each constructed as a sun gear, and the second gear and the third gear are each constructed as a gear arranged outside the sun gear in meshing engagement with the sun gear and supported for rotation on a fixed shaft.

38. In a drive power distribution control system for a vehicle, said system being provided, between a first output shaft and a second output shaft in the vehicle, with a drive power transmission control mechanism capable of transferring drive power between the output shafts to control drive power of the output shafts, the drive power transmission control mechanism comprising:
- a first speed change mechanism connected to the side of the first output shaft so that a rotational speed of the first output shaft can be changed;
- a first drive power transmission mechanism interposed between an output of the first speed change mechanism and the side of the second output shaft so that drive power can be transmitted between both the output shafts upon engagement;
- a second speed change mechanism connected to the side of the second output shaft so that a rotational speed of the second output shaft can be changed; and
- a second drive power transmission mechanism interposed between an output of the second speed change mechanism and the side of the first output shaft so that drive power can be transmitted between both the output shafts upon engagement.

39. The system of claim 38, wherein the first speed change mechanism and the second speed change mechanism comprise:
- a first gear fixed on the first output shaft or the second output shaft;
- a second gear arranged for rotation in meshing engagement with the first gear;
- a third gear arranged for integral rotation with the second gear and having teeth different in number from the second gear; and
- a fourth gear arranged for meshing engagement with the third gear and for rotation coaxially with the first gear relative to the first output shaft and the second output shaft.

40. The system of claim 38, wherein the drive power transmission mechanism comprises a wet multiplate clutch.

41. The system of claim 38, wherein the first output shaft and the second output shaft are constructed as an axle for transmitting drive power to a left and right drive wheels.

42. The system of claim 38, wherein the first output shaft and the second output shaft are constructed as rotary shafts for transferring drive power between wheels which are not applied with any engine output.

43. The system of claim 38, wherein the speed change mechanism is set at such a speed change ratio that, even when the ratio in rotational speed of the first output shaft to the second output shaft becomes the greatest while the vehicle is cornering, the high/low relationship between a rotational speed on the side of output means in the speed change mechanism and that on the side of the other one of the first output shaft and the second output shaft in the drive power transmission mechanism remains unchanged.

44. The system of claim 38, wherein the first gear and the fourth gear are each constructed as a sun gear, and the second gear and the third gear are each constructed as a gear arranged outside the sun gear in meshing engagement with the sun gear and supported for rotation on a fixed shaft.

45. In a drive power distribution control system for a vehicle, said system being provided, between a first output shaft and a second output shaft in the vehicle, with a drive power transmission control mechanism capable of transferring drive power between the output shafts to control drive power of the output shafts, the drive power transmission control mechanism comprising:

- a speed change mechanism connected to the side of one of the first output shaft and the second output shaft so that a rotational speed of said one output shaft can be accelerated or decelerated and then outputted;
- a change-over mechanism attached to the speed change mechanism so that the speed change mechanism can be changed over to an acceleration or deceleration side; and
- a drive power transmission mechanism interposed between an output of the speed change mechanism and the side of the other one of the first output shaft and the second output shaft so that drive power can be transmitted between both the output shafts upon engagement.

46. The system of claim 45, wherein the speed change mechanism comprises:

- a first gear arranged for association with the first output shaft or the second output shaft via the change-over mechanism;
- a second gear arranged for rotation in meshing engagement with the first gear;
- a third gear arranged for integral rotation with the second gear and having teeth different in number from the second gear;
- a fourth gear arranged for meshing engagement with the third gear and for rotation coaxially with the first gear relative to the first output shaft and the second output shaft;
- a fifth gear arranged for association with the first output shaft or the second output shaft via the change-over mechanism; and
- a sixth gear arranged for rotation integrally with the second gear and the third gear and in meshing engagement with the fifth gear and having teeth different in number from the second gear and the third gear.

47. The system of claim 45, wherein the speed change mechanism comprises:

- a first gear fixed on the first output shaft or the second output shaft;
- a second gear arranged for rotation in meshing engagement with the first gear;
- a third gear arranged for integral and coaxial rotation with the second gear via the change-over mechanism and having teeth different in number from the second gear;
- a fourth gear arranged for meshing engagement with the third gear and for rotation coaxially with the first gear relative to the first output shaft and the second output shaft;
- a fifth gear fixed together with the first gear on the first output shaft or the second output shaft; and
- a sixth gear arranged for rotation integrally with the third gear via the change-over mechanism and in meshing engagement with the fifth gear and having teeth different in number from the second gear and the third gear.

48. The system of claim 45, wherein the drive power transmission mechanism comprises a wet multiplate clutch.

49. The system of claim 45, wherein the first output shaft and the second output shaft are constructed as an axle for transmitting drive power to a left and right drive wheels.

50. The system of claim 49, wherein the first output shaft and the second output shaft are each constructed as an output shaft for transmitting drive power to a drive wheel which is rotated while being applied with an engine output.

51. The system of claim 49, wherein the first output shaft and the second output shaft are each constructed as an output shaft for transferring drive power between wheels which are not applied with any engine output.

52. The system of claim 45, wherein the speed change mechanism is set at such a speed change ratio that, even when the ratio in rotational speed of the first output shaft to the second output shaft becomes the greatest while the vehicle is cornering, the high/low relationship between a rotational speed on the side of output means in the speed change mechanism and that on the side of the other one of the first output shaft and the second output shaft in the drive power transmission mechanism remains unchanged.

53. The system of claim 45, wherein the first output shaft and the second output shaft are constructed as a front-axle drive for transmitting drive power to the side of front wheels and as a rear-axle drive for transmitting drive power to the side of rear wheels, respectively.

54. In a drive power distribution control system for a vehicle, said system being provided, between a first output shaft and a second output shaft in the vehicle, with a drive power transmission control mechanism capable of transferring drive power between the output shafts to control drive power of the output shafts, the drive power transmission control mechanism comprising:

- a speed change mechanism connected to the side of one of the first output shaft and the second output shaft so that a rotational speed of said one output shaft can be accelerated or decelerated and then outputted; and
- a drive power transmission mechanism interposed between an output of the speed change mechanism and the other one of the first output shaft and the second output shaft so that drive power can be transmitted between both the output shafts upon engagement.

55. The system of claim 54, wherein the speed change mechanism comprises:

- a first gear fixed on the first output shaft or the second output shaft;
- a second gear arranged for rotation in meshing engagement with the first gear;
- a third gear arranged for rotation integrally with the second gear and having teeth different in number from the second gear;
- a fourth gear arranged for meshing engagement with the third gear and for rotation coaxially with the first gear relative to the first output shaft and the second output shaft;

a fifth gear arranged for rotation integrally with the second gear and the third gear and having teeth different in number from the second gear and the third gear; and a sixth gear arranged in meshing engagement with the fifth gear and for rotation relative to the first output shaft and the second output shaft coaxially with the first gear.

56. The system of claim 54, wherein the drive power transmission mechanism comprises a wet multiplate clutch.

57. The system of claim 54, wherein the first output shaft and the second output shaft are constructed as an axle for transmitting drive power to a left and right drive wheels.

58. The system of claim 57, wherein the first output shaft and the second output shaft are each constructed as an output shaft for transmitting drive power to a drive wheel which is rotated while being applied with an engine output.

59. The system of claim 57, wherein the first output shaft and the second output shaft are each constructed as an output shaft for transferring drive power between non-drive wheels which are not applied with any engine output.

60. The system of claim 54, wherein the speed change mechanism is set at such a speed change ratio that, even when the ratio in rotational speed of the first output shaft to the second output shaft becomes the greatest while the vehicle is cornering, the high/low relationship between a rotational speed on the side of output means of the speed change mechanism in the drive power transmission mechanism and that on the side of the other one of the first output shaft and the second output shaft in the drive power transmission mechanism remains unchanged.

61. The system of claim 54, wherein the first output shaft and the second output shaft are constructed as a front-axle drive for transmitting drive power to the side of front wheels and as a rear-axle drive for transmitting drive power to the side of rear wheels, respectively.

* * * * *